(12) United States Patent  (10) Patent No.: US 12,347,832 B2
Modest et al.  (45) Date of Patent: Jul. 1, 2025

(54) ELECTROCHEMICAL ENERGY STORAGE DEVICES

(71) Applicant: AMBRI, LLC, Marlborough, MA (US)

(72) Inventors: Zachary T. Modest, Jamaica Plain, MA (US); Fredrick Charles Davis Allan, Cambridge, MA (US); Donald R. Sadoway, Cambridge, MA (US); Daniel M. Holzer, Medford, MA (US); Stephanie L. Golmon, Arlington, MA (US); Raymond Maxime Fox, Walpole, MA (US); Nick Trombetta, Bolton, MA (US); Alexander W. Elliott, Billerica, MA (US); Hari P. Nayar, Woburn, MA (US); David J. Bradwell, Sudbury, MA (US)

(73) Assignee: AMBRI, LLC, Marlborough, MA (US)

( * ) Notice: Subject to any disclaimer, the term of this patent is extended or adjusted under 35 U.S.C. 154(b) by 0 days.

(21) Appl. No.: 18/218,412

(22) Filed: Jul. 5, 2023

(65) Prior Publication Data
US 2023/0344015 A1   Oct. 26, 2023

Related U.S. Application Data

(63) Continuation of application No. 17/404,341, filed on Aug. 17, 2021, now abandoned, which is a (Continued)

(51) Int. Cl.
*H01M 10/39* (2006.01)
*B60L 50/64* (2019.01)
(Continued)

(52) U.S. Cl.
CPC .......... *H01M 10/399* (2013.01); *B60L 50/64* (2019.02); *B60L 53/00* (2019.02); *B60L 53/53* (2019.02);
(Continued)

(58) Field of Classification Search
CPC ............... H01M 10/39; H01M 10/399; H01M 10/4207; H01M 10/425; H01M 50/138;
(Continued)

(56) References Cited

U.S. PATENT DOCUMENTS

| 11,374 A | 7/1854 | Leue |
| 2,587,443 A | 2/1952 | Crabtree |

(Continued)

FOREIGN PATENT DOCUMENTS

| AU | 2014229643 A1 | 9/2015 |
| AU | 2016225020 A1 | 9/2017 |

(Continued)

OTHER PUBLICATIONS

Advisory Action Before Filing of Appeal Brief dated May 10, 2012 for U.S. Appl. No. 12/839,130.
(Continued)

*Primary Examiner* — Christopher P Domone
(74) *Attorney, Agent, or Firm* — WILSON SONSINI GOODRICH & ROSATI

(57) ABSTRACT

Provided herein are energy storage devices. In some cases, the energy storage devices are capable of being transported on a vehicle and storing a large amount of energy. An energy storage device is provided comprising at least one liquid metal electrode, an energy storage capacity of at least about 1 MWh and a response time less than or equal to about 100 milliseconds (ms).

19 Claims, 14 Drawing Sheets

Related U.S. Application Data continuation-in-part of application No. 15/063,842, filed on Mar. 8, 2016, now abandoned, which is a continuation of application No. PCT/US2014/056367, filed on Sep. 18, 2014.

(60) Provisional application No. 61/879,349, filed on Sep. 18, 2013.

(51) Int. Cl.
*B60L 53/00* (2019.01)
*B60L 53/53* (2019.01)
*H01M 4/134* (2010.01)
*H01M 4/38* (2006.01)
*H01M 10/42* (2006.01)
*H01M 50/463* (2021.01)
*H01M 50/138* (2021.01)

(52) U.S. Cl.
CPC ............ *H01M 4/134* (2013.01); *H01M 4/38* (2013.01); *H01M 4/381* (2013.01); *H01M 4/382* (2013.01); *H01M 10/4207* (2013.01); *H01M 10/425* (2013.01); *H01M 50/463* (2021.01); *H01M 4/387* (2013.01); *H01M 50/138* (2021.01); *H01M 2220/20* (2013.01); *Y02T 10/70* (2013.01); *Y02T 10/7072* (2013.01); *Y02T 90/14* (2013.01)

(58) Field of Classification Search
CPC .. H01M 50/463; H01M 50/471; H01M 4/134; H01M 4/38; H01M 4/381; H01M 4/382; H01M 4/387; H01M 2220/10; H01M 2220/20
See application file for complete search history.

(56) References Cited

U.S. PATENT DOCUMENTS

| | | |
|---|---|---|
| 3,057,946 A | 10/1962 | Eidensohn |
| 3,238,437 A | 3/1966 | Foster et al. |
| 3,245,836 A | 4/1966 | Agruss |
| 3,404,035 A | 10/1968 | Kummer et al. |
| 3,419,432 A | 12/1968 | Hesson |
| 3,488,221 A | 1/1970 | Hiroshi et al. |
| 3,507,703 A | 4/1970 | Laszlo |
| 3,535,214 A | 10/1970 | Rene |
| 3,588,573 A | 6/1971 | Chen et al. |
| 3,607,405 A | 9/1971 | Harold |
| 3,607,407 A | 9/1971 | Harry |
| 3,635,765 A | 1/1972 | Jacob |
| 3,663,295 A | 5/1972 | Bernard |
| 3,666,560 A | 5/1972 | Cairns et al. |
| 3,716,409 A | 2/1973 | Cairns et al. |
| 3,770,506 A | 11/1973 | Rightmire et al. |
| 3,775,181 A | 11/1973 | Ryerson |
| 3,833,420 A | 9/1974 | Will |
| 3,833,421 A | 9/1974 | Rubischko et al. |
| 3,833,422 A | 9/1974 | Will et al. |
| 3,837,918 A | 9/1974 | Nakabayashi |
| 3,839,779 A | 10/1974 | Walker |
| 3,870,561 A | 3/1975 | Charbonnier et al. |
| 3,877,984 A | 4/1975 | Werth |
| 3,878,296 A | 4/1975 | Vine et al. |
| 3,884,715 A | 5/1975 | Gay et al. |
| 3,887,396 A | 6/1975 | Walsh et al. |
| 3,898,096 A | 8/1975 | Heredy et al. |
| 3,907,589 A | 9/1975 | Gay et al. |
| 3,915,742 A | 10/1975 | Battles et al. |
| 3,926,673 A | 12/1975 | Saridakis |
| 3,930,888 A | 1/1976 | Bowser et al. |
| 3,933,521 A | 1/1976 | Vissers et al. |
| 3,941,612 A | 3/1976 | Steunenberg et al. |
| 3,947,291 A | 3/1976 | Yao et al. |
| 3,954,504 A | 5/1976 | Zellhoefer |
| 3,959,012 A | 5/1976 | Liang et al. |
| 3,960,594 A | 6/1976 | Fritz et al. |
| 3,969,139 A | 7/1976 | Lai |
| 3,980,495 A | 9/1976 | Roche et al. |
| 3,988,164 A | 10/1976 | Liang et al. |
| 4,002,807 A | 1/1977 | Ludwig |
| 4,011,374 A | 3/1977 | Kaun |
| 4,015,054 A | 3/1977 | Cleaver et al. |
| 4,018,969 A | 4/1977 | Fischer et al. |
| 4,029,860 A | 6/1977 | Vissers et al. |
| 4,032,614 A | 6/1977 | Lewis |
| 4,044,194 A | 8/1977 | Evans et al. |
| 4,060,667 A | 11/1977 | Askew et al. |
| 4,061,841 A | 12/1977 | Sharma et al. |
| 4,065,602 A | 12/1977 | Roche et al. |
| 4,069,372 A | 1/1978 | Voinov |
| 4,107,401 A | 8/1978 | Goodson et al. |
| 4,125,683 A | 11/1978 | Beckford et al. |
| 4,130,500 A | 12/1978 | Melendres et al. |
| 4,164,608 A | 8/1979 | Coetzer |
| 4,169,120 A | 9/1979 | Miller |
| 4,189,529 A | 2/1980 | Birt et al. |
| 4,195,123 A | 3/1980 | Jumel |
| RE30,353 E | 7/1980 | Voinov |
| 4,216,273 A | 8/1980 | Cadart et al. |
| 4,238,553 A | 12/1980 | Gerlach et al. |
| 4,265,984 A | 5/1981 | Kaye |
| 4,287,268 A | 9/1981 | Coetzer |
| 4,287,269 A | 9/1981 | Coetzer et al. |
| 4,299,890 A | 11/1981 | Rea et al. |
| 4,315,974 A | 2/1982 | Athearn et al. |
| 4,338,380 A | 7/1982 | Erickson et al. |
| 4,360,574 A | 11/1982 | Park |
| 4,367,159 A | 1/1983 | Mrazek et al. |
| 4,405,433 A | 9/1983 | Payne |
| 4,407,912 A | 10/1983 | Virkar et al. |
| 4,457,989 A | 7/1984 | Coetzer |
| 4,510,210 A | 4/1985 | Hunt |
| 4,565,751 A | 1/1986 | Faust et al. |
| 4,582,553 A | 4/1986 | Buchta |
| 4,588,663 A | 5/1986 | Mason et al. |
| 4,596,637 A | 6/1986 | Kozarek et al. |
| 4,622,111 A | 11/1986 | Brown et al. |
| 4,657,830 A | 4/1987 | Kagawa |
| 4,692,390 A | 9/1987 | Roy |
| 4,764,437 A | 8/1988 | Kaun |
| 4,800,143 A | 1/1989 | Harbach et al. |
| 4,818,638 A | 4/1989 | Roy |
| 4,833,046 A | 5/1989 | Roy |
| 4,849,682 A | 7/1989 | Bauer et al. |
| 4,877,695 A | 10/1989 | Cipriano et al. |
| 4,886,715 A | 12/1989 | McCullough, Jr. et al. |
| 4,929,521 A | 5/1990 | Cipriano et al. |
| 4,945,012 A | 7/1990 | Bugga et al. |
| 4,945,257 A | 7/1990 | Marrocco, III |
| H816 H | 9/1990 | Carder et al. |
| 4,954,403 A | 9/1990 | Plichta et al. |
| 4,965,146 A | 10/1990 | McCullough et al. |
| 4,975,344 A | 12/1990 | Wedlake et al. |
| 4,999,097 A | 3/1991 | Sadoway |
| 5,011,748 A | 4/1991 | Shacklette et al. |
| 5,024,737 A | 6/1991 | Claus et al. |
| 5,034,290 A | 7/1991 | Sands et al. |
| 5,039,351 A | 8/1991 | Cooper et al. |
| 5,044,551 A | 9/1991 | Tanaka et al. |
| 5,139,895 A | 8/1992 | Roy et al. |
| 5,185,068 A | 2/1993 | Sadoway |
| 5,198,638 A | 3/1993 | Massacesi |
| 5,254,232 A | 10/1993 | Sadoway |
| 5,284,562 A | 2/1994 | Beck et al. |
| 5,286,359 A | 2/1994 | Richards et al. |
| 5,369,547 A | 11/1994 | Evans |
| 5,380,406 A | 1/1995 | Horton et al. |
| 5,392,191 A | 2/1995 | Thomas et al. |
| 5,407,119 A | 4/1995 | Churchill et al. |
| 5,429,895 A | 7/1995 | Lian et al. |
| 5,469,325 A | 11/1995 | Evans |
| 5,476,733 A | 12/1995 | Coetzer et al. |

(56) References Cited

U.S. PATENT DOCUMENTS

| | | |
|---|---|---|
| 5,491,037 A | 2/1996 | Kawakami |
| 5,529,858 A | 6/1996 | Wicker et al. |
| 5,532,078 A | 7/1996 | Redey et al. |
| 5,536,600 A | 7/1996 | Kaun |
| 5,538,813 A | 7/1996 | Li |
| 5,549,989 A | 8/1996 | Anani |
| 5,559,667 A | 9/1996 | Evans |
| 5,563,765 A | 10/1996 | Lian et al. |
| 5,578,389 A | 11/1996 | Tsuchimoto et al. |
| 5,587,872 A | 12/1996 | Lian et al. |
| 5,597,331 A | 1/1997 | Gable et al. |
| 5,604,053 A | 2/1997 | Coetzer et al. |
| 5,658,447 A | 8/1997 | Watson et al. |
| 5,661,403 A | 8/1997 | MacKenzie |
| 5,687,056 A | 11/1997 | Harshe et al. |
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,716,731 A | 2/1998 | Coetzer et al. |
| 5,735,933 A | 4/1998 | Yokoyama et al. |
| 5,737,181 A | 4/1998 | Evans |
| 5,763,117 A | 6/1998 | Wright et al. |
| 5,798,308 A | 8/1998 | Chatterjee et al. |
| 5,807,412 A | 9/1998 | Li et al. |
| 5,834,131 A | 11/1998 | Lutz et al. |
| 5,856,041 A | 1/1999 | Inoue et al. |
| 5,874,183 A | 2/1999 | Uematsu |
| 5,939,221 A | 8/1999 | Tsuchimoto et al. |
| 5,972,533 A | 10/1999 | Coetzer et al. |
| 5,982,609 A | 11/1999 | Evans |
| 6,007,943 A | 12/1999 | Coetzer |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh et al. |
| 6,387,153 B1 | 5/2002 | Burke |
| 6,396,380 B1 | 5/2002 | Girke et al. |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,531,846 B1 | 3/2003 | Smith et al. |
| 6,548,212 B1 | 4/2003 | Heider et al. |
| 6,549,423 B1 | 4/2003 | Brodnick |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,255,937 B2 | 8/2007 | Park |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,554,220 B2 | 6/2009 | Sugawara |
| 7,568,537 B2 | 8/2009 | King et al. |
| 7,578,702 B1 | 8/2009 | Tom et al. |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,858,228 B2 | 12/2010 | Yoon |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,257,868 B2 | 9/2012 | Hagiwara et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,459,314 B2 | 6/2013 | Frazier et al. |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Genc et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Carter et al. |

(56) References Cited

U.S. PATENT DOCUMENTS

| | | |
|---|---|---|
| 8,764,962 B2 | 7/2014 | Allanore et al. |
| 8,766,642 B2 | 7/2014 | Bogdan, Jr. et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,035,617 B2 | 5/2015 | Parakulam et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,437,864 B2 | 9/2016 | Tan et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,728,814 B2 | 8/2017 | Bradwell et al. |
| 9,735,450 B2 * | 8/2017 | Bradwell ............... H01M 4/382 |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas et al. |
| 10,181,800 B1 | 1/2019 | Nayar et al. |
| 10,205,195 B2 | 2/2019 | Boysen et al. |
| 10,270,139 B1 | 4/2019 | Deak et al. |
| 10,297,870 B2 | 5/2019 | Bradwell |
| 10,541,451 B2 | 1/2020 | Bradwell et al. |
| 10,566,662 B1 | 2/2020 | Nayar et al. |
| 10,608,212 B2 | 3/2020 | Bradwell et al. |
| 10,637,015 B2 | 4/2020 | Thompson et al. |
| 10,903,528 B2 | 1/2021 | Ouchi et al. |
| 11,196,091 B2 | 12/2021 | Bradwell et al. |
| 11,211,641 B2 | 12/2021 | Bradwell et al. |
| 11,289,759 B2 | 3/2022 | Thompson et al. |
| 11,387,497 B2 | 7/2022 | Bradwell et al. |
| 11,411,254 B2 | 8/2022 | Bradwell et al. |
| 11,611,112 B2 | 3/2023 | Bradwell et al. |
| 11,677,100 B2 | 6/2023 | Bradwell et al. |
| 11,721,841 B2 | 8/2023 | Bradwell et al. |
| 11,840,487 B2 | 12/2023 | Bradwell et al. |
| 11,929,466 B2 | 3/2024 | Bradwell et al. |
| 2002/0009649 A1 | 1/2002 | Sato et al. |
| 2002/0012833 A1 | 1/2002 | Gow et al. |
| 2002/0051912 A1 | 5/2002 | Fitter et al. |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0052646 A1 | 3/2003 | Minamiura et al. |
| 2003/0182791 A1 | 10/2003 | Janmey |
| 2003/0186111 A1 | 10/2003 | Tamakoshi |
| 2003/0196908 A1 | 10/2003 | Brown |
| 2003/0203279 A1 | 10/2003 | Tsukamoto et al. |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 * | 4/2005 | Kairawicz ............... B21D 51/54 |
| | | 72/379.4 |
| 2005/0237029 A1 | 10/2005 | Takezawa et al. |
| 2005/0238954 A1 | 10/2005 | Kawada |
| 2006/0127735 A1 | 6/2006 | Sabin et al. |
| 2006/0151333 A1 | 7/2006 | Banek |
| 2006/0187614 A1 | 8/2006 | Ushio et al. |
| 2007/0067119 A1 | 3/2007 | Loewen et al. |
| 2007/0087266 A1 * | 4/2007 | Bourke ............... H01M 50/505 |
| | | 429/61 |
| 2007/0184711 A1 | 8/2007 | Thrap et al. |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 * | 2/2008 | Sadoway ............ H01M 10/399 |
| | | 429/188 |
| 2008/0050295 A1 | 2/2008 | Uchida et al. |
| 2008/0053838 A1 | 3/2008 | Yamaguchi et al. |
| 2008/0088276 A1 * | 4/2008 | Hurst ............... H01M 10/0481 |
| | | 320/116 |
| 2008/0118428 A1 | 5/2008 | Awano et al. |
| 2008/0145755 A1 | 6/2008 | Iacovangelo et al. |
| 2008/0241689 A1 | 10/2008 | Takami et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1 | 6/2009 | Vallance et al. |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 * | 9/2010 | Normann ............ H01M 10/6561 |
| | | 429/62 |
| 2010/0291443 A1 | 11/2010 | Farmer |
| 2011/0014503 A1 | 1/2011 | Bradwell et al. |
| 2011/0014505 A1 * | 1/2011 | Bradwell ............ H01M 10/617 |
| | | 429/81 |
| 2011/0020694 A1 | 1/2011 | Khakhalev et al. |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0144861 A1 | 6/2011 | Lakirovich et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0086128 A1 | 4/2012 | Ponoth et al. |
| 2012/0091806 A1 | 4/2012 | Tsutsumi et al. |
| 2012/0094194 A1 | 4/2012 | Visco et al. |
| 2012/0104990 A1 | 5/2012 | Boysen et al. |
| 2012/0107675 A1 | 5/2012 | Kim et al. |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0171524 A1 | 7/2012 | Hiraiwa et al. |
| 2012/0183838 A1 | 7/2012 | An et al. |
| 2012/0190252 A1 | 7/2012 | Pavlinsky et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0263988 A1 | 10/2012 | Obasih et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar et al. |

(56) References Cited

U.S. PATENT DOCUMENTS

| | | |
|---|---|---|
| 2012/0328910 A1 | 12/2012 | La et al. |
| 2012/0328930 A1 | 12/2012 | Inagaki et al. |
| 2012/0328935 A1 | 12/2012 | Matsui et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams et al. |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0073234 A1 | 3/2013 | Leport et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1 | 5/2013 | Choi |
| 2013/0134928 A1 | 5/2013 | Uchihashi et al. |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0149567 A1 | 6/2013 | Schaefer |
| 2013/0166085 A1 | 6/2013 | Cherian et al. |
| 2013/0183544 A1* | 7/2013 | Yoshioka ............. H01M 10/425 429/7 |
| 2013/0248437 A1 | 9/2013 | Frazier et al. |
| 2013/0295435 A1 | 11/2013 | Vu |
| 2013/0315659 A1 | 11/2013 | Kumar et al. |
| 2014/0000251 A1 | 1/2014 | McBride et al. |
| 2014/0038011 A1 | 2/2014 | Fukunaga et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0176147 A1 | 6/2014 | Wiegman et al. |
| 2014/0220428 A1 | 8/2014 | Zinck et al. |
| 2014/0242466 A1 | 8/2014 | Murashi et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0277791 A1 | 9/2014 | Lenard et al. |
| 2014/0315097 A1 | 10/2014 | Tan et al. |
| 2014/0349159 A1 | 11/2014 | Bartling et al. |
| 2014/0365027 A1 | 12/2014 | Namba et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0093614 A1 | 4/2015 | Fukuhara et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0280480 A1 | 10/2015 | Mitri et al. |
| 2015/0303525 A1 | 10/2015 | Bradwell et al. |
| 2015/0318586 A1 | 11/2015 | Rahmane et al. |
| 2015/0325821 A1 | 11/2015 | Bradwell et al. |
| 2015/0380713 A1 | 12/2015 | Kimura et al. |
| 2016/0006090 A1 | 1/2016 | Licht |
| 2016/0043384 A1 | 2/2016 | Zhamu et al. |
| 2016/0156068 A1 | 6/2016 | Burke et al. |
| 2016/0172714 A1 | 6/2016 | Ouchi et al. |
| 2016/0186235 A1 | 6/2016 | Joseph et al. |
| 2016/0190607 A1 | 6/2016 | Wyser et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |
| 2017/0248041 A1 | 8/2017 | Lenk et al. |
| 2017/0259648 A1 | 9/2017 | Putcha et al. |
| 2017/0263951 A1 | 9/2017 | Kanno et al. |
| 2017/0309979 A1 | 10/2017 | Lee et al. |
| 2017/0338451 A9 | 11/2017 | Bradwell et al. |
| 2017/0358941 A1 | 12/2017 | Mitri et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0159179 A1 | 6/2018 | Bradwell et al. |
| 2018/0191162 A1 | 7/2018 | Hanada et al. |
| 2018/0315976 A1 | 11/2018 | Lee et al. |
| 2019/0089013 A1 | 3/2019 | Ouchi et al. |
| 2019/0115632 A1 | 4/2019 | Beuning et al. |
| 2019/0123369 A1 | 4/2019 | Ma et al. |
| 2019/0296276 A1 | 9/2019 | Bradwell et al. |
| 2020/0076006 A1 | 3/2020 | Bradwell et al. |
| 2020/0176824 A1 | 6/2020 | Bradwell et al. |
| 2020/0280040 A1 | 9/2020 | Lee et al. |
| 2020/0287247 A1 | 9/2020 | Bradwell et al. |
| 2021/0036273 A1 | 2/2021 | Thompson et al. |
| 2021/0043982 A1 | 2/2021 | Bradwell et al. |
| 2021/0376394 A1 | 12/2021 | Bradwell et al. |
| 2022/0013835 A1 | 1/2022 | Bradwell et al. |
| 2022/0077508 A1 | 3/2022 | Nayar et al. |
| 2022/0216527 A1 | 7/2022 | Bradwell et al. |
| 2022/0255138 A1 | 8/2022 | Bradwell et al. |
| 2022/0263168 A1 | 8/2022 | Thompson et al. |
| 2022/0359917 A1 | 11/2022 | Bradwell et al. |
| 2023/0282891 A1 | 9/2023 | Bradwell et al. |
| 2023/0282892 A1 | 9/2023 | Bradwell et al. |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 1578553 A | 2/2005 |
| CN | 1743056 A | 3/2006 |
| CN | 1750309 A | 3/2006 |
| CN | 101436780 A | 5/2009 |
| CN | 101506117 A | 8/2009 |
| CN | 101519313 A | 9/2009 |
| CN | 101640256 A | 2/2010 |
| CN | 201518329 U | 6/2010 |
| CN | 101828285 A | 9/2010 |
| CN | 101942676 A | 1/2011 |
| CN | 102024922 A | 4/2011 |
| CN | 201809448 U | 4/2011 |
| CN | 201908137 U | 7/2011 |
| CN | 102181883 A | 9/2011 |
| CN | 202076339 U | 12/2011 |
| CN | 102498589 A | 6/2012 |
| CN | 202268405 U | 6/2012 |
| CN | 102646808 A | 8/2012 |
| CN | 103001239 A | 3/2013 |
| CN | 202797170 U | 3/2013 |
| CN | 103137916 A | 6/2013 |
| CN | 103342556 A | 10/2013 |
| CN | 103367663 A | 10/2013 |
| CN | 103943794 A | 7/2014 |
| CN | 203707210 U | 7/2014 |
| CN | 104364930 A | 2/2015 |
| CN | 105190984 A | 12/2015 |

(56) References Cited

FOREIGN PATENT DOCUMENTS

| | | |
|---|---|---|
| CN | 105659415 A | 6/2016 |
| CN | 105830247 A | 8/2016 |
| CN | 206210892 U | 5/2017 |
| CN | 107204410 A | 9/2017 |
| CN | 206774598 U | 12/2017 |
| DE | 3239964 A1 | 5/1984 |
| DE | 19618609 A1 | 11/1997 |
| DE | 102012103386 A1 | 10/2013 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2665120 A1 | 11/2013 |
| EP | 2709188 A1 | 3/2014 |
| EP | 2909887 A1 | 8/2015 |
| EP | 3607603 | 2/2020 |
| EP | 3898421 A1 | 10/2021 |
| GB | 2062939 A | 5/1981 |
| JP | S4933815 B1 | 9/1974 |
| JP | S55053877 A1 | 4/1980 |
| JP | S61114664 A | 6/1986 |
| JP | H06223872 A | 8/1994 |
| JP | H06310171 A | 11/1994 |
| JP | H09167631 A | 6/1997 |
| JP | H1012270 A | 1/1998 |
| JP | H10208771 A | 8/1998 |
| JP | H117923 A | 1/1999 |
| JP | H11185800 A | 7/1999 |
| JP | 2001115369 A | 4/2001 |
| JP | 2001243994 A | 9/2001 |
| JP | 2001345098 A | 12/2001 |
| JP | 3355377 B2 | 12/2002 |
| JP | 2003068356 A | 3/2003 |
| JP | 2003146771 A | 5/2003 |
| JP | 2003187860 A | 7/2003 |
| JP | 2007157373 A | 6/2007 |
| JP | 2010206101 A | 9/2010 |
| JP | 2010214396 A | 9/2010 |
| JP | 2010535942 A | 11/2010 |
| JP | 2011508379 A | 3/2011 |
| JP | 2012119220 A | 6/2012 |
| JP | 2012124009 A | 6/2012 |
| JP | 2012226866 A | 11/2012 |
| JP | 2012533865 A | 12/2012 |
| JP | 2013055193 A | 3/2013 |
| JP | 2013537361 A | 9/2013 |
| JP | 2014154337 A | 8/2014 |
| JP | 2014526114 A | 10/2014 |
| JP | 2016510936 A | 4/2016 |
| JP | 2016522557 A | 7/2016 |
| JP | 2016535392 A | 11/2016 |
| JP | 2017073270 A | 4/2017 |
| KR | 20120059106 A | 6/2012 |
| KR | 20140036660 A | 3/2014 |
| KR | 20200056715 A | 5/2020 |
| RU | 2031491 C1 | 3/1995 |
| RU | 2013111960 A | 10/2014 |
| SG | 188400 A1 | 4/2013 |
| WO | WO-9965642 A1 | 12/1999 |
| WO | WO-0005774 A1 | 2/2000 |
| WO | WO-2008045996 A2 | 4/2008 |
| WO | WO-2008105807 A2 | 9/2008 |
| WO | WO-2008105811 A2 | 9/2008 |
| WO | WO-2008045996 A3 | 10/2008 |
| WO | WO-2008105811 A3 | 12/2008 |
| WO | WO-2009046533 A1 | 4/2009 |
| WO | WO-2009151639 A1 | 12/2009 |
| WO | WO-2010130583 A2 | 11/2010 |
| WO | WO-2011011056 A2 | 1/2011 |
| WO | WO-2011014242 A1 | 2/2011 |
| WO | WO-2011014243 A1 | 2/2011 |
| WO | WO-2011022390 A2 | 2/2011 |
| WO | WO-2011025574 A1 | 3/2011 |
| WO | WO-2011047067 A2 | 4/2011 |
| WO | WO-2011022390 A3 | 5/2011 |
| WO | WO-2011050924 A1 | 5/2011 |
| WO | WO-2011079548 A1 | 7/2011 |
| WO | WO-2011082659 A1 | 7/2011 |
| WO | WO-2011047067 A3 | 8/2011 |
| WO | WO-2011100686 A1 | 8/2011 |
| WO | WO-2011116236 A2 | 9/2011 |
| WO | WO-2011148347 A1 | 12/2011 |
| WO | WO-2011153312 A2 | 12/2011 |
| WO | WO-2012003649 A1 | 1/2012 |
| WO | WO-2012009145 A2 | 1/2012 |
| WO | WO-2012033692 A2 | 3/2012 |
| WO | WO-2012040176 A1 | 3/2012 |
| WO | WO-2011153312 A3 | 4/2012 |
| WO | WO-2012009145 A3 | 4/2012 |
| WO | WO-2012051790 A1 | 4/2012 |
| WO | WO-2012033692 A3 | 6/2012 |
| WO | WO-2012129827 A1 | 10/2012 |
| WO | WO-2012138576 A1 | 10/2012 |
| WO | WO-2012144344 A1 | 10/2012 |
| WO | WO-2012145314 A2 | 10/2012 |
| WO | WO-2012158751 A1 | 11/2012 |
| WO | WO-2012158781 A2 | 11/2012 |
| WO | WO-2013025608 A1 | 2/2013 |
| WO | WO-2013032667 A1 | 3/2013 |
| WO | WO-2013048704 A1 | 4/2013 |
| WO | WO-2013052494 A1 | 4/2013 |
| WO | WO-2014055873 A1 | 4/2014 |
| WO | WO-2014062702 A1 | 4/2014 |
| WO | WO-2014062706 A1 | 4/2014 |
| WO | WO-2014140792 A2 | 9/2014 |
| WO | WO-2014190318 A1 | 11/2014 |
| WO | WO-2015042295 A1 | 3/2015 |
| WO | WO-2015058010 A1 | 4/2015 |
| WO | WO-2015058165 A1 | 4/2015 |
| WO | WO-2015063588 A2 | 5/2015 |
| WO | WO-2015066359 A1 | 5/2015 |
| WO | WO-2016050329 A1 | 4/2016 |
| WO | WO-2016138499 A1 | 9/2016 |
| WO | WO-2016141354 A2 | 9/2016 |
| WO | WO-2018052797 | 3/2018 |
| WO | WO-2018187777 | 11/2018 |
| WO | WO-2020131617 A1 | 6/2020 |
| WO | WO-2021050987 A1 | 3/2021 |
| WO | WO-2021098761 A1 | 5/2021 |

OTHER PUBLICATIONS

Advisory Action Before Filing of Appeal Brief dated Jun. 8, 2012 for U.S. Appl. No. 12/839,130.

Agruss. The Thermally Regenarative Liquid-Metal Cell, J. Electrochem. Soc. Nov. 1963; 110(11):1097-1103.

Allanore, A. Features and Challenges of Molten Oxide Electrolytes for Metal Extraction. Journal of the Electrochemical Society, 162 (1): E13-E22 (2015). Published Nov. 25, 2014.

Allanore, et al. A new anode material for oxygen evolution in molten oxide electrolysis. Nature, vol. 497, May 16, 2013, pp. 353-356 and Online Methods Section. Published online May 8, 2013.

ATI Technical Data Sheet, ATI 18CrCb Stainless Steel, Feb. 17, 2014.

Atthey. A Mathematical Model for Fluid Flow in a Weld Pool at High Currents. J. Fluid Mech. 1980; 98(4):787-801.

Biswas, et al. Towards Implementation of Smart Grid: An Updated Review on Electrical Energy Storage Systems. Smart Grid and Renewable Energy. 2013; 4:122-132. Published online Feb. 2013.

Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.

Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.

(56) References Cited

OTHER PUBLICATIONS

Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.

Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.

Bradwell. Liquid metal batteries: ambipolar electrolysis and alkaline earth electroalloying cells. Thesis. Massachusetts Institute of Technology. Dept. of Materials Science and Engineering. 2011.

Bradwell. Technical and economic feasibility of a high-temperature self-assembling battery. Thesis. Department of Material Science and Engineering. MIT. 2006.

Cairns, et al. Galvanic Cells with Fused-Salt Electrolytes. AEC Research and Development. 220 pages, Nov. 1967.

Cairns, et al. High Temperature Batteries Research in high-temperature electrochemistry reveals compact, powerful energy-storage cells. Science. Jun. 20, 1969; 164(3886):1347-1355.

Cerablak™ technology. Atfi Surface Science Solutions. http://www.atfinet.com/index.php/technology. Accessed Feb. 24, 2016.

Chuang. Floating capacitor active charge balancing for PHEV application. Thesis. Ohio State University. 2010.

Co-pending U.S. Appl. No. 15/628,538, inventor Bradwell; David J., filed Jun. 20, 2017.

Co-pending U.S. Appl. No. 16/740,178, inventors Nayarhari et al., filed Jan. 10, 2020.

Co-pending U.S. Appl. No. 17/136,432, inventors Nayarhari et al., filed Dec. 29, 2020.

Co-pending U.S. Appl. No. 18/141,041, inventors Bradwelldavid; J. et al., filed Apr. 28, 2023.

Co-pending U.S. Appl. No. 18/203,822, inventors Bradwell; David J. et al., filed May 31, 2023.

Co-pending U.S. Appl. No. 202318381512, inventors Thompson; Greg et al., filed Oct. 18, 2023.

Crowley, B. New battery could be solar power's BFF video. http://money.cnn.com/video/technology/2012/08/16/bsg-liquid-metal-battery-energy.cnnmoney. CNN Money, 2012. Accessed Jun. 29, 2015.

Cubicciotti, et al. Metal-Salt Interactions at High Temperatures: The Solubilities of Some alkaline Earth Metals in their Halides. J. Am. Chem. Soc. 1949; 71(6):2149-2153.

Davis, J.R., Effect of temperature on properties. ASM specialty handbook—Copper and copper alloys. ASM international. 2001: pp. 430-439.

Donald Sadoway: The Colbert Report video. http://thecolbertreport.cc.com/videos/8uddyg/donald-sadoway. The Colbert Report, Oct. 22, 2012. Accessed Jun. 29, 2015.

Donald Sadoway: The missing link to renewable energy Youtube Video. https://www.youtube.com/watch?v=Sddb0Khx0yA. TED, Mar. 2012. Accessed Jun. 29, 2015.

Dworkin, et al. The Electrical Conductivity of Solutions of Metals in their Molten Halides. VIII. alkaline Earth Metal Systems. J. Phys. Chem. Jul. 1966; 70(7):2384.

Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.

Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.

Energy 2064 with Professor Donald R. Sadoway Youtube Video. https://www.youtube.com/watch?v=0iwG32R2R5o. Alger, Oct. 7, 2014. Accessed Jun. 29, 2015.

EP17851347.9 Extended European Search Report Dated Mar. 16, 2020.

EP18194103.0 Extended European Search Report dated Mar. 29, 2019.

EP18781400.9 Examination report dated Feb. 24, 2022.

EP18781400.9 Extended European Search Report dated Dec. 11, 2020.

EP19901138.8 Extended European Search Report dated Sep. 5, 2022.

"European Extended Search Report and opinion dated May 29, 2017 for EP Application No. 14857245."

European search report and search opinion dated Feb. 12, 2014 for EP Application No. 13196841.4.

European search report and search opinion dated May 6, 2016 for EP Application No. 13847926.

European search report and search opinion dated May 13, 2016 for EP Application No. 13846301.

European supplemental search report and opinion dated Mar. 16, 2017 for EP Application No. 14853610.

Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.

Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.

GE Energy Storage Durathon Battery Durathon E620 Battery Module Technical Specifications. Avallable at http://www.geenergystorage.com/images/ge/PDF/DurathonGridE620ModuleSpecSheet.pdf. 2012, Accessed on Oct. 18, 2012.

GE Energy Storage Durathon DC System Technical Specifications—MWh Series, 2014. Accessed Apr. 7, 2015. https://renewables.gepower.com/content/dam/gepower-renewables/global/en_US/documents/Durathon_DCMWh_Spec_Sheet_GEA-988123002A.pdf.

Hall-heroult cell. Wikimedia Commons. Accessed Nov. 10, 2014. http://commons.wikimedia.org/wiki/File:Hall-heroult-kk-2008-12-31.png. Dec. 30, 2008.

Intermetallic—Wikipedia Website. https://en.wikipedia.org/wiki/Intermetallic. Accessed Jul. 2, 2015.

International preliminary report on patentability and written opinion dated Jan. 24, 2012 for PCT Application No. US2010/002035.

International preliminary report on patentability and written opinion dated Feb. 17, 2009 for PCT Application No. US2007/018168.

International preliminary report on patentability and written opinion dated Mar. 26, 2013 for PCT Application No. US2011/052316.

International preliminary report on patentability and written opinion dated Apr. 7, 2015 for PCT Application No. US2013/063472.

International preliminary report on patentability and written opinion dated Apr. 21, 2015 for PCT Application No. US2013/065086.

International preliminary report on patentability and written opinion dated Apr. 21, 2015 for PCT Application No. US2013/065092.

International preliminary report on patentability and written opinion dated Sep. 15, 2015 for PCT Application No. IB2014/000617.

International preliminary report on patentability and written opinion dated Nov. 24, 2015 for PCT Application No. US2014/039439.

International preliminary report on patentability dated Mar. 31, 2016 for PCT Application No. PCT/US2014/056367.

International preliminary report on patentability dated Apr. 28, 2016 for PCT Application No. PCT/US2014/060979.

International preliminary report on patentability dated Apr. 28, 2016 for PCT Application No. PCT/US2014/061266.

International preliminary report on patentability dated May 12, 2016 for PCT Application No. PCT/US2014/0063222.

International search report and written opinion dated Jan. 22, 2015 for PCT Application No. US2014/061266.

International search report and written opinion dated Jan. 23, 2015 for PCT Application No. PCT/US2014/056367.

International search report and written opinion dated Jan. 24, 2014 for PCT/US2013/065086.

International search report and written opinion dated Jan. 27, 2014 for PCT Application No. US2013/063472.

International search report and written opinion dated Jan. 29, 2015 for PCT Application No. US2014/060979.

International search report and written opinion dated Feb. 7, 2011 for PCT/US2010/002035.

(56) References Cited

OTHER PUBLICATIONS

International search report and written opinion dated Jun. 1, 2016 for PCT/US2016/019970.
International search report and written opinion dated Jun. 11, 2015 for PCT Application No. IB2014/002608.
International search report and written opinion dated Sep. 7, 2016 for PCT/US2016/021048.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Jarret, et al. Advances in the Smelting of aluminum. Metallurgical Treatises, pp. 137-157, 1981.
Javadekar, et al. Energy Storage in Electrochemical Cells with Molten Sb Electrodes. Journal of the Electrochemical Society, 159 (4) A386-A389 (2012); Jan. 24, 2012 http://repository.upenn.edu/cgi/viewcontent.cgi?article=1170&context=cbe_papers.
JPH1012270 English translation. Udou et al. Japan. Jan. 16, 1998.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015). Published Dec. 31, 2014.
Kaufman, J.G., Application of aluminum alloys and tempers. Introduction to aluminum alloys and tempers—Preface. ASM International. 2000; pp. 87-118.
Kaufman, J.G., Properties and Characteristics of Aluminum and Aluminum Alloys. Fire Resistance of Aluminum and Aluminum Alloys and Measuring the Effects of Fire Exposure on the Properties of Aluminum Alloys. 2016. 9 Pages.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Electrolysis of Molten Iron Oxide with an Iridium Anode: The Role of Electrolyte Basicity. Journal of the Electrochemical Society, 158 (10) E101-E105 (2011). Published Aug. 5, 2011.
Kim, et al. Liquid Metal Batteries: Past, Present, and Future. Chemical Reviews, vol. 113, No. 3, Mar. 13, 2013, pp. 2075-2099. Published on web Nov. 27, 2012.
Kipouros, et al. Toward new technologies for the production of Lithium. JOM, May 1998, pp. 24-26.
Lalau, et al. Sodium-bismuth-lead low temperature liquid metal battery. Journal for Electrochemistry and Plating Technology, Jun. 2015, pp. 1-7.
Lee, et al., Oxidation Behavior of Copper at a Temperature below 300 ° C. and the Methodology for Passivation. Materials Research. 2016; 19(1): 51-56.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016.With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Liquid Metal Battery Research Company website. http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
McAlister, A. J. The Al—Li (Aluminum-Lithium) System. Bulletin of Alloy Phase Diagrams, vol. 3, No. 2, 1982, pp. 177-178. doi: 10.1007/BF02892377.
Merriam-Webster's Medical Dictionary Website. http://merriam-webster.com/medical/room%20temperature. Apr. 2009.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sources 275 (2015) 370-376. Available online Oct. 29, 2014.
Norbert Weber et al., Sloshing instability and electrolyte layer rupture in liquid metal batteries. arxiv.org, Cornell university library, 201 Olin library cornell university ithaca, NY 14853, Dec. 12, 2016, XP081362128.
Notice of allowance dated Jan. 6, 2015 for U.S. Appl. No. 13/237,215.
Notice of allowance dated Jan. 11, 2018 for U.S. Appl. No. 15/136,337.
Notice of allowance dated Mar. 8, 2016 for U.S. Appl. No. 13/801,333.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
"Notice of allowance dated May 11, 2017 for U.S. Appl. No. 14/688,214".
Notice of allowance dated Jul. 5, 2016 for U.S. Appl. No. 14/178,806.
Notice of allowance dated Jul. 13, 2012 for U.S. Appl. No. 11/839,413.
"Notice of allowance dated Jul. 17, 2017 for U.S. Appl. No. 14/688,214".
Notice of allowance dated Jul. 25, 2016 for U.S. Appl. No. 14/286,369.
"Notice of allowance dated Jul. 28, 2017 for U.S. Appl. No. 14/688,214".
Notice of allowance dated Jul. 31, 2015 for U.S. Appl. No. 13/801,333.
Notice of allowance dated Aug. 2, 2012 for U.S. Appl. No. 12/505,937.
Notice of allowance dated Aug. 22, 2016 for U.S. Appl. No. 14/536,549.
"Notice of allowance dated Sep. 11, 2017 for U.S. Appl. No. 15/289,857".
Notice of allowance dated Sep. 18, 2015 for U.S. Appl. No. 13/801,333.
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 7, 2016 for U.S. Appl. No. 14/178,806.
Notice of allowance dated Oct. 19, 2017 for U.S. Appl. No. 14/688,214.
Notice of allowance dated Nov. 17, 2017 for U.S. Appl. No. 15/136,337.
Notice of allowance dated Dec. 11, 2015 for U.S. Appl. No. 13/801,333.
Notice of allowance dated Dec. 20, 2017 for U.S. Appl. No. 15/136,337.

(56) References Cited

OTHER PUBLICATIONS

Notice of allowance dated Mar. 22, 2017 for U.S. Appl. No. 14/536,563.
"Notice of allowance dated Aug. 31, 2018 for U.S. Appl. No. 15/057,732".
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS a Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation BMS. Grid Battery Controller Battery Management Solution for Multi-Stack Grid-Scale Energy Storage Systems. 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Office action—Requirement for Restriction Election dated Aug. 13, 2015 for U.S. Appl. No. 14/045,967.
Office action dated Jan. 5, 2012 for U.S. Appl. No. 12/839,130.
Office action dated Jan. 10, 2014 for U.S. Appl. No. 12/839,130.
"Office action dated Feb. 5, 2016 for U.S. Appl. No. 14/536,549."
Office action dated Mar. 14, 2014 for U.S. Appl. No. 13/237,215.
Office action dated Mar. 16, 2012 for U.S. Appl. No. 12/839,130.
"Office action dated Mar. 27, 18 for U.S. Appl. No. 15/140,434."
"Office action dated Apr. 18, 2018 for U.S. Appl. No. 14/975,587."
"Office action dated Apr. 20, 2018 for U.S. Appl. No. 15/057,732."
"Office action dated May 1, 2017 for U.S. Appl. No. 14/678,602."
Office action dated May 13, 2011 for U.S. Appl. No. 11/839,413.
Office action dated Jun. 7, 2016 for U.S. Appl. No. 14/045,967.
"Office action dated Jun. 7, 2018 for U.S. Appl. No. 14/687,838."
"Office action dated Jun. 15, 2017 for U.S. Appl. No. 14/687,838".
"Office action dated Jun. 25, 2018 for U.S. Appl. No. 15/063,842."
Office action dated Jun. 30, 2016 for U.S. Appl. No. 14/536,563.
Office action dated Aug. 21, 2014 for U.S. Appl. No. 12/839,130.
"Office action dated Aug. 30, 2017 for U.S. Appl. No. 14/975,587".
Office action dated Sep. 3, 2014 for U.S. Appl. No. 13/801,333.
"Office action dated Sep. 5, 2017 for U.S. Appl. No. 15/140,434".
Office action dated Oct. 4, 2011 for U.S. Appl. No. 11/839,413.
Office action dated Nov. 5, 2015 for U.S. Appl. No. 14/178,806.
Office action dated Nov. 9, 2015 for U.S. Appl. No. 14/286,369.
Office action dated Nov. 13, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Office action dated Nov. 24, 2015 for U.S. Appl. No. 14/045,967.
Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of the Electrochemical Society. 2014; 161(12):A1898-A1904. Published Sep. 9, 2014.
Ouchi, et al. Calcium-based multi-element chemistry for grid-scale electrochemical energy storage. Nat Commun. Mar. 22, 2016;7:10999. doi: 10.1038/ncomms10999.With supplementary materials.
"Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html".
PCT/US2017/050544 International Search Report dated Apr. 25, 2018.
PCT/US2018/026601 International Search Report dated Jul. 30, 2018.
PCT/US2019/066231 International Search Report and Written Opinion dated Mar. 2, 2020.
PCT/US2020/050547 International Preliminary Report on Patentability dated Mar. 24, 2022.
PCT/US2020/050547 International Search Report and Written Opinon dated Dec. 24, 2020.
PCT/US2023/011761 International Search Report and Written Opinion dated May 18, 2023.
Pflanz, K. A Liquid Layer Solution for the Grid. http://energy.gov/articles/liquid-layer-solution-grid. Sep. 15, 2011. Accessed Jul. 2, 2015.
Poizeau, Sophie, Thermodynamic properties and atomic structure of Ca-based liquid alloys, PhD Thesis, Massachusetts Institute of Technology, pp. 1-164, Feb. 2013.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Response After Final Rejection dated Apr. 27, 2012 for U.S. Appl. No. 12/839,130.
RU2031491C1 English translation. Nikolaev et al., Russia. Mar. 20, 1995.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-07IBS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.
Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Shannon. Revised effective ionic radii and systematic studies of interatomic distances in halides and chalcogenides. Acta Crystallographica Section A: Crystal Physics, Diffraction, Theoretical and General Crystallography. Mar. 9, 1976; A32:751-767.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Shimotake, et al. Secondary Cells with Lithium Anodes and Immobilized Fused-Salt Electrolytes. I & EC ProcessDesign and Development, vol. 8, No. 1, Jan. 1969, pp. 51-56.

(56) References Cited

OTHER PUBLICATIONS

Sodium Sulfur-Battery Definition; Wikipedia website. Accessed Sep. 3, 2015. https://en.wikipedia.org/wiki/Sodium%E2%80%93sulfur_battery.
Spatocco, et al. Cost-based discovery for engineering solutions. pp. 1-43. Adv. in Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22-2012-donald-sadoway.
U.S. Appl. No. 15/647,468 Notice of Allowance dated Oct. 2, 2019.
U.S. Appl. No. 17/670,168 Notice of Allowance dated Oct. 25, 2023.
U.S. Appl. No. 14/687,838 Notice of Allowance dated Nov. 26, 2019.
U.S. Appl. No. 14/975,587 Notice of Allowance dated Jan. 9, 2019.
U.S. Appl. No. 14/975,587 Notice of Allowance dated Mar. 15, 2019.
U.S. Appl. No. 14/975,587 Notice of Allowance dated Oct. 9, 2018.
U.S. Appl. No. 15/057,732 Notice of Allowance dated Oct. 10, 2018.
U.S. Appl. No. 15/063,842 Office Action dated Feb. 17, 2021.
U.S. Appl. No. 15/063,842 Office Action dated Feb. 26, 2019.
U.S. Appl. No. 15/063,842 Office Action dated May 27, 2020.
U.S. Appl. No. 15/063,842 Office Action dated Sep. 20, 2019.
U.S. Appl. No. 15/130,129 Office Action dated Dec. 6, 2018.
U.S. Appl. No. 15/130,129 Office Action dated Jul. 3, 2019.
U.S. Appl. No. 15/130,129 Office Action dated Jul. 9, 2020.
U.S. Appl. No. 15/130,292 Office Action dated Jan. 24, 2020.
U.S. Appl. No. 15/130,292 Office Action dated Mar. 20, 2019.
U.S. Appl. No. 15/130,292 Office Action dated Nov. 19, 2018.
U.S. Appl. No. 15/140,434 Office Action dated Jun. 12, 2019.
U.S. Appl. No. 15/140,434 Office Action dated Sep. 19, 2018.
U.S. Appl. No. 15/647,468 Notice of Allowance dated Oct. 24, 2019.
U.S. Appl. No. 15/647,468 Office Action dated Jun. 5, 2019.
U.S. Appl. No. 15/690,863 Notice of Allowance dated Jan. 22, 2020.
U.S. Appl. No. 15/690,863 Office Action dated May 17, 2019.
U.S. Appl. No. 15/836,038 Notice of Allowance dated Jan. 9, 2019.
U.S. Appl. No. 16/202,758 Notice of Allowance dated Nov. 8, 2019.
U.S. Appl. No. 16/202,758 Notice of Allowance dated Oct. 7, 2019.
U.S. Appl. No. 16/293,288 Office Action dated Feb. 13, 2023.
U.S. Appl. No. 16/293,288 Office Action dated May 13, 2022.
U.S. Appl. No. 16/293,288 Office Action dated Sep. 12, 2022.
U.S. Appl. No. 16/293,288 Office Action dated Sep. 28, 2021.
U.S. Appl. No. 16/592,621 Notice of Allowance dated Feb. 23, 2022.
U.S. Appl. No. 16/592,621 Office Action dated Jul. 6, 2021.
U.S. Appl. No. 16/593,278 Notice of Allowance dated Apr. 7, 2022.
U.S. Appl. No. 16/593,278 Notice of Allowance dated Mar. 24, 2022.
U.S. Appl. No. 16/718,020 Notice of Allowance dated Jul. 28, 2021.
U.S. Appl. No. 16/829,965 Notice of Allowance Nov. 19, 2021.
U.S. Appl. No. 16/858,189 Notice of Allowance dated Aug. 18, 2021.
U.S. Appl. No. 17/404,341 Office Action dated Mar. 10, 2023.
U.S. Appl. No. 17/510,056 Notice of Allowance dated Jun. 22, 2023.
U.S. Appl. No. 17/510,056 Notice of Allowance dated Mar. 3, 2023.
U.S. Appl. No. 17/510,056 Office Action dated Sep. 23, 2022.
U.S. Appl. No. 17/529,171 Notice of Allowance dated Nov. 10, 2022.
U.S. Appl. No. 17/670,168 Notice of Allowance dated Jul. 19, 2023.
U.S. Appl. No. 17/670,168 Office Action dated Mar. 7, 2023.
U.S. Appl. No. 17/747,333 Notice of Allowance dated Feb. 1, 2023.
U.S. Appl. No. 18/166,814 Notice of Allowance dated Oct. 12, 2023.
U.S. Appl. No. 18/196,225 Notice of Allowance dated Aug. 24, 2023.
U.S. Appl. No. 18/218,412 Office Action dated Aug. 24, 2023.
Vassiliev, et al. A new proposal for the binary (Sn, Sb) phase diagram and its thermodynamic properties based on a new e.m.f study Journal of Alloys and Compounds 247 (1997) 223-233.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage. Nature. Oct. 16, 2014;514(7522):348-50. doi: 10.1038/nature13700. Epub Sep. 21, 2014.
Wang, et al., Thermal runaway caused fire and explosion of lithium ION battery. Journal of Power Sources, 2012; 208: 210-224.
Weaver, et al. The Sodium1Tin Liquid-Metal Cell. J. Electrochem. Soc., 109 (8), 653-657 (Aug. 1962).
Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Yu, et al. Determination of the Lithium Ion Diffusion Coefficient in Graphite. J. Electrochem. Soc. 1999 volume 146, issue 1, 8-14.
Zhang; et al. Pyrite $FeS_2$ as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.
English machine translation of Claus (DE 102012103386 A1) (Year: 2013).
English machine translation of Koji et al. (JP 2012226866 A) (Year: 2012).
English machine translation of Tinguely et al. (EP 2665120 A1) (Year: 2013).
Huang, Ling. et al. Electrodeposition and lithium storage performance of novel three-dimensional porous Fe—Sb—P amorphous alloy electrode. Electrochemistry Communications 11(3):585-588 (2009).
Shen, et al. Thermal convection in a liquid metal battery. Theoretical and Computational Fluid Dynamics (2015): 1-20.
U.S. Appl. No. 14/210,051 Office Action dated Dec. 1, 2014.
U.S. Appl. No. 14/210,051 Office Action dated Jul. 31, 2015.
U.S. Appl. No. 15/130,129 Office Action dated Apr. 4, 2018.
U.S. Appl. No. 15/130,129 Office Action dated Sep. 15, 2017.
U.S. Appl. No. 15/130,292 Office Action dated Jul. 13, 2018.
U.S. Appl. No. 15/140,434 Office Action dated May 19, 2017.
U.S. Appl. No. 17/344,527 Office Action dated Dec. 13, 2023.
U.S. Appl. No. 17/399,724 Office Action dated Aug. 29, 2024.

* cited by examiner

A

B

C

ELECTROCHEMICAL ENERGY STORAGE DEVICES

CROSS-REFERENCE

The present application is a continuation of U.S. patent application Ser. No. 17/404,341, which is a continuation-in-part of U.S. patent application Ser. No. 15/063,842, filed Mar. 8, 2016, which is a continuation of International Application No. PCT/US2014/056367, filed Sep. 18, 2014, which claims the benefit of U.S. Provisional Patent Application No. 61/879,349, filed Sep. 18, 2013, each of which is entirely incorporated herein by reference.

BACKGROUND

A battery is a device capable of converting chemical energy into electrical energy. Batteries are used in many household and industrial applications. In some instances, batteries are rechargeable such that electrical energy, which may be converted from non-electrical energy (e.g., mechanical energy), is capable of being stored in the battery as chemical energy.

SUMMARY

A liquid metal energy storage device (or battery) can include a negative electrode, electrolyte and positive electrode, at least some of which may be in the liquid state during operation of the energy storage device. The battery is generally made up of a number of (electrochemical) cells. Most batteries use the cell housing as electrically insulating material.

The disclosure provides cell housings and cell packs that are designed to serve both electrical and structural functions. Cell housing side walls can be directly joined together to create parallel connections within a module of cells. The series connections can be formed by stacking one cell on top of another cell, thus connecting the opposing polarity terminals of the two cells. The cells can be designed to support the weight of the cells above without the use of significant additional framework. This approach can reduce tertiary interconnection mechanisms and/or the number of components required to electrically connect and structurally support cells, thus providing increased system efficiency and/or a reduced system cost.

An aspect of the disclosure relates to a liquid metal battery, comprising: (a) a plurality of electrochemical cells each comprising an electrically conductive housing and a conductor in electrical communication with a current collector, the electrically conductive housing comprising a negative electrode, electrolyte and positive electrode, wherein at least one of the negative electrode, electrolyte and positive electrode are in a liquid state at an operating temperature of the cell, wherein the conductor protrudes through the electrically conductive housing through an aperture in the electrically conductive housing and is electrically isolated from the electrically conductive housing with a seal, and wherein the plurality of electrochemical cells are stacked in series with the conductor of a first cell in electrical contact with the electrically conductive housing of a second cell; and (b) a plurality of non-gaseous spacers disposed between the electrochemical cells. At least 3 electrochemical cells can be stacked in series. The electrochemical cells can be stacked vertically. A thickness of each spacer can be approximately equal to a distance that the conductor protrudes through the electrically conductive housing. A displacement between the negative electrode and the positive electrode can be determined by the non-gaseous spacers. A force applied to the seal can be less than about 45 Newtons. At least 90% of a force applied to the first cell can be applied to the non-gaseous spacers and/or the electrically conductive housing of the first cell. The spacers can be electrically insulating. The spacers can comprise a ceramic material. The conductor of the first cell can be brazed to the electrically conductive housing of the second cell. The conductor of the first cell can sit in a recessed portion of the electrically conductive housing of the second cell, wherein a coefficient of thermal expansion (CTE) of the conductor can be greater than a CTE of the electrically conductive housing. In some cases, the electrochemical cells that are connected in series are not connected by wires. The electrically conductive housings can be part of a current conducting pathway. The resistance of each cell-to-cell series connection can be less than about 100 mOhm. The resistance can be measured by a direct electrical connection between the conductor of the first electrochemical cell and the electrically conducting housing of the second cell. In some cases, the battery further comprises at least one additional electrochemical cell connected in parallel to each of the plurality of electrochemical cells that are stacked in series. The parallel connections can be made by creating the electrically conductive housing for multiple cells from one manufactured part. The parallel connections can be formed by interconnects that allow at least some of the electrochemical cells comprising the battery to be replaced without breaking a direct metal-to-metal joint. The parallel connections can be formed by welding together features in cell bodies of adjacent cells. In some cases, the battery comprises one interconnect for at least every four electrochemical cells. The battery can be capable of storing at least about 10 kWh of energy. The operating temperature can be at least about 250° C. In some cases, the negative electrode comprises an alkali or alkaline earth metal. The alkali or alkaline earth metal can be lithium, sodium, potassium, magnesium, calcium, or any combination thereof. In some cases, the positive electrodes comprises a Group 12 element. The Group 12 element can be zinc, cadmium or mercury. In some cases, the positive electrode further comprises one or more of tin, lead, bismuth, antimony, tellurium and selenium. In some cases, the electrolyte comprises a salt of an alkali or alkaline earth metal. In some cases, each cell operates at a charge cutoff voltage of at least about 1.0 V after at least about 300 charge/discharge cycles. In some cases, each cell operates at a charge cutoff voltage of at least about 1.7 V after at least about 100 charge/discharge cycles. In some cases, the battery further comprises a current transfer plate welded to the conductor of the first cell and the electrically conductive housing of the second cell.

Another aspect of the disclosure is directed to an electrochemical energy storage system, comprising at least a first electrochemical cell adjacent to a second electrochemical cell, each of the first and second electrochemical cells comprising a negative current collector, negative electrode, electrolyte, positive electrode and a positive currently collector, wherein at least one of the negative electrode, electrolyte and positive electrode is in a liquid state at an operating temperature of the first or second electrochemical cell, and wherein the positive current collector of the first electrochemical cell is direct metal-to-metal joined to the negative current collector of the second electrochemical second cell. The positive current collector of the first electrochemical cell can be direct metal-to-metal joined to the negative current collector of the second electrochemical second cell by a braze or a weld. In some cases, the first and second electrochemical cells are not connected by wires. The electrochemical energy storage system can be capable of storing at least about 10 kWh of energy. The electrochemical energy storage system can operate at a temperature of at least about 250° C. In some cases, the negative electrode comprises an alkali or alkaline earth metal. The alkali or alkaline earth metal can be lithium, sodium, potassium, magnesium, calcium, or any combination thereof. In some cases, the positive electrode comprises a Group 12 element. The Group 12 element can be zinc, cadmium or mercury. In some cases, the positive electrode further comprises one or more of tin, lead, bismuth, antimony, tellurium and selenium. In some cases, the electrolyte comprises a salt of an alkali or alkaline earth metal. In some cases, each cell operates at a charge cutoff voltage of at least about 1.0 V after at least about 300 charge/discharge cycles. In some cases, each cell operates at a charge cutoff voltage of at least about 1.7 V after at least about 100 charge/discharge cycles.

Another aspect of the disclosure relates to a battery comprising electrochemical cells connected in series, the battery comprising a plurality of modules each comprising electrochemical cells in a parallel configuration, wherein the battery is capable of storing at least about 10 kWh of energy, the battery has an operating temperature of at least about 250° C. and each of the electrochemical cells has at least one liquid metal electrode, wherein an internal resistance of the battery at the operating temperature is less than about $1.50*n*R$, where 'n' is the number of modules in the battery and 'R' is the resistance of each of the modules. n can be at least 3. In some cases, the internal resistance of the battery at the operating temperature is less than about $1.25*n*R$. In some cases, the internal resistance of the battery at the operating temperature is less than about $1.05*n*R$. In some cases, the battery comprises electrochemical cells connected in series and in parallel. In some cases, the liquid metal electrode comprises one or more Group 12 elements. The Group 12 elements can be zinc, cadmium or mercury. In some cases, the liquid metal electrode further comprises one or more of tin, lead, bismuth, antimony, tellurium and selenium. In some cases, the liquid metal electrode comprises one or more alkali metals. In some cases, the liquid metal electrode comprises one or more alkaline earth metals. In some cases, the liquid metal electrode comprises lithium, sodium, potassium, magnesium, calcium, or any combination thereof. In some cases, the electrochemical cells are not connected with wires. In some cases, the battery is capable of storing at least about 10 kWh of energy. In some cases, the battery is capable of storing at least about 100 kWh of energy.

A further aspect of the disclosure relates to a liquid metal battery comprising: (a) a plurality of electrochemical cells connected in series and parallel, wherein each of the electrochemical cells comprises a negative electrode, electrolyte and positive electrode, wherein at least one of the negative electrode, electrolyte and positive electrode is in a liquid state at an operating temperature of the electrochemical cell; (b) a plurality of wires each having a first end and a second end; and (c) a common single point connector in electrical communication with at least one of the electrochemical cells, wherein each of the first ends of the wires is connected to the common single point connector. The single point connector can be connected to a busbar that is in electrical communication with the at least one of the electrochemical cells, a cell body that is in electrical communication with the at least one of the electrochemical cells or a feature in the cell body that is in electrical communication with the at least one of the electrochemical cells. The feature in the cell body can be a tab protruding from the cell body. At least one of the second ends of the wires can be connected to control circuitry. The at least one of the second ends of the wires can be connected to a battery management system. At least one of the second ends of the wires can be connected to another common single point connector. The common single point connector can form an electrical connection with another plurality of electrochemical cells. At least 3 wires can be connected to the single point connector. In some cases, the single point connector comprises a bent nickel piece. The first ends of the wires can be passed through holes in the bent nickel piece and/or welded to the bent nickel piece.

A further aspect of the disclosure is directed to a liquid metal battery comprising: (a) a first plurality of electrochemical cells connected in parallel, wherein each of the electrochemical cells comprises a negative electrode, electrolyte and positive electrode, wherein at least one of the negative electrode, electrolyte and positive electrode is in a liquid state at an operating temperature of the electrochemical cell; and (b) a busbar in electrical communication with the first plurality of electrochemical cells, wherein the busbar comprises a conductive material. The conductive material can comprise copper, and the liquid metal battery can operate at a temperature of less than about 450° C. In some cases, the conductive material comprises an aluminum-copper alloy. The aluminum-copper alloy can have an electrical conductivity at an operating temperature of the liquid metal battery of at least about $2\times10^6$ S/m. The aluminum-copper alloy can be coated with an oxidation-resistant material. The oxidation-resistant material can be aluminum, aluminum-bronze, aluminum-brass, chromium, nickel, stainless steel, or any combination thereof. In some cases, the conductive material comprises an alloy of at least about 1 weight-percent aluminum with copper, bronze or brass. The conductive material can have an electrical conductivity greater than about $2\times10^6$ S/m at 20° C. or greater than about $1\times10^6$ S/m at 500° C. In some cases, the conductive material comprises stainless steel. In some cases, the conductive material comprises nickel. In some cases, the conductive material is a non-ferrous alloy. The busbar can be joined to a stainless steel end-cap. The busbar can be brazed, press-fit or welded to a stainless steel end-cap. Compared to the conductive material, the end-cap can be more easily welded to another busbar, an interconnect or an electrochemical cell. In some cases, the first plurality of electrochemical cells further comprises electrochemical cells connected in series. In some cases, the first plurality of electrochemical cells comprises a parallel string of packs. The busbar can be an interconnect. In some cases, the liquid metal battery further comprises an interconnect that electrically connects the busbar of the first plurality of electrochemical cells with a second plurality of electrochemical cells, thereby placing the first plurality and the second plurality in parallel or in series. In some cases, the interconnect comprises the same conductive material as the busbar. The operating temperature can be at least about 250° C. An internal resistance between the first plurality of electrochemical cells and a second plurality of electrochemical cells connected to the busbar of the first plurality of electrochemical cells can be less than about 10 milliohm.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGs." herein), of which:

DETAILED DESCRIPTION

Figure 1:
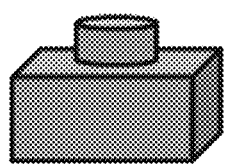
FIG. 1 is an illustration of an electrochemical cell (A) and a compilation (i.e., battery) of electrochemical cells (B and C)
Figure 1:
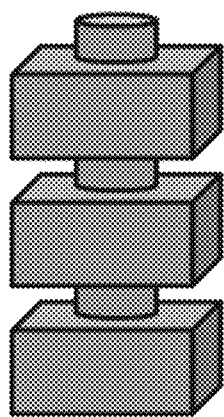
Figure 1:
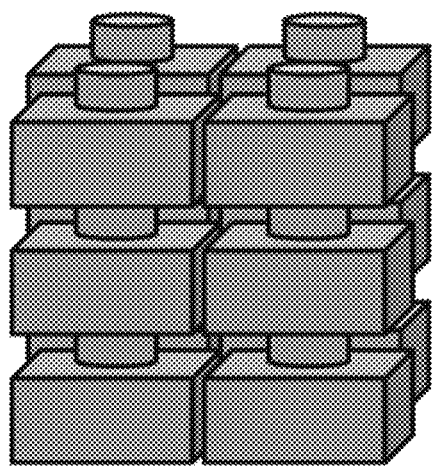

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed. It shall be understood that different aspects of the invention can be appreciated individually, collectively, or in combination with each other.

The term "cell," as used herein, generally refers to an electrochemical cell. A cell can include a negative electrode of material 'A' and a positive electrode of material 'B', denoted as A||B. The positive and negative electrodes can be separated by an electrolyte. A cell can also include a housing, one or more current collectors, and a high temperature electrically isolating seal. In some cases, a cell can be about 4 inches wide, about 4 inches deep and about 2.5 inches tall. In some cases, a cell can be about 8 inches wide, about 8 inches deep and about 2.5 inches tall. In some examples, any given dimension (e.g., height, width or depth) of an electrochemical cell can be about 1, 2, 2.5, 3, 3.5, 4, 4.5, 5, 5.5, 6, 6.5, 7, 7.5, 8, 8.5, 9, 9.5, 10, 12, 14, 16, 18 or 20 inches. In one example, a cell (e.g., each cell) can have dimensions of about 4 inches×4 inches×2.5 inches. In another example, a cell (e.g., each cell) can have dimensions of about 8 inches×8 inches×2.5 inches. In some cases, a cell may have about 70 Watt-hours of energy storage capacity. In some cases, a cell may have about 300 Watt-hours of energy storage capacity.

The term "module," as used herein, generally refers to cells that are attached together in parallel by, for example, mechanically connecting the cell housing of one cell with the cell housing of an adjacent cell (e.g., cells that are connected together in an approximately horizontal packing plane). In some cases, the cells are connected to each other by joining features that are part of and/or connected to the cell body (e.g., tabs protruding from the main portion of the cell body). A module can include a plurality of cells in parallel. A module can comprise any number of cells (e.g., 2, 3, 4, 5, 6, 7, 8, 9, 10, 11, 12, 13, 14, 15, 16, 17, 18, 19, 20, or more). In some cases, a module comprises 4, 9, 12, or 16 cells. In some cases, a module is capable of storing about 700 Watt-hours of energy and/or delivering about 175 Watts of power. In some cases, a module is capable of storing about 1080 Watt-hours of energy and/or delivering about 500 Watts of power. In some cases, a module is capable of storing about 1080 Watt-hours of energy and/or delivering at least about 200 Watts (e.g., about 500 Watts) of power. In some cases, a module can include a single cell.

The term "pack," as used herein, generally refers to modules that are attached through different electrical connections (e.g., vertically). A pack can comprise any number of modules (e.g., 1, 2, 3, 4, 5, 6, 7, 8, 9, 10, 11, 12, 13, 14, 15, 16, 17, 18, 19, 20, or more). In some cases, a pack comprises 3 modules. In some cases, a pack is capable of storing about 2 kilo-Watt-hours of energy and/or delivering at least about 0.4 kilo-Watts (e.g., about 0.5 kilo-Watts or about 1.0 kilo-Watts) of power. In some cases, a pack is capable of storing about 3 kilo-Watt-hours of energy and/or delivering at least about 0.75 kilo-Watts (e.g., about 1.5 kilo-Watts) of power. In some cases, a pack comprises 6 modules. In some cases, a pack is capable of storing about 6 kilo-Watt-hours of energy and/or delivering at least about 1.5 kilo-Watts (e.g., about 3 kilo-Watts) of power.

The term "core," as used herein generally refers to a plurality of modules or packs that are attached through different electrical connections (e.g., in series and/or parallel). A core can comprise any number of modules or packs (e.g., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or more). In some cases, the core also comprises mechanical, electrical, and thermal systems that allow the core to efficiently store and return electrical energy in a controlled manner. In some cases, a core comprises 12 packs. In some cases, a core is capable of storing about 25 kilo-Watt-hours of energy and/or delivering about 6.25 kilo-Watts of power. In some cases, a core comprises 36 packs. In some cases, a core is capable of storing about 200 kilo-Watt-hours of energy and/or delivering at least about 40 kilo-Watts (e.g., at least or about 40, 50, 60, 70, 80, 90 or 100 kilo-Watts) of power.

The term "core enclosure", or "CE," as used herein, generally refers to a plurality of cores that are attached through different electrical connections (e.g., in series and/or parallel). A CE can comprise any number of cores (e.g., 1, 2, 3, 4, 5, 6, 7, 8, 9, 10, 11, 12, 13, 14, 15, 16, 17, 18, 19, 20, or more). In some cases, the CE contains cores that are connected in parallel with appropriate by-pass electronic circuitry, thus enabling a core to be disconnected while continuing to allow the other cores to store and return energy. In some cases, a CE comprises 4 cores. In some cases, a CE is capable of storing about 100 kilo-Watt-hours of energy and/or delivering about 25 kilo-Watts of power. In some cases, a CE is capable of storing about 400 kilo-Watt-hours of energy and/or delivering at least about 80 kilo-Watts (e.g., at least or about 80, 100, 120, 140, 160, 180 or 200 kilo-Watts) of power.

The term "system," as used herein, generally refers to a plurality of cores or CEs that are attached through different electrical connections (e.g., in series and/or parallel). A system can comprise any number of cores or CEs (e.g., 2, 3, 4, 5, 6, 7, 8, 9, 10, 11, 12, 13, 14, 15, 16, 17, 18, 19, 20, or more). In some cases, a system comprises 20 CEs. In some cases, a system is capable of storing about 2 mega-Watt-hours of energy and/or delivering at least about 400 kilo-Watts (e.g., about 500 kilo-Watts or about 1000 kilo-Watts) of power. In some cases, a system comprises 5 CEs. In some cases, a system is capable of storing about 2 mega-Watt-hours of energy and/or delivering at least about 400 kilo-Watts (e.g., at least or about 400, 500, 600, 700, 800, 900 or 1000 kilo-Watts) of power.

A group of cells (e.g., a core, a CE, a system, etc.) with a given energy capacity and power capacity (e.g., a CE or a system capable of storing a given amount of energy) may be configured to deliver at least about 10%, at least about 20%, at least about 30%, at least about 40%, at least about 50%, at least about 60%, at least about 70%, at least about 80%, at least about 90%, at least about 95%, or about 100% of a given (e.g., rated) power level. For example, a 1000 kW system may be capable of also operating at 500 kW, but a 500 kW system may not be able to operate at 1000 kW. In some cases, a system with a given energy capacity and power capacity (e.g., a CE or a system capable of storing a given amount of energy) may be configured to deliver less than about 100%, less than about 110%, less than about 125%, less than about 150%, less than about 175%, or less than about 200% of a given (e.g., rated) power level, and the like. For example, the system may be configured to provide more than its rated power capacity for a period of time that is less than the time it would take to consume its energy capacity at the power level that is being provided (e.g., provide power that is greater than the rated power of the system for a period of time corresponding to less than about 1%, less than about 10% or less than about 50% of its rated energy capacity).

The term "battery," as used herein, generally refers to one or more electrochemical cells connected in series and/or parallel. A battery can comprise any number of electrochemical cells, modules, packs, cores, CEs or systems.

The term "surface area," as used herein, generally refers to the geometric surface area of an object.

The term "direct metal-to-metal joining" or "direct metal-to-metal joint," as used herein, generally refers to an electrical connection where two metal surfaces are brought into contact (e.g., by forming a braze or a weld). In some examples, direct metal-to-metal joints do not include wires.

The term "interconnect," as used herein, generally refers to any electrical connection other than a direct metal-to-metal joint. Interconnects can include wires or bent sheet metal components designed to pass current. Interconnects may be compliant (e.g., flexible).

The term "wire," as used herein, generally refers to any cord, strip, or elongated electrical conduit. Wires can be flexible. As used herein, a braided metal strip is a wire. In some cases, a busbar is a wire.

The term "vertical," as used herein, generally refers to a direction that is parallel to the force of gravity.

The term "cycle," as used herein, generally refers to a charge/discharge or discharge/charge cycle.

The term "charge cutoff voltage" or "CCV," as used herein, generally refers to the voltage at which a cell is fully or substantially fully charged, such as a voltage cutoff limit used in a battery when cycled in a constant current mode.

The term "open circuit voltage" or "OCV," as used herein, generally refers to the voltage of a cell (e.g., fully or partially charged) when it is disconnected from any circuit or external load (i.e., when no current is flowing through the cell).

The term "voltage" or "cell voltage," as used herein, generally refers to the voltage of a cell (e.g., at any state of charge or charging/discharging condition). In some cases, voltage or cell voltage may be the open circuit voltage. In some cases, the voltage or cell voltage can be the voltage during charging or during discharging.

Voltages of the present disclosure may be taken or represented with respect to reference voltages, such as ground (0 V).

Electrochemical Cells, Devices and Systems

The present disclosure provides electrochemical energy storage devices (e.g., batteries) and systems. An electrochemical energy storage device generally includes at least one electrochemical cell, also "cell" and "battery cell" herein, sealed (e.g., hermetically sealed) within a housing. A cell can be configured to deliver electrical energy (e.g., electrons under potential) to a load, such as, for example, an electronic device, another energy storage device or a power grid.

An electrochemical cell of the disclosure can include a negative electrode, an electrolyte adjacent to the negative electrode, and a positive electrode adjacent to the electrolyte. The negative electrode can be separated from the positive electrode by the electrolyte. The negative electrode can be an anode during discharge. The positive electrode can be a cathode during discharge.

In some examples, an electrochemical cell is a liquid metal battery cell. In some examples, a liquid metal battery cell can include a liquid electrolyte arranged between a negative liquid (e.g., molten) metal electrode and a positive liquid (e.g., molten) metal, metalloid and/or non-metal electrode. In some cases, a liquid metal battery cell has a molten alkaline earth metal (e.g., magnesium, calcium) or alkali metal (e.g., lithium, sodium, potassium) negative electrode, an electrolyte, and a molten metal positive electrode. The molten metal positive electrode can include, for example, one or more of tin, lead, bismuth, antimony, tellurium and selenium. For example, the positive electrode can include Pb or a Pb—Sb alloy. The positive electrode can also include one or more transition metals or d-block elements (e.g., Zn, Cd, Hg) alone or in combination with other metals, metalloids or non-metals, such as, for example, a Zn—Sn alloy or Cd—Sn alloy. Any description of a metal or molten metal positive electrode, or a positive electrode, herein may refer to an electrode including one or more of a metal, a metalloid and a non-metal. The positive electrode may contain one or more of the listed examples of materials. In an example, the molten metal positive electrode can include lead and antimony. In some examples, the molten metal positive electrode may include an alkali or alkaline earth metal alloyed in the positive electrode.

In some examples, an electrochemical energy storage device includes a liquid metal negative electrode, a liquid metal positive electrode, and a liquid salt electrolyte separating the liquid metal negative electrode and the liquid metal positive electrode. The negative electrode can include an alkali or alkaline earth metal, such as lithium, sodium, potassium, rubidium, cesium, magnesium, barium, calcium, sodium, or combinations thereof. The positive electrode can include elements selected from transition metals or d-block elements (e.g., Group 12), Group IIIA, IVA, VA and VIA of the periodic table of the elements, such as zinc, cadmium, mercury, aluminum, gallium, indium, silicon, germanium, tin, lead, pnicogens (e.g., arsenic, bismuth and antimony), chalcogens (e.g., tellurium and selenium), or combinations thereof. In some examples, the positive electrode comprises a Group 12 element of the periodic table of the elements, such as one or more of zinc (Zn), cadmium (Cd) and mercury (Hg). In some cases, the positive electrode may form a eutectic or off-eutectic mixture (e.g., enabling lower operating temperature of the cell in some cases). In some examples, the positive electrode comprises a first positive electrode species and a second positive electrode species at a ratio (mol %) of about 20:80, 40:60 or 80:20 of the first positive electrode species to the second electrode species. In some examples, the positive electrode comprises Sb and Pb at a ratio (mol %) of about 20:80, 40:60 or 80:20 Sb to Pb. In some examples, the positive electrode comprises between about 20 mol % and 80 mol % of a first positive electrode species mixed with a second positive electrode species. In some cases, the positive electrode comprises between about 20 mol % and 80 mol % Sb (e.g., mixed with Pb). In some cases, the positive electrode comprises between about 20 mol % and 80 mol % Pb (e.g., mixed with Sb).

The electrolyte can include a salt (e.g., molten salt), such as an alkali or alkaline earth metal salt. The alkali or alkaline earth metal salt can be a halide, such as a fluoride, chloride, bromide, or iodide of the active alkali or alkaline earth metal, or combinations thereof. In an example, the electrolyte (e.g., in Type 1 or Type 2 chemistries) includes lithium chloride. In some examples, the electrolyte can comprise sodium fluoride (NaF), sodium chloride (NaCl), sodium bromide (NaBr), sodium iodide (NaI), lithium fluoride (LiF), lithium chloride (LiCl), lithium bromide LiBr, lithium iodide (LiI), potassium fluoride (KF), potassium chloride (KCl), potassium bromide (KBr), potassium iodide (KI), calcium fluoride ($CaF_2$), calcium chloride ($CaCl_2$)), calcium bromide ($CaBr_2$), calcium iodide ($CaI_2$), or any combination thereof. As an alternative, the salt of the active alkali metal can be, for example, a non-chloride halide, bistriflimide, fluorosulfano-amine, perchlorate, hexaflourophosphate, tetrafluoroborate, carbonate, hydroxide, nitrate, nitrite, sulfate, sulfite, or combinations thereof. In some cases, the electrolyte can comprise a mixture of salts. The electrolyte may exhibit low (e.g., minimal) electronic conductance (e.g., electronic shorting may occur through the electrolyte via valence reactions of $PbCl_2 \leftrightarrow PbCl_3$ which increases electronic conductance). For example, the electrolyte can have an electronic transference number (i.e., percentage of electrical (electronic and ionic) charge that is due to the transfer of electrons) of less than or equal to about 0.03% or 0.3%.

In some cases, the negative electrode and the positive electrode of an electrochemical energy storage device are in the liquid state at an operating temperature of the energy storage device. To maintain the electrodes in the liquid states, the battery cell may be heated to any suitable temperature. In some examples, the battery cell is heated to and/or maintained at a temperature of about 100° C., about 150° C., about 200° C., about 250° C., about 300° C., about 350° C., about 400° C., about 450° C., about 500° C., about 550° C., about 600° C., about 650° C., or about 700° C. The battery cell may be heated to and/or maintained at a temperature of at least about 100° C., at least about 150° C., at least about 200° C., at least about 250° C., at least about 300° C., at least about 350° C., at least about 400° C., at least about 450° C., at least about 500° C., at least about 550° C., at least about 600° C., at least about 650° C., or at least about 700° C. In some situations, the battery cell is heated to between about 200° C. and about 600° C., or between about 450° C. and about 575° C. In some implementations, the electrochemical cell or energy storage device may be at least partially or fully self-heated. For example, a battery may be sufficiently insulated, charged, discharged and/or conditioned at sufficient rates, and/or cycled a sufficient percentage of the time to allow the system to generate sufficient heat through inefficiencies of the cycling operation that cells are maintained at a given operating temperature (e.g., a cell operating temperature above the freezing point of at least one of the liquid components) without the need for additional energy to be supplied to the system to maintain the operating temperature.

Electrochemical cells of the disclosure may be adapted to cycle between charged (or energy storage) modes and discharged modes. In some examples, an electrochemical cell can be fully charged, partially charged or partially discharged, or fully discharged.

In some implementations, during a charging mode of an electrochemical energy storage device, electrical current received from an external power source (e.g., a generator or an electrical grid) may cause metal atoms in the metal positive electrode to release one or more electrons, dissolving into the electrolyte as a positively charged ion (i.e., cation). Simultaneously, cations of the same species can migrate through the electrolyte and may accept electrons at the negative electrode, causing the cations to transition to a neutral metal species, thereby adding to the mass of the negative electrode. The removal of the active metal species from the positive electrode and the addition of the active metal to the negative electrode stores electrochemical energy. In some cases, the removal of a metal from the positive electrode and the addition of its cation to the electrolyte can store electrochemical energy. In some cases, electrochemical energy can be stored through a combination of removal of the active metal species from the positive electrode and its addition to the negative electrode, and the removal of one or more metals (e.g., different metals) from the positive electrode and their addition to the electrolyte (e.g., as cations). During an energy discharge mode, an electrical load is coupled to the electrodes and the previously added metal species in the negative electrode can be released from the metal negative electrode, pass through the electrolyte as ions, and deposit as a neutral species in the positive electrode (and in some cases alloy with the positive electrode material), with the flow of ions accompanied by the external and matching flow of electrons through the external circuit/load. In some cases, one or more cations of positive electrode material previously released into the electrolyte can deposit as neutral species in the positive electrode (and in some cases alloy with the positive electrode material), with the flow of ions accompanied by the external and matching flow of electrons through the external circuit/load. This electrochemically facilitated metal alloying reaction discharges the previously stored electrochemical energy to the electrical load.

In a charged state, the negative electrode can include negative electrode material and the positive electrode can include positive electrode material. During discharging (e.g., when the battery is coupled to a load), the negative electrode material yields one or more electrons, and cations of the negative electrode material. In some implementations, the cations migrate through the electrolyte to the positive electrode material and react with the positive electrode material (e.g., to form an alloy). In some implementations, ions of the positive metal species (e.g., cations of the positive electrode material) accept electrons at the positive electrode and deposit as a metal on the positive electrode. During charging, in some implementations, the alloy at the positive electrode disassociates to yield cations of the negative electrode material, which migrate through the electrolyte to the negative electrode. In some implementations, one or more metal species at the positive electrode disassociates to yield cations of the negative electrode material in the electrolyte. In some examples, ions can migrate through an electrolyte from an anode to a cathode, or vice versa. In some cases, ions can migrate through an electrolyte in a push-pop fashion in which an entering ion of one type ejects an ion of the same type from the electrolyte. For example, during discharge, an alkali metal anode and an alkali metal chloride electrolyte can contribute an alkali metal cation to a cathode by a process in which an alkali metal cation formed at the anode interacts with the electrolyte to eject an alkali metal cation from the electrolyte into the cathode. The alkali metal cation formed at the anode in such a case may not necessarily migrate through the electrolyte to the cathode. The cation can be formed at an interface between the anode and the electrolyte, and accepted at an interface of the cathode and the electrolyte.

The present disclosure provides Type 1 and Type 2 cells, which can vary based on, and be defined by, the composition of the active components (e.g., negative electrode, electrolyte and positive electrode), and based on the mode of operation of the cells (e.g., low voltage mode versus high voltage mode).

Electrochemical cells of the disclosure can include housings that may be suited for various uses and operations. A housing can include one cell or a plurality of cells. A housing can be configured to electrically couple the electrodes to a switch, which can be connected to the external power source and the electrical load. The cell housing may include, for example, an electrically conductive container that is electrically coupled to a first pole of the switch and/or another cell housing, and an electrically conductive container lid that is electrically coupled to a second pole of the switch and/or another cell housing. The cell can be arranged within a cavity of the container. A first one of the electrodes of the cell can contact and be electrically coupled with an endwall of the container. An electrically insulating seal (e.g., bonded ceramic ring) may electrically isolate negative potential portions of the cell from positive portions of the container (e.g., electrically insulate the negative current lead from the positive current lead). In an example, the negative current lead and the container lid (e.g., cell cap) can be electrically isolated from each other, where a dielectric sealant material can be placed between the negative current lead and the cell cap. As an alternative, a housing includes an electrically insulating sheath (e.g., alumina sheath) or corrosion resistant and electrically conductive sheath or crucible (e.g., graphite sheath or crucible). In some cases, a housing and/or container may be a battery housing and/or container.

A battery, as used herein, can comprise a plurality of electrochemical cells. Individual cells can be electrically coupled to one another in series and/or in parallel. In series connectivity, the positive terminal of a first cell is connected to a negative terminal of a second cell. In parallel connectivity, the positive terminal of a first cell can be connected to a positive terminal of a second, and/or additional, cell(s). Similarly, cell modules, packs, cores, CEs and systems can be connected in series and/or in parallel in the same manner as described for cells.

Reference will now be made to the figures, wherein like numerals refer to like parts throughout. It will be appreciated that the figures and features therein are not necessarily drawn to scale.

With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of one or more electrochemical cells). The cells can be arranged in parallel, in series, or both in parallel and in series (C).

Further, as described in greater detail elsewhere herein, the cells can be arranged in groups (e.g., modules, packs, cores, CEs, systems, or any other group comprising one or more electrochemical cells). In some cases, such groups of electrochemical cells may allow a given number of cells to be controlled or regulated together at the group level (e.g., in concert with or instead of regulation/control of individual cells).

The battery may be assembled through repeated addition of individual cells or groups of cells. In one example, cells can be assembled into modules, which can be stacked to form packs, which can then be interconnected to form cores. In some cases, the packs may be assembled (e.g., vertically and/or horizontally) on trays, which is another example of a group of electrochemical cells; the trays can be assembled (e.g., vertically and/or horizontally) to form cores. Further, the cores can then be interconnected to form CEs and systems. In another example, cells can be assembled into modules, which can be interconnected (e.g., vertically and horizontally) to form cores. In yet another example, cells can be stacked to form a single cell tower (see, for example, FIG. 1B), which is yet another example of a group of electrochemical cells. Multiple cell towers, each comprising multiple cells stacked vertically on top one another, can then be added together to form, for example, a pack. Thus, in an example, a pack comprising a stack of 4 modules, each module comprising a 2 by 2 array of cells, can also be assembled by interconnecting 4 towers with 4 cells each (arranged in a 2 by 2 array of towers). Groups of cells utilized for assembly purposes may or may not be the same as groups of cells utilized for regulation/control purposes.

Cells, cell modules, packs, cores, CEs and/or systems can be connected in series and/or in parallel. Described throughout the disclosure are various configurations in which cells or groups of cells can be interconnected. Given the modular nature of the assembly process, interconnection configurations described herein in relation to individual cells or a given group of cells may equally apply to other groups of cells at least in some configurations.

In another aspect of the present disclosure, an energy storage device comprises at least one liquid metal electrode stored in a container at a temperature greater than or equal to about 250° C. The energy storage device can have a high energy storage capacity and the container can have a surface area-to-volume ratio that is less than or equal to about 100 $m^{-1}$ or less than or equal to about 10 $m^{-1}$.

Electrochemical cells of the disclosure may be capable of storing and/or receiving input of ("taking in") substantially large amounts of energy. The energy storage capacity can be any suitably lame value (e.g., suitable for grid-scale energy storage). In some instances, a cell is capable of storing and/or taking in and/or discharging about 1 watt-hour (Wh), about 5 Wh, 25 Wh, about 50 Wh, about 100 Wh, about 250 Wh, about 500 Wh, about 1 kilo-Watt-hour (kWh), about 1.5 kWh, or about 2 kWh. In some instances, the battery is capable of storing and/or taking in at least about 1 Wh, at least about 5 Wh, at least about 25 Wh, at least about 50 Wh, at least about 100 Wh, at least about 250 Wh, at least about 500 Wh, at least about 1 kWh, at least about 1.5 kWh, at least about 2 kWh, at least about 3 kWh, at least about 5 kWh, at least about 10 kWh, at least about 15 kWh, at least about 20 kWh, at least about 30 kWh, at least about 40 kWh, or at least about 50 kWh. It is recognized that the amount of energy stored in an electrochemical cell and/or battery may be less than the amount of energy taken into the electrochemical cell and/or battery (e.g., due to inefficiencies and losses).

In some embodiments, the surface area-to-volume ratio is about 100 $m^{-1}$, about 50 $m^{-1}$, about 10 $m^{-1}$, about 1 $m^{-1}$, about 0.5 $m^{-1}$, about 0.1 $m^{-1}$, about 0.01 $m^{-1}$, or about 0.001 $m^{-1}$. In some cases, the surface area-to-volume ratio is less than about 100 $m^{-1}$, less than about 50 $m^{-1}$ less than about 10 $m^{-1}$, less than about 1 $m^{-1}$, less than about 0.5 $m^{-1}$, less than about 0.1 $m^{-1}$, less than about 0.01 $m^{-1}$, or less than about 0.001 $m^{-1}$.

A cell can be capable of providing a current at a current density of at least about 10 milliamperes per square centimeter (mA/cm$^2$), 20 mA/cm$^2$, 30 mA/cm$^2$, 40 mA/cm$^2$, 50 mA/cm$^2$, 60 mA/cm$^2$, 70 mA/cm$^2$, 80 mA/cm$^2$, 90 mA/cm$^2$, 100 mA/cm$^2$, 200 mA/cm$^2$, 300 mA/cm$^2$, 400 mA/cm$^2$, 500 mA/cm$^2$, 600 mA/cm$^2$, 700 mA/cm$^2$, 800 mA/cm$^2$, 900 mA/cm$^2$, 1 A/cm$^2$, 2 A/cm$^2$, 3 A/cm$^2$, 4 A/cm$^2$, 5 A/cm$^2$, or 10 A/cm$^2$, where the current density is determined based on the effective cross-sectional area of the electrolyte and where the cross-sectional area is the area that is orthogonal to the net flow direction of ions through the electrolyte during charge or discharging processes. In some instances, a cell can be capable of operating at a direct current (DC) efficiency of at least about 10%, 20%, 30%, 35%, 40%, 45%, 50%, 55%, 60%, 65%, 70%, 75%, 80%, 90%, 95% and the like. In some instances, a cell can be capable of operating at a charge efficiency (e.g., Coulombic charge efficiency) of at least about 10%, 20%, 30%, 40%, 50%, 60%, 70%, 80%, 85%, 90%, 95%, 98%, 99%, 99.5%, 99.9%, 99.95%, and the like.

An electrochemical cell of the present disclosure can have a response time of any suitable value (e.g., suitable for responding to disturbances in the power grid). In some instances, the response time is about 100 milliseconds (ms), about 50 ms, about 10 ms, about 1 ms, and the like. In some cases, the response time is at most about 100 milliseconds (ms), at most about 50 ms, at most about 10 ms, at most about 1 ms, and the like.

A compilation or array of cells (e.g., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing and/or taking in a substantially large amount of energy for use with a power grid (i.e., a grid-scale battery) or other loads or uses. In some instances, a battery is capable of storing and/or taking in and/or discharging about 5 kilo-Watt-hour (kWh), about 25 kWh, about 50 kWh, about 100 kWh, about 500 kWh, about 1 mega-Watt-hour (MWh), about 1.5 MWh, about 2 MWh, about 3 MWh, about 5 MWh, about 10 MWh, about 25 MWh, about 50 MWh, or about 100 MWh. In some instances, the battery is capable of storing and/or taking in at least about 1 kWh, at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, at least about 4 MWh, at least about 5 MWh, at least about 10 MWh, at least about 25 MWh, at least about 50 MWh, or at least about 100 MWh.

In some cases, the energy storage device has an energy storage capacity of at least about 1 kWh. In some embodiments, the energy storage device has an energy storage capacity of at least about 2 kWh, 3 kWh, 4 kWh, 5 kWh, 6 kWh, 7 kWh, 8 kWh, 9 kWh, 10 kWh, 20 kWh, 30 kWh, 100 kWh, 200 kWh, 300 kWh, 400 kWh, 500 kWh, 1 MWh, 5 MWh, or 10 MWh.

Batteries of the disclosure may be capable of storing a suitably large amount of energy for use with a power grid (i.e., a grid-scale battery) or other loads or uses. In some instances, a battery is capable of storing (and/or taking in) about 5 kWh, 25 kWh, about 50 kWh, about 100 kWh, about 500 kWh, about 1 MWh, about 1.5 MWh, about 2 MWh, about 3 MWh, or about 5 MWh. In some instances, the battery is capable of storing (and/or taking in) at least about 5 kWh, at least about 25 kWh, at least about 50 kWh, at least about 100 kWh, at least about 500 kWh, at least about 1 MWh, at least about 1.5 MWh; at least about 2 at least about 3 MWh, or at least about 5 MWh.

In some embodiments, the energy storage device maintains at least 90%, 95%, 96%, 97%, 98%, or 99% of its energy storage capacity after 100, 200, 300, 400, 500, or 1000, 3000, 5000, 10,000 charge/discharge cycles.

In some embodiments, an energy storage device comprises a container containing one or more cells, an individual cell of the one or more cells containing at least one liquid metal electrode, where a rate of heat generation in the cell during charge/discharge is about equal to a rate of heat loss from the cell.

The rate of heat generation can be any suitable value compared to the rate of heat loss from the cell (e.g., such that the battery is self-heating and/or maintains a constant temperature). In some cases, the ratio of the rate of heat generation to the rate of heat loss from the cell is about 50%, about 75%, about 80%, about 85%, about 90%, about 100%, about 110%, about 120%, or about 150% In some instances, the ratio of the rate of heat generation to the rate of heat loss from the cell is at least about 50%, at least about 75%, at least about 80%, at least about 85%, at least about 90%, at least about 100%, at least about 110%, at least about 120%, or at least about 150%. In some instances, the ratio of the rate of heat generation to the rate of heat loss from the cell is at most about 50%, at most about 75%, at most about 80%, at most about 85%, at most about 90%, at most about 100%, at most about 110%, at most about 120%, or at most about 150%.

An energy storage device of the present disclosure, including an electrochemical cell ("cell") of the energy storage device, can be configured for transport. In some cases, the cell does not have a voltage and cannot pass current while being transported (e.g., on a truck at room temperature). The cell may not have an appreciable or detectable voltage during transport, and the cell may not pass an appreciable or detectable current during transport. This can be advantageous since the cells are electrically inert and cannot short.

An electrochemical cell can comprise chemical components that generate a potential difference when a system comprising the cell is heated (e.g., to approximately 250° C. or 450° C. or 500° C.). While at room temperature, the electrolyte in the cell can be solid and/or incapable of conducting ions necessary to facilitate either the charge of discharge reactions. The system does not pass current (e.g., even if the electrode terminals are shorted), and does not have an inherent cell voltage. When the temperature is elevated, the non-aqueous (non water based) electrolyte melts and/or becomes an ionic conductor, thus enabling the cell to accept or provide current and charge or discharge. When at operating temperature and when the electrolyte is molten or ionically conductive and if the cell is above 0% state of charge, the battery can have a non-zero cell voltage of around 0.9 volts in some cases.

An advantage of a cell that does not exhibit a cell voltage and is unable to accept or supply current while at room temperature is that the safety risks associated with shipping batteries are reduced. Even in the event that the cells are jostled and are externally shorted, the cells do not discharge and cannot be charged.

In some cases, the system comprises a metallic crucible that acts as one electrode and a dielectrically separated region that forms the second electrode. At room temperature, the electrodes are physically separated by solid chemicals that are inert and do not inherently generate a potential between the two electrodes. As temperature is raised portions of the solid electrolyte can undergo a change in electrical characteristics (such as a phase transition) that results in a potential difference forming between the electrodes. When temperature is maintained at approximately this range, the system can be capable of sourcing (discharging) or sinking (recharging) current. When the temperature is brought back to room temperature, the chemical media can undergo another phase transition that brings potential difference to zero between the electrodes and also increases ionic resistance preventing flow of current.

Energy storage devices (or batteries) of the present disclosure can be reliably safe during transportation and handling from a pickup location to a delivery location. Physical short circuits or other externally induced abuse conditions (e.g., puncture, shock, vibration, etc.) have little to no effect on safety or operation of the system when these conditions are induced at room temperature.

An electrochemical energy storage device of the present disclosure (including a cell of the device) may not be capable of being charged, being discharged, or having an electrical potential during transport. This may be accomplished by transporting (or shipping) the energy storage device at a temperature that is reduced with respect to an operating temperature of the energy storage device.

For example, an electrochemical energy storage device can comprise an anode and a cathode, and an electrolyte between the anode and the cathode. The device may not be capable of conducting ions at a first temperature and capable of concluding ions at a second temperature. The first temperature may be maintained during transport of the electrochemical energy storage device.

In some embodiments, at least part of the device is a solid at the first temperature and a liquid at the second temperature. The at least part of the device can be an electrolyte.

In some cases, the first temperature is room temperature. In some cases, the first temperature is less than about 100° C. In some cases, the second temperature is at least about 250° C. In some cases, the second temperature is at least about 500° C.

The device of the present disclosure may not be capable of being charged, being discharged, or having an electrical potential at the first temperature. In some instances, the device has a positive terminal and a negative terminal, and shorting the terminals does not discharge the device at the first temperature. In some cases, the device does not discharge when the device is punctured; vibrated, shorted, or shocked.

In another aspect of the present disclosure, an electrochemical energy storage device comprises a negative electrode and a positive electrode, and an electrolyte between the negative and positive electrodes. The device has a first potential difference between the electrodes at a first temperature of less than about 50° C. and a second potential difference between the electrodes at a second temperature of at least about 250° C. The second potential difference is greater than the first potential difference.

In some cases, the first potential difference is less than or equal to about 2.5 volts, 2 volts, 1.5 volts, 1.2 volts, 1 volt, 0.9 volts, 0.8 volts, 0.7 volts, 0.6 volts, 0.5 volts, 0.4 volts, 0.3 volts, 0.2 volts, 0.1 volts, or less. The first potential difference can be about 0 volts.

The second voltage (e.g., second potential difference) can be greater than 0 volts, or greater than or equal to about 0.1 volts, 0.2 volts, 0.3 volts, 0.4 volts, 0.5 volts, 0.6 volts, 0.7 volts, 0.8 volts, 0.9 volts, 1 volt, 1.2 volts, 1.5 volts, 2 volts, or 2.5 volts.

In another aspect of the present disclosure, an energy storage device capable of being transported on a truck and having a power capacity of greater than 1 MW comprises: (a) a physical footprint smaller than about 100 $m^2$/MW; (b) a cycle life greater than 3000 deep discharge cycles; (c) a lifespan of at least 10 years; (d) a DC-to-DC efficiency of at least 65%; (e) a discharge capacity of at most 10 hours; and (1') a response time of less than 100 milliseconds.

In some instances, the cells and cell housings are stackable. Any suitable number of cells can be stacked. Cells can be stacked side-by-side, on top of each other, or both. In some instances, at least about 3, 6, 10, 50, 100, or 500 cells are stacked. In some cases, a stack of 100 cells is capable of storing and/or taking in at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

An electrochemical energy storage device can include one or more individual electrochemical cells. An electrochemical cell can be housed in a container, which can include a container lid (e.g., cell cap) and seal component. The device can include at least 1, 2, 3, 4, 5, 6, 7, 8, 9, 10, 20, 30, 40, 50, 100, 200, 300, 400, 500, 1000, 10,000, 100,000 or 1,000,000 cells. The container lid may utilize, for example, a seal (e.g., annular dielectric gasket) to electrically isolate the container from the container lid. Such a component may be constructed from an electrically insulating material, such as, for example, glass, oxide ceramics, nitride ceramics, chalcogenides, or a combination thereof (e.g., ceramic, silicon oxide, aluminum oxide, nitrides comprising boron nitride, aluminum nitride, zirconium nitride, titanium nitride, carbides comprising silicon carbide, titanium carbide, or other oxides comprising of lithium oxide, calcium oxide, barium oxide, yttrium oxide, silicon oxide, aluminum oxide, or lithium nitride, or any combinations thereof). The seal may be made hermetic by one or more methods. For example, the seal may be subject to relatively high compressive forces (e.g., greater than about 1,000 psi or greater than about 10,000 psi) between the container lid and the container in order to provide a seal in addition to electrical isolation. Alternatively, the seal may be bonded through a weld, a braze, or other chemically adhesive material that joins relevant cell components to the insulating sealant material.

Figure 2:
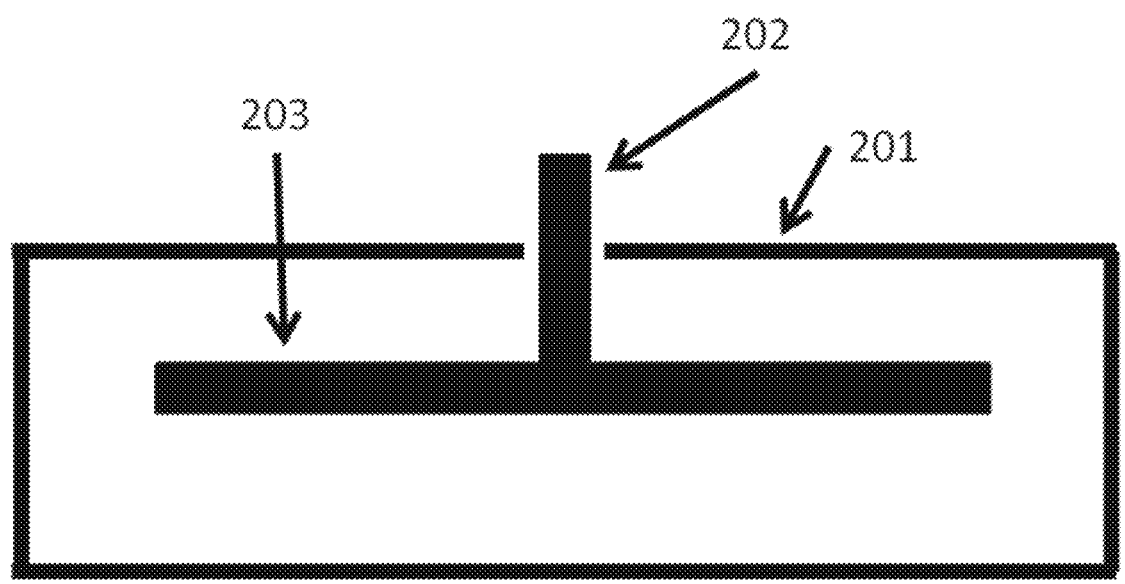
FIG. 2 is a schematic cross-sectional illustration of a housing having a conductor in electrical communication with a current collector passing through an aperture in the housing.

FIG. 2 schematically illustrates a battery that comprises an electrically conductive housing 201 and a conductor 202 in electrical communication with a current collector 203. The battery of FIG. 2 can be a cell of an energy storage device. The conductor can be electrically isolated from the housing and can protrude through the housing through an aperture in the housing such that the conductor of a first cell is in electrical communication with the housing of a second cell when the first and second cells are stacked.

In some cases, a cell comprises a negative current collector, a negative electrode, an electrolyte, a positive electrode and a positive current collector. The negative electrode can be part of the negative current collector. As an alternative, the negative electrode is separate from, but otherwise kept in electrical communication with, the negative current collector. The positive electrode can be part of the positive current collector. As an alternative, the positive electrode can be separate from, but otherwise kept in electrical communication with, the positive current collector.

A cell housing can comprise an electrically conductive container and a conductor in electrical communication with a current collector. The conductor may protrude through the housing through an aperture in the container and may be electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, about 0.005, about 0.01, about 0.05, about 0.1, about 0.15, or about 0.2. In some cases, the ratio of the area of the aperture to the area of the housing is less than or equal to 0.001, less than or equal to 0.005, less than or equal to 0.01, less than or equal to 0.05, less than or equal to 0.1, less than or equal to 0.15, less than or equal to 0.2, or less than or equal to 0.3.

A cell can comprise an electrically conductive housing and a conductor in electrical communication with a current collector. The conductor protrudes through the housing through an aperture in the housing and may be electrically isolated from the housing. The ratio of the area of the aperture to the area of the housing may be less than about 0.3, 0.2, 0.15, 0.1, 0.05, 0.01, 0.005, or 0.001.

A cell housing can comprise an electrically conductive container and a conductor in electrical communication with a current collector. The conductor protrudes through the container through an aperture in the container and is electrically isolated from the container. The ratio of the area of the aperture to the area of the container may be less than about 0.3, 0.2, 0.15, 0.1, 0.05, 0.01, 0.005, or 0.001. The housing can be capable of enclosing a cell that is capable of storing and/or taking in less than 100 Wh of energy, about 100 Wh of energy, or more than 100 Wh of energy. The cell can be capable of storing and/or taking in at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh of energy.

Figure 3:
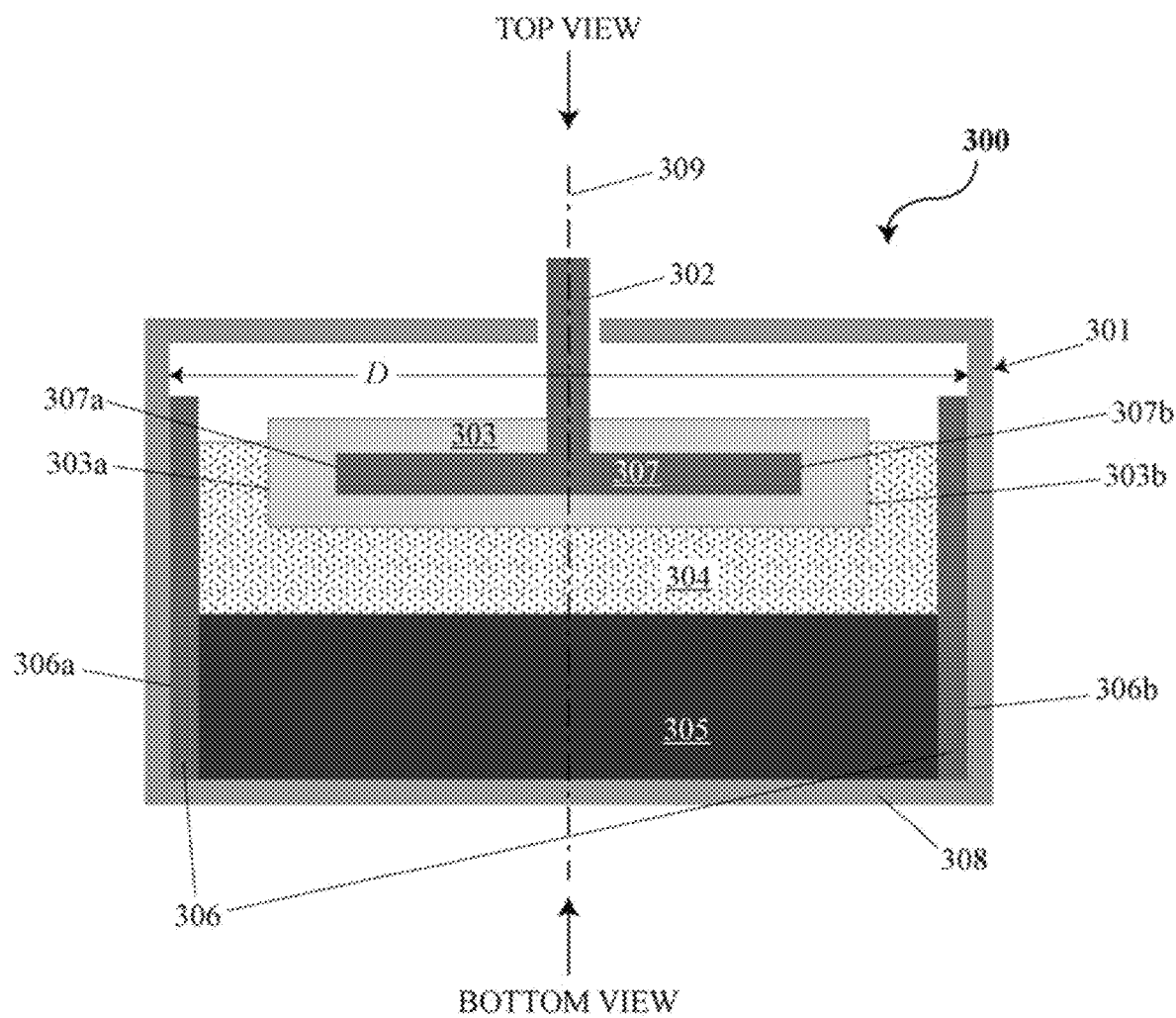
FIG. 3 is a cross-sectional side view of an electrochemical cell or battery.

FIG. 3 is a cross-sectional side view of an electrochemical cell or battery 300 comprising a housing 301, an electrically conductive feed-through (i.e., conductor, such as a conductor rod) 302 that passes through an aperture in the housing and is in electrical communication with a liquid metal negative electrode 303, a liquid metal positive electrode 305, and a liquid salt electrolyte 304 between the liquid metal electrodes 303, 305. The cell or battery 300 can be configured for use with cell chemistries operated under a low voltage mode ("Type 1 mode") or high voltage mode ("Type 2 mode"), as disclosed elsewhere herein. The conductor 302 may be electrically isolated from the housing 301 (e.g., using electrically insulating seals). The negative current collector 307 may comprise foam material that behaves like a sponge, and is "soaked" in negative electrode liquid metal 303. The liquid metal negative electrode 303 is in contact with the molten salt electrolyte 304. The liquid salt electrolyte is also in contact with the positive liquid metal electrode 305. The positive liquid metal electrode 305 can be in electrical communication with the housing 301 along the side walls and/or along the bottom end wall of the housing.

The housing may include a container and a container lid (e.g., cell cap). The container and container lid may be connected mechanically. The negative current lead may be electrically isolated from the container and/or container lid (e.g., cell cap), via, for example, the use of an electrically insulating hermetic seal. In some examples, an electrically insulating barrier (e.g., seal) may be provided between the negative current lead and the container lid. As an alternative, the seal can be in the form of a gasket, for example, and placed between the container lid, and the container. In some examples, the electrochemical cell or battery 300 may comprise two or more conductors passing through one or more apertures and in electrical communication with the liquid metal negative electrode 303. In some instances, a separator structure (not shown) may be arranged within the electrolyte 304 between the liquid negative electrode 303 and the (liquid) positive electrode 305.

The housing 301 can be constructed from an electrically conductive material such as, for example, steel, iron, stainless steel, graphite, nickel, nickel based alloys, titanium, aluminum, molybdenum, tungsten, or conductive compounds such as nitrides (e.g., silicon carbide or titanium carbide), or a combination thereof (e.g., alloy).

The housing 301 can comprise a housing interior 306. The housing interior 306 may include, but is not limited to, a sheath (e.g., a graphite sheath), a coating, a crucible (e.g., a graphite crucible), a surface treatment, a lining, or any combination thereof). In one example, the housing interior 306 is a sheath. In another example, the housing interior 306 is a crucible. In yet another example, examples, the housing interior 306 is a coating or surface treatment. The housing interior 306 may be thermally conductive, thermally insulating, electrically conductive, electrically insulating, or any combination thereof. In some cases, the housing interior 306 may be provided for protection of the housing (e.g., for protecting the stainless steel material of the housing from corrosion). In some cases, the housing interior can be anti-wetting to the liquid metal positive electrode. In some cases, the housing interior can be anti-wetting to the liquid electrolyte.

The housing may comprise a thinner lining component of a separate metal or compound, or a coating (e.g., an electrically insulating coating), such as, for example, a steel housing with a graphite lining, or a steel housing with a nitride coating or lining (e.g., boron nitride, aluminum nitride), a titanium coating or lining, or a carbide coating or lining (e.g., silicon carbide, titanium carbide). The coating can exhibit favorable properties and functions, including surfaces that are anti-wetting to the positive electrode liquid metal. In some cases, the lining (e.g., graphite lining) can be dried by heating above room temperature in air or dried in a vacuum oven before or after being placed inside the cell housing. Drying or heating the lining can remove moisture from the lining prior to adding the electrolyte, positive electrode, or negative electrode to the cell housing.

The housing 301 may include a thermally and/or electrically insulating sheath or crucible 306. In this configuration, the negative electrode 303 may extend laterally between the side walls of the housing 301 defined by the sheath or crucible without being electrically connected (i.e., shorted) to the positive electrode 305. Alternatively, the negative electrode 303 may extend laterally between a first negative electrode end 303a and a second negative electrode end 303b. When the sheath or crucible 306 is not provided, the negative electrode 303 may have a diameter (or other characteristic dimension, illustrated in FIG. 3 as the distance from 303a to 303b) that is less than the diameter (or other characteristic dimension such as width for a cuboid container, illustrated in FIG. 3 as the distance D) of the cavity defined by the housing 301.

The crucible can be made to be in electronic contact with the cell housing by means of a thin layer of a conductive liquid metal or semi-solid metal alloy located between the crucible and the cell housing, such as the elements Pb, Sn, Sb, Bi, Ga, In, Te, or a combination thereof.

The housing interior (e.g., sheath, crucible and/or coating) 306 can be constructed from a thermally insulating, thermally conductive, and/or electrically insulating or electrically conductive material such as, for example, graphite, carbide (e.g., SiC, TiC), nitride (e.g., BN), alumina, titania, silica, magnesia, boron nitride, or a mixed oxide, such as, for example, calcium oxide, aluminum oxide, silicon oxide, lithium oxide, magnesium oxide, etc. For example, as shown in FIG. 3, the sheath (or other) housing interior 306 has an annular cross-sectional geometry that can extend laterally between a first sheath end 306a and a second sheath end 306b. The sheath may be dimensioned (illustrated in FIG. 3 as the distance from 306a to 306b) such that the sheath is in contact and pressed up against the side walls of the cavity defined by the housing cavity 301. As an alternative, the housing interior 306 can be used to prevent corrosion of the container and/or prevent wetting of the cathode material up the side wall, and may be constructed out of an electronically conductive material, such as steel, stainless steel, tungsten, molybdenum, nickel, nickel based alloys, graphite, titanium, or titanium nitride. For example, the sheath may be very thin and may be a coating. The coating can cover just the inside of the walls, and/or, can also cover the bottom of the inside of the container. In some cases, the sheath (e.g., graphite sheath) may be dried by heating above room temperature in air or dried in a vacuum oven before or after being placed inside the cell housing. Drying or heating the lining may remove moisture from the lining prior to adding the electrolyte, positive electrode, or negative electrode to the cell housing.

Instead of a sheath, the cell may comprise an electrically conductive crucible or coating that lines the side walls and bottom inner surface of the cell housing, referred to as a cell housing liner, preventing direct contact of the positive electrode with the cell housing. The cell housing liner may prevent wetting of the positive electrode between the cell housing and the cell housing liner or sheath and may prevent direct contact of the positive electrode on the bottom surface of the cell housing. The sheath may be very thin and can be a coating. The coating can cover just the inside of the walls, and/or, can also cover the bottom of the inside of the container. The sheath may not fit perfectly with the housing 301 which may hinder the flow of current between the cell lining and the cell housing. To ensure adequate electronic conduction between the cell housing and the cell lining, a liquid of metal that has a low melting point (e.g., Pb, Sn, Bi), can be used to provide a strong electrical connection between the sheath/coating and the cell housing. This layer can allow for easier fabrication and assembly of the cell.

The housing 301 can also include a first (e.g., negative) current collector or lead 307 and a second (e.g., positive) current collector 308. The negative current collector 307 may be constructed from an electrically conductive material such as, for example, nickel-iron (Ni—Fe) foam, perforated steel disk, sheets of corrugated steel, sheets of expanded metal mesh, etc. The negative current collector 307 may be configured as a plate or foam that can extend laterally between a first collector end 307a and a second collector end 307b. The negative current collector 307 may have a collector diameter that is less than or similar to the diameter of the cavity defined by the housing 301. In some cases, the negative current collector 307 may have a collector diameter (or other characteristic dimension, illustrated in FIG. 3 as the distance from 307a to 307b) that is less than or similar to the diameter (or other characteristic dimension, illustrated in FIG. 3 as the distance from 303a to 303b) of the negative electrode 303. The positive current collector 308 may be configured as part of the housing 301; for example, the bottom end wall of the housing may be configured as the positive current collector 308, as illustrated in FIG. 3. Alternatively, the current collector may be discrete from the housing and may be electrically connected to the housing. In some cases, the positive current collector may not be electrically connected to the housing. The present disclosure is not limited to any particular configurations of the negative and/or positive current collector configurations.

The negative electrode 303 can be contained within the negative current collector (e.g., foam) 307. In this configuration, the electrolyte layer comes up in contact with the bottom, sides, and/or the top of the foam 307. The metal contained in the foam (i.e., the negative electrode material) can be held away from the sidewalls of the housing 301, such as, for example, by the absorption and retention of the liquid metal negative electrode into the foam, thus allowing the cell to run without the insulating sheath 306. In some cases, a graphite sheath or graphite cell housing liner (e.g., graphite crucible) may be used to prevent the positive electrode from wetting up along the side walls, which can prevent shorting of the cell.

Current may be distributed substantially evenly across a positive and/or negative liquid metal electrode in contact with an electrolyte along a surface (i.e., the current flowing across the surface may be uniform such that the current flowing through any portion of the surface does not substantially deviate from an average current density). In some examples, the maximum density of current flowing across an area of the surface is less than about 105%, or less than or equal to about 115%, less than or equal to about 125%, less than or equal to about 150%, less than or equal to about 175%, less than or equal to about 200%, less than or equal to about 250%, or less than or equal to about 300% of the average density of current flowing across the surface. In some examples, the minimum density of current flowing across an area of the surface is greater than or equal to about 50%, greater than or equal to about 60%, greater than or equal to about 70%, greater than or equal to about 80%, greater than or equal to about 90%, or greater than or equal to about 95% of the average density of current flowing across the surface.

Viewed from a top or bottom direction, as indicated respectively by "TOP VIEW" and "BOTTOM VIEW" in FIG. 3, the cross-sectional geometry of the cell or battery 300 can be circular, elliptical, square, rectangular, polygonal, curved, symmetric, asymmetric or any other compound shape based on design requirements for the battery. In an example, the cell or battery 300 is axially symmetric with a circular or square cross-section. Components of cell or battery 300 (e.g., component in FIG. 3) may be arranged within the cell or battery in an axially symmetric fashion. In some cases, one or more components may be arranged asymmetrically, such as, for example, off the center of the axis 309.

The combined volume of positive and negative electrode material may be at least about 5%, 10%, 20%, 30%, 40%, 50%, 60%, 70%, 80%, 90%, or 95% of the volume of the battery (e.g., as defined by the outer-most housing of the battery, such as a shipping container). In some cases, the combined volume of anode and cathode material is at least about 5%, at least about 10%, at least about 20%, at least about 30%, at least about 40%, at least about 60%, at least about 75%, of the volume of the cell. The combined volume of the positive and negative electrodes material may increase or decrease (e.g., in height) during operation due to growth or expansion, or shrinkage or contraction, respectively, of the positive or negative electrode. In an example, during discharge, the volume of the negative electrode (anode during discharge) may be reduced due to transfer of the negative electrode material to the positive electrode (cathode during discharge), wherein the volume of the positive electrode is increased (e.g., as a result of an alloying reaction). The volume reduction of the negative electrode may or may not equal the volume increase of the positive electrode. The positive and negative electrode materials may react with each other to form a solid or semi-solid mutual reaction compound (also "mutual reaction product" herein), which may have a density that is the same, lower, or higher than the densities of the positive and/or negative electrode materials. Although the mass of material in the electrochemical cell or battery 300 may be constant, one, two or more phases (e.g., liquid or solid) may be present, and each such phase may comprise a certain material composition (e.g., an alkali metal may be present in the materials and phases of the cell at varying concentrations: a liquid metal negative electrode may contain a high concentration of an alkali metal, a liquid metal positive electrode may contain an alloy of the alkali metal and the concentration of the alkali metal may vary during operation, and a mutual reaction product of the positive and negative liquid metal electrodes may contain the alkali metal at a fixed or variable stoichiometry). The phases and/or materials may have different densities. As material is transferred between the phases and/or materials of the electrodes, a change in combined electrode volume may result.

In some cases, a cell can include one or more alloyed products that are liquid, semi-liquid (or semi-solid), or solid. The alloyed products can be immiscible with the negative electrode, positive electrode and/or electrolyte. The alloyed products can form from electrochemical processes during charging or discharging of a cell.

An alloyed product can include an element constituent of a negative electrode, positive electrode and/or electrolyte. An alloyed product can have a different density than the negative electrode, positive electrode or electrolyte, or a density that is similar or substantially the same. The location of the alloyed product can be a function of the density of the alloyed product compared to the densities of the negative electrode, electrolyte and positive electrode. The alloyed product can be situated in the negative electrode, positive electrode or electrolyte, or at a location (e.g., interface) between the negative electrode and the electrolyte or between the positive electrode and the electrolyte, or any combination thereof. In an example, an alloyed product is an intermetallic between the positive electrode and the electrolyte (see, for example, FIG. 4). In some cases, some electrolyte can seep in between the intermetallic and the positive electrode. In other examples, the alloyed product can be at other locations within the cell and be formed of a material of different stoichiometries/compositions, depending on the chemistry, temperature, and/or charge state of the cell.

Figure 4:
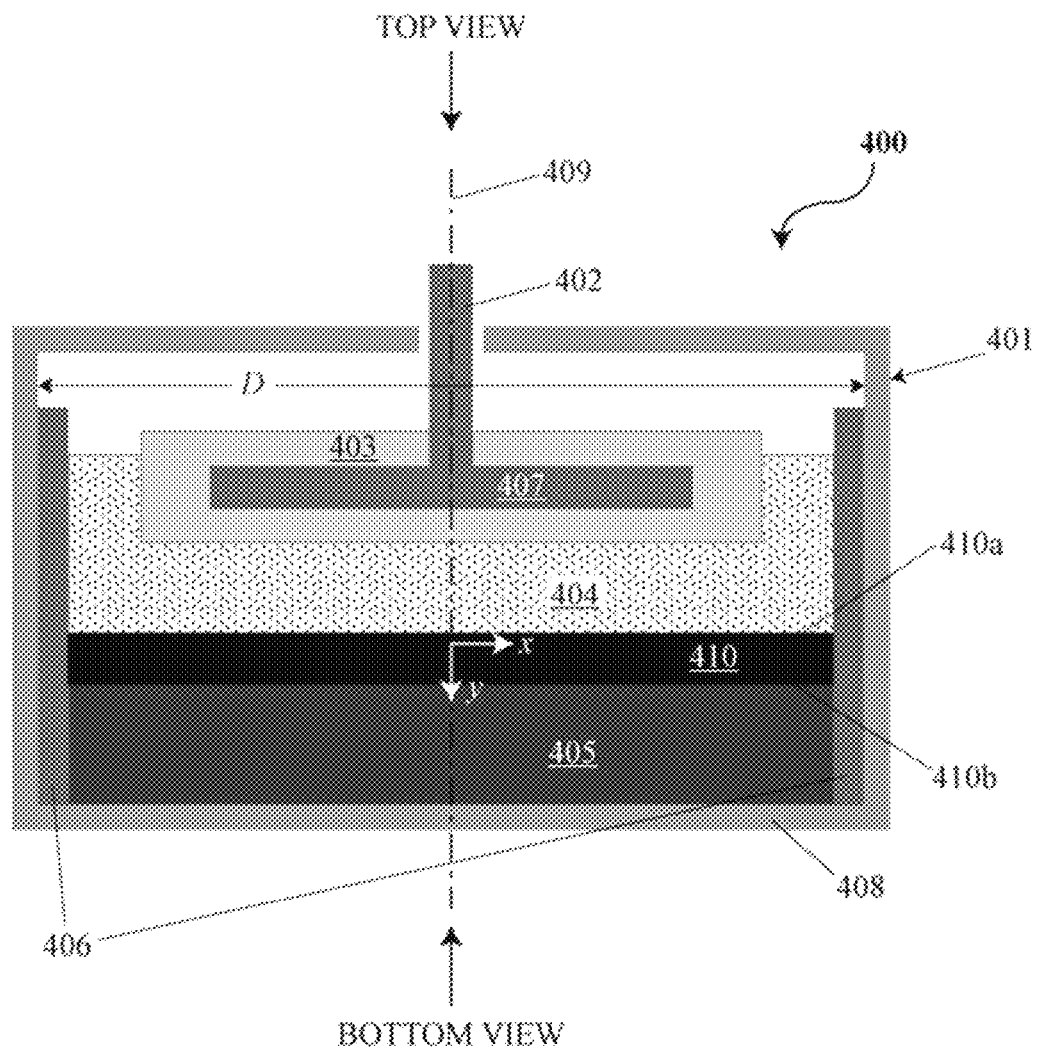
FIG. 4 is a cross-sectional side view of an electrochemical cell or battery with an intermetallic layer.

FIG. 4 is a cross-sectional side view of an electrochemical cell or battery 400 with an intermetallic layer 410. The intermetallic layer 410 can include a mutual reaction compound of a material originating from the negative electrode 403 and positive electrode material 405. For example, a negative liquid metal electrode 403 can comprise an alkali or alkaline earth metal (e.g., Na, Li, K, Mg, or Ca), the positive liquid metal electrode 405 can comprise one or more of transition metal, d-block (e.g., Group 12), Group IIIA, IVA, VA or VIA elements (e.g., lead and/or antimony), and the intermetallic layer 410 can comprise a mutual reaction compound or product thereof (e.g., alkali plumbide or antimonide, e.g., $Na_3Pb$, $Li_3Sb$, $K_3Sb$, $Mg_3Sb_2$, or $Ca_3Sb_2$). An upper interface 410a of the intermetallic layer 410 is in contact with the electrolyte 404, and a lower interface 410b of the intermetallic layer 410 is in contact with the positive electrode 405. The mutual reaction compound may be formed during discharging at an interface between a positive liquid metal electrode (liquid metal cathode in this configuration) 405 and a liquid salt electrolyte 404. The mutual reaction compound (or product) can be solid or semi-solid. In an example, the intermetallic layer 410 can form at the interface between the liquid metal cathode 405 and the liquid salt electrolyte 404. In some cases, the intermetallic layer 410 may exhibit liquid properties (e.g., the intermetallic may be semi-solid, or it may be of a higher viscosity or density than one or more adjacent phases/materials).

The cell 400 comprises a first current collector 407 and a second current collector 408. The first current collector 407 is in contact with the negative electrode 403, and the second current collector 408 is in contact with the positive electrode 405. The first current collector 407 is in contact with an electrically conductive feed-through 402. A housing 401 of the cell 400 can include a thermally and/or electrically insulating sheath 406. In an example, the negative liquid metal electrode 403 includes magnesium (Mg), the positive liquid metal electrode 405 includes antimony (Sb), and the intermetallic layer 410 includes Mg and Sb ($Mg_xSb$, where 'x' is a number greater than zero), such as, for example, magnesium antimonide ($Mg_3Sb_2$). Cells with a Mg∥Sb chemistry may contain magnesium ions within the electrolyte as well as other salts (e.g., $MgCl_2$, NaCl, KCl, or a combination thereof). In some cases, in a discharged state, the cell is deficient in Mg in the negative electrode and the positive electrode comprises and alloy of Mg—Sb. In such cases, during charging, Mg is supplied from the positive electrode, passes through the electrolyte as a positive ion, and deposits onto the negative current collector as Mg. In some examples, the cell has an operating temperature of at least about 550° C., 600° C., 650° C., 700° C., or 750° C., and in some cases between about 650° C. and about 750° C. In a charged state, all or substantially all the components of the cell can be in a liquid state. Alternative chemistries exist, including Ca-Mg∥Bi comprising a calcium halide constituent in the electrolyte (e.g., $CaF_2$, KF, LiF, $CaCl_2$), KCl, LiCl, $CaBr_2$, KBr, LiBr, or combinations thereof) and operating above about 500° C., Ca-Mg∥Sb-Pb comprising a calcium halide constituent in the electrolyte (e.g., $CaF_2$, KF, LiF, $CaCl_2$), KCl, LiCl, $CaBr_2$, KBr, LiBr, or combinations thereof) and operating above about 500° C., Li∥Pb-Sb cells comprising a lithium-ion containing halide electrolyte (e.g., LiF, LiCl, LiBr, or combinations thereof) and operating between about 350° C. and about 550° C., and Na∥Pb cells comprising a sodium halide as part of the electrolyte (e.g., NaCl, NaBr, NaI, NaF, LiCl, LiF, LiBr, LiI, KCl, KBr, KF, KI, $CaCl_2$), $CaF_2$, $CaBr_2$, $CaI_2$, or combinations thereof) and operating above about 300° C. In some cases, the product of the discharge reaction may be an intermetallic compound (e.g., $Mg_3Sb_2$ for the Mg∥Sb cell chemistry, $Li_3Sb$ for the Li∥Pb-Sb chemistry, $Ca_3Bi_2$ for the Ca-Mg∥Bi chemistry, or $Ca_3Sb_2$ for the Ca-Mg∥Pb-Sb chemistry), where the intermetallic layer may develop as a distinct solid phase by, for example, growing and expanding horizontally along a direction x and/or growing or expanding vertically along a direction y at the interface between the positive electrode and the electrolyte. The growth may be axially symmetrical or asymmetrical with respect to an axis of symmetry 409 located at the center of the cell or battery 400.

Type 1 and Type 2 Modes of Operation

Liquid metal batteries can provide a distinguished opportunity to achieve a long lifespan system that is relatively simple to assemble. A cell of a liquid metal battery of the present disclosure may be operated in a manner that utilizes symmetric or substantially symmetric electrode reactions in the form of an alloying/de-alloying electrochemical reaction (referred to herein as "low voltage operation" mode, or "Type 1" mode). In some cases, in Type 1 mode, a cell is operated at a voltage from about 0.4 Volt (V) to about 1.5 V. Here, one active metal species may be present in the negative electrode and as an alloyed species in the positive electrode, and may be the only metal species that dissolves in or is extracted from the electrolyte during cell discharging and charging, respectively. The composition of the electrolyte therefore may not substantially change during the low voltage operation mode. Such mode of operation may provide a relatively low cell voltage, resulting in a relatively low energy density.

In an example Type 1 cell, upon discharging, cations formed at the negative electrode can migrate into the electrolyte. Concurrently, the electrolyte can provide a cation of the same species (e.g., the cation of the negative electrode material) to the positive electrode, which can reduce from a cation to a neutrally charged metallic species, and alloy with the positive electrode. In a discharged state, the negative electrode can be depleted (e.g., partially or fully) of the negative electrode material (e.g., Li, Na, K, Mg, Ca). During charging, the alloy at the positive electrode can disassociate to yield cations of the negative electrode material (e.g., $Li^+$, $Na^+$, $K^+$, $Mg^{2+}$, $Ca^{2+}$), which migrates into the electrolyte. The electrolyte can then provide cations (e.g., the cation of the negative electrode material) to the negative electrode, where the cations accept one or more electrons from an external circuit and are converted back to a neutral metal species, which replenishes the negative electrode to provide a cell in a charged state. A Type 1 cell can operate in a push-pop fashion, in which the entry of a cation into the electrolyte results in the discharge of the same cation from the electrolyte.

A second mode in which liquid metal battery cells of the present disclosure can operate involves a non-symmetric or substantially non-symmetric reaction where one metal species is electrochemically active at one electrode and a second metal species is electrochemically active at the other electrode, resulting in a net change in the composition of the electrolyte at different states of charge. This mode of operation (referred to herein as "high voltage operation" mode, "Type 2" mode, or cells using "displacement salt electrode" operation or mechanism) can initiate new chemical reactions compared to the Type 1 mode of operation (e.g., in addition to or instead of alloying reaction at the positive electrode), in some cases resulting in, or otherwise utilizing, a relatively higher cell voltage (e.g., 1.5 V to 2.5 V, 1 V to 3 V, or 1 V to 4 V). Type 2 mode of operation can offer the possibility of using a wider variety of active materials, and combinations of such materials, as the electrochemistry of the cell.

In an example Type 2 cell, in a discharged state the electrolyte comprises cations of the negative electrode material (e.g., $Li^+$, $Na^+$, $K^+$, $Mg^{2+}$, $Ca^{2+}$), and the positive electrode comprises positive electrode material (e.g., Sb, Pb, Sn, Zn, Hg). During charging, a cation of the negative electrode material from the electrolyte accepts one or more electrons (e.g., from a negative current collector) to form the negative electrode comprising the negative electrode material. In some examples, the negative electrode material is liquid and wets into a foam (or porous) structure of the negative current collector. In some examples, negative current collector may not comprise foam (or porous) structure. In some examples, the negative current collector may comprise a metal, such as, for example, tungsten (e.g., to avoid corrosion from Zn), tungsten carbide or molybdenum negative collector not comprising Fe—Ni foam. Concurrently, positive electrode material from the positive electrode sheds electrons (e.g., to a positive current collector) and dissolves into the electrolyte as cations of the positive electrode material (e.g., $Sb^{3+}$, $Pb^{2+}$, $Sn^{2+}$, $Zn^{2+}$, $Hg^{2+}$). The concentration of the cations of the positive electrode material can vary in vertical proximity within the electrolyte (e.g., as a function of distance above the positive electrode material) based on the atomic weight and diffusion dynamics of the cation material in the electrolyte. In some examples, the cations of the positive electrode material are concentrated in the electrolyte near the positive electrode.

In some examples, a Type 1 cell includes a negative electrode comprising an alkali or alkaline earth metal (e.g., lithium, sodium, potassium, magnesium, calcium), and a positive electrode comprising a poor metal, or alloys of such metals (e.g., one or more of tin, lead, bismuth, antimony, tellurium and selenium). The negative electrode and positive electrode can be in a liquid (or molten) state at an operating temperature of the cell. The negative and positive electrodes can be separated by a salt electrolyte (e.g., alkali or alkaline earth metal halide salts).

In a charged state, a Type 1 cell, when operated under Type 2 mode, can have a voltage of at least about 0.5 V, 1 V, 1.5 V, 2 V, 2.5 V, or 3 V in a charged state. In some cases, a Type 1 cell, when operated under Type 2 mode, can have an open circuit voltage (OCV) of at least about 0.5 V, 1 V, 1.5 V, 2 V, 2.5 V, or 3 V. In an example, a Type 1 cell, when operated under Type 2 mode, has an open circuit voltage greater than about 1 V, greater than about 2 V, or greater than about 3 V. In some cases, a charge cutoff voltage (CCV) of a Type 1 cell, when operated in Type 2 mode, is from about 1 V to 3 V, 1.5 V to 2.5 V, 1.5 V to 3 V, or 2 V to 3 V in a charged state. In some cases, a charge cutoff voltage (CCV) of a Type 1 cell, when operated in Type 2 mode, is at least about 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In an example, a Type 1 cell, when operated under Type 2 mode, has a charge cutoff voltage of at least about 1.7 V after at least about 100 charge/discharge cycles. In some cases, a voltage of a Type 1 cell, when operated in Type 2 mode, is from about 1 V to 3 V, 1.5 V to 2.5 V, 1.5 V to 3 V, or 2 V to 3 V in a charged state. A Type 1 cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1000 cycles, 2000 cycles, 3000 cycles, 4000 cycles, 5000 cycles, 10,000 cycles, or 20,000 cycles (also "charge/discharge cycles" herein). In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container. During operation at an operating temperature of the Type 1 cell, the Type 1 cell can have a negative electrode, electrolyte and positive electrode in a liquid (or molten) state.

A Type 1 cell of the present disclosure, when operated in Type 2 mode, can have an energy storage capacity of at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh, and a current density of at least about 10 mA/cm$^2$, 20 mA/cm$^2$, 30 mA/cm$^2$, 40 mA/cm$^2$, 50 mA/cm$^2$, 60 mA/cm$^2$, 70 mA/cm$^2$, 80 mA/cm$^2$, 90 mA/cm$^2$, 100 mA/cm$^2$, 200 mA/cm$^2$, 300 mA/cm$^2$, 400 mA/cm$^2$, 500 mA/cm$^2$, 600 mA/cm$^2$, 700 mA/cm$^2$, 800 mA/cm$^2$, 900 mA/cm$^2$, 1 A/cm$^2$, 2 A/cm$^2$, 3 A/cm$^2$, 4 A/cm$^2$, 5 A/cm$^2$, or 10 A/cm$^2$.

In a charged state, a Type 1 cell, when operated under Type 1 mode, can have a voltage of at least about 0.5 V, 0.6 V, 0.7 V, 0.8 V, 0.9 V, 1 V, 1.2 V, or 1.5 V in a charged state. In some cases, a Type 1 cell, when operated under Type 1 mode, can have an open circuit voltage (OCV) of at least about 0.5 V, 0.6 V, 0.7 V, 0.8 V, 0.9 V, 1 V, 1.2 V, or 1.5 V. In an example, a Type 1 cell, when operated under Type 1 mode, has an open circuit voltage greater than about 0.5 V. In some cases, a charge cutoff voltage (CCV) of a Type 1 cell, when operated in Type 1 mode, is from about 0.5 V to 1.5 V in a charged state. In some cases, a charge cutoff voltage (CCV) of a Type 1 cell, when operated in Type 1 mode, is at least about 0.5 V, 0.6 V, 0.7 V, 0.8 V, 0.9 V, 1.0 V, 1.1 V, 1.2 V, 1.3 V, 1.4 V, or 1.5 V. In an example, a Type 1 cell, when operated under Type 1 mode, has a charge cutoff voltage of at least about 1.0 V after at least about 300 charge/discharge cycles. In some cases, a voltage of a Type 1 cell, when operated in Type 1 mode, is from about 0.5 V to 1.5 V in a charged state. A Type 1 cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1000 cycles, 2000 cycles, 3000 cycles, 4000 cycles, 5000 cycles, 10,000 cycles, or 20,000 cycles. In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container. During operation at an operating temperature of the Type 1 cell, the Type 1 cell can have a negative electrode, electrolyte and positive electrode in a liquid (or molten) state.

A Type 1 cell of the present disclosure, when operated in Type 1 mode, can have an energy storage capacity of at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh, and a current density of at least about 10 mA/cm$^2$, 20 mA/cm$^2$, 30 mA/cm$^2$, 40 mA/cm$^2$, 50 mA/cm$^2$, 60 mA/cm$^2$, 70 mA/cm$^2$, 80 mA/cm$^2$, 90 mA/cm$^2$, 100 mA/cm$^2$, 200 mA/cm$^2$, 300 mA/cm$^2$, 400 mA/cm$^2$, 500 mA/cm$^2$, 600 mA/cm$^2$, 700 mA/cm$^2$, 800 mA/cm$^2$, 900 mA/cm$^2$, 1 A/cm$^2$, 2 A/cm$^2$, 3 A/cm$^2$, 4 A/cm$^2$, 5 A/cm$^2$, or 10 A/cm$^2$.

The present disclosure provides cell design criteria that may address failure mechanisms, enabling the cells to achieve a long lifespan and optimum performance. Type 2 cell operation can advantageously provide opportunities for new cell chemistries that are lower cost, less hazardous and/or nontoxic, and that use more earth abundant materials.

The present disclosure provides various non-limiting approaches for operating cells under the Type 2 mode. In a first approach, a cell with positive and negative electrode materials that are ordinarily configured for use in a Type 1 mode is operated in a Type 2 mode of operation. In a second approach, a cell comprises materials that are configured for use in Type 2 mode of operation.

Under the first approach, a cell configured for use in a Type 1 mode is operated in Type 2 mode (e.g., voltage from 1.5 V to 2.5 V or higher), for example by charging the cell to a higher voltage and/or having less negative electrode material in the cell. Any operationally requisite negative electrode material can be supplied by the electrolyte during cell charging. In an example, the Type 1 cell may be Li∥Pb or Li∥Sb-Pb or Li∥Zn-Sn or Li∥Bi with a lithium-ion containing electrolyte (e.g., LiF, LiCl, LiBr or a combination thereof). The cell is deficient in Li in the negative electrode, but during cell charging Li is supplied from the electrolyte to the negative electrode. In some examples, the Type 1 cell has an operating temperature of at least about 200° C., at least about 250° C., at least about 300° C., at least about 400° C., at least about 450° C., at least about 500° C., or at least about 550° C., in some cases between about 500° C. and 550° C. In a charged state, all or substantially all of the components of the Type 1 cell are in a liquid state.

Under Type 1 mode, the Type 1 cell can be charged to a voltage from about 0.5 V to 1.5 V to attain a charged or substantially charged state, and subsequently discharged to attain a discharged or substantially discharged state. However, under Type 2 mode, the Type 1 cell can be charged to a voltage from about 1.5 V to 2 V or higher (e.g., 1.5 V to 4 V). The quantity of lithium in the negative electrode in such a case can be in stoichiometric balance with the quantity of Sb and/or Pb in the positive electrode. As an alternative, the Type 1 cell can have a negative electrode with a stoichiometric deficiency of a negative electrode material (e.g., Li). Under Type 2 mode (e.g., at a CCV from about 1.5 V to 2.5 V or higher), during charging, one or more components of the positive electrode (e.g., Pb or Sb) can be removed from the positive electrode and dissolved into the electrolyte as a cation (e.g., $Pb^{+2}$ or $Sb^{3+}$). Concurrently, one or more components of the negative electrode (e.g., Li) can be removed from the electrolyte, in its ionic form (e.g., Lit), and deposited into the negative electrode in metallic form. A cell thus formed can have a higher chemical potential relative to a cell operating under the Type 1 mode.

A Type 1 cell can have any cell and seal configuration disclosed herein. For instance, the active cell materials can be held within a sealed steel/stainless steel container with a high temperature seal on the cell lid. A negative current lead can pass through the cell lid (and be sealed to the cell lid by the dielectric high temperature seal), and connect with a porous negative current collector (e.g., metal foam) suspended in an electrolyte. In some cases, the cell can use a graphite sheath, coating, crucible, surface treatment or lining (or any combination thereof) on the inner wall of the cell crucible. In other cases, the cell may not use a graphite sheath, coating, crucible, surface treatment or lining on an inner wall of the cell crucible.

In an example, a Li∥Pb cell with a lithium halide (e.g., LiF, LiCl, LiBr or a combination thereof) electrolyte that is configured for use as a Type 1 cell can operate in Type 2 mode through the following example reactions: during charging, $Li^+$ ions from the electrolyte accept an electron from the top/negative current collector (e.g., foam current collector) and deposit as liquid Li metal, wetting into the foam/porous structure. Concurrently, Pb atoms shed electrons and subsequently dissolve into the electrolyte as $Pb^{2+}$. The $Pb^{2+}$ ions and respective halide salt (e.g., $PbCl_2$) can be more dense than the remainder of the lithium halide electrolyte. Hence, $Pb^{2+}$ ion species may be driven by gravitation to remain concentrated towards the positive electrode. The $Pb^{2+}$ ions may be concentrated at the bottom of the electrolyte layer. Since Li metal is deposited onto the foam from the electrolyte, the system may not require any Li metal during the time of assembly, but rather, can be assembled in a discharged state having only a Li salt electrolyte and a Pb or Pb alloy (e.g., Pb—Sb) positive electrode. In some examples, upon charge, the Li∥Pb is charged until a voltage of at least about 1.5 V, 2 V, 2.5 V, or 3 V or higher is obtained. The voltage in some cases can be from about 1 V to 2 V, 1 V to 2.5 V, 1 V to 3 V, 1.5 V to 2.5 V, 1.5 V to 3 V, 2 V to 3 V, 1.5 V to 2.0 V, or 1.5 V to 2.5 V in a charged state.

During operation of a cell under Type 1 mode or Type 2 mode, material of the positive electrode may dissolve in the electrolyte and in some cases migrate to the negative electrode, where it may deposit into the negative electrode or alloy with the material of the negative electrode. In some situations, this may degrade the operation of the cell through, for example, decreasing the operating voltage of the cell. In addition to, or as an alternative, a material of the negative electrode (e.g., Li) may react with a material of the positive electrode (e.g., Pb) in the electrolyte, which may form a particle cloud that may decrease cell performance and in some cases cause a shorting path between the negative and positive electrodes. The present disclosure provides various approaches for minimizing the possibility of (i) material of the positive electrode from depositing into the negative electrode or alloying with the material of the negative electrode, and (ii) material of the negative electrode from reacting with the material of the positive electrode in the electrolyte. These include, without limitation, selecting positive electrode components to have requisite free energies of formation ($\Delta G_f$) with a halide salt, selecting a thickness of the electrolyte as a function of relative density (compared to the electrolyte density) and diffusion kinetics of dissolved positive electrode species in the electrolyte, limiting a size or volume of the negative electrode, allowing the cell to periodically rest in a discharged state while held at a voltage below the Type 2 mode open circuit voltage (OCV), operating a cell at lower charge capacity, and operating the cell in both Type 1 and Type 2 modes of operation. Some or all of these approaches may aid in improving cell performance and minimizing the occurrence of cell failure of Type 1 cells during Type 2 mode of operation, or Type 2 cells during Type 2 mode of operation.

In some situations, the positive electrode can include a plurality of components or materials (e.g., Pb and Sb). One of the components (or materials) can have a less negative $\Delta G_f$ with halide salts in the electrolyte than the other component(s). For example, if the positive electrode comprises Pb and Sb, Sb has a more negative $\Delta G_f$ with halide salts in the electrolyte than Pb. The presence of an alloying metal can lower the activity of Pb in the positive electrode. In such circumstances, during charging, any droplets comprising a material of the positive electrode (e.g., Pb) that form in the electrolyte may have a higher activity than the material in the positive electrode, which, in some cases, may provide a driving force that, over time, dissolves the droplets in the electrolyte and deposits the droplets in the positive electrode. Such configuration may be practical for both Type 2 cells and Type 1 cells operated in Type 2 mode. Thus, alloying a positive electrode material (e.g., Sb) with a less electronegative positive electrode material (e.g., metal or metalloid such as Pb) can be used to decrease or prevent build-up of small particles of either positive electrode material (e.g., Sb or Pb) from accumulating in the electrolyte. Such accumulation of particles or phases may in some cases lead to electronic shorting between the electrodes through the electrolyte.

The thickness of the electrolyte may be selected to improve cell performance and operating lifetime. In some cases, the thickness of the electrolyte layer can be selected to minimize, if not substantially prevent, material of the positive electrode from diffusing into the negative electrode during cell operation, such as cell charging. The thickness of the electrolyte may be selected to decrease the rate at which material of the positive electrode diffuses into the negative electrode during cell operation, such as cell charging and/or discharging, and can be a function of diffusion kinetics and relative density of the positive electrode ion species dissolved into the electrolyte.

In some examples, the electrolyte can have a thickness (measured as the distance between negative electrode/electrolyte and positive electrode/electrolyte interfaces) of at least about 0.01 cm, 0.05 cm, 0.1 cm, 0.5 cm, 0.8 cm, 1.0 cm, 1.3 cm, 1.5 cm, 2 cm, 3 cm, 4 cm, 5 cm, 6 cm, 7 cm, 8 cm, 9 cm, 10 cm for a cell having a thickness of at least about 1 cm, 2 cm, 3 cm, 4 cm, 5 cm, 6 cm, 7 cm, 8 cm, 9 cm, 10 cm or more. In some examples, a cell has a thickness of at most about 3 cm or 4 cm, and an electrolyte with a thickness of at most about 1 cm or 2 cm.

As an alternative, or in addition to, the size (e.g., volume) of the negative electrode can be selected such that, upon cell charging, the negative current collector (e.g., metallic foam, or a tungsten current collector or lead) becomes nearly, substantially, or completely full of the negative electrode material (e.g., Li or Na) such that if there is any additional material from the electrolyte or positive electrode (e.g., Zn), it may overflow and not react with, or deposit into, the negative electrode. In an example, a cell comprises a negative electrode comprising Li or Na and a positive electrode comprising Zn. Since Zn is heavier (or more dense) than Li or Na, a Zn—Na or Zn—Li alloy may drip or flow off the bottom of the negative electrode (i.e., along the direction of the gravitational acceleration vector) and recombine with the positive electrode. This can aid in naturally cleansing the negative electrode of any Zn, such as, for example, in cases in which the Zn alloy is relatively anti-wetting/immiscible with the negative electrode material.

In an example, in a Type 2 cell chemistry, the negative electrode and the positive electrode materials may form an immiscible mixture (e.g., of Na-rich and Zn-rich composition). The immiscible mixture may promote the positive electrode material rich mixture to drip off the negative electrode and rejoin the positive electrode, thereby recovering cross-contaminated cathode material.

In some cases, a cell can be periodically permitted to rest in a discharged state under voltage that is below the open circuit voltage (OCV) in Type 2 mode. This approach can provide an opportunity for any droplets, comprising positive electrode material, that may have formed in the electrolyte or negative current collector to settle down to the positive electrode and recombine with the positive electrode material. In an example, a cell comprises a negative electrode comprising Li or Na and a positive electrode comprising Pb. During charging under Type 2 mode, Pb droplets form in the electrolyte. Subsequent to discharging, the cell is permitted to rest for a given time period at an applied voltage. In such a case, Pb droplets that have formed in the electrolyte settle down (i.e., along the gravitational acceleration vector) to the positive electrode, where they can recombine with the positive electrode.

In some cases, a cell can be operated at a lower charge capacity with respect to a maximum charge capacity of the cell, which can limit the quantity of positive electrode material that may dissolve in the electrolyte. In some examples, a cell can be operated at a charge capacity that is about 95%, 90%, 80%, 70%, 60%, 50%, 40%, 30%, 10%, 5% of the maximum charge capacity In some cases, a cell can be operated in both a high voltage (Type 2) operating mode and the low voltage (Type 1) operating mode. This may provide a driving force for the material of the positive electrode (e.g., $Pb^{2+}$) to redeposit onto the positive electrode during the Type 1 mode, which can help minimize, if not prevent, the material of the positive electrode form depositing in the electrolyte or the negative electrode.

A cell can be cycled between Type 1 and Type 2 modes of operation. A cell can be initially charged (or discharged) under Type 1 mode to a given voltage (e.g., 0.5 V to 1 V), and subsequently charged (then discharged) under Type 2 mode to a higher voltage (e.g., 1.5 V to 2.5 V, or 1.5 V to 3 V).

During cell operation, material (e.g., Fe) from a wall of the cell can react under the higher voltage potential (e.g., Type 2 mode), and ionize as a soluble species in the electrolyte. Hence, the wall material can dissolve into the electrolyte and subsequently interfere with the cell's electrochemistry. For example, the dissolved material can deposit on the negative electrode, which, in some cases, can grow as dendrites and stretch across the electrolyte to one or more walls of the cell, or toward the positive electrode, which can result in a short failure. The present disclosure provides various approaches for suppressing or otherwise helping minimize the dissolution of solid (passive) cell material such as Fe and its potentially negative effects on cell performance by, for example, formation of dendrites and cell shorting. In some cases, a cell can be designed such that increased spacing between the negative electrode and a wall of the cell suppresses or otherwise helps minimize the ability of dendrites from forming and shorting the wall to the inner wall. A cell can include an electrically insulating, and chemically stable sheath or coating between one or more walls of the cell and the negative electrode, electrolyte and/or positive electrode to minimize or prevent shorting to the one or more walls of the cell. In some cases, the cell can be formed of a non-ferrous container or container lining, such as a carbon-containing material (e.g., graphite), or a carbide (e.g., SiC, TiC), or a nitride (e.g., TiN, BN), or a chemically stable metal (e.g., Ti, Ni, B). The container or container lining material may be electrically conductive. Such non-limiting approaches can be used separately or in combination, for suppressing or otherwise helping minimize chemical interactions with Fe or other cell wall materials, and any subsequent negative effects on cell performance.

Although electrochemical cells of the present disclosure have been described, in some examples, as operating in a Type 1 mode or Type 2 mode, other modes of operation are possible. Type 1 mode and Type 2 mode are provided as examples and are not intended to limit the various modes of operation of electrochemical cells disclosed herein.

Type 2 Chemistries

Another aspect of the present disclosure provides Type 2 cell chemistries. In some cases, cells operated under Type 2 mode can operate at a voltage between electrodes that can exceed those of cells operated under Type 1 mode. In some cases, Type 2 cell chemistries can operate at a voltage between electrodes that can exceed those of Type 1 cell chemistries operated under Type 1 mode. Type 2 cells can be operated in Type 2 mode. During operation at an operating temperature of the Type 2 cell, the Type 2 cell can have a negative electrode, electrolyte and positive electrode in a liquid (or molten) state. A cell can include components that are solid or semi-solid, such as a solid intermetallic layer between the electrolyte and the positive electrode. Products of the electrochemical cycle may include the formation of alloyed species that may be liquid, semi-liquid, or solid, and may be soluble and/or immiscible with the electrode materials and/or the electrolyte salt. In some cases, the intermetallic layer is observed under Type 1 mode of operation but not Type 2 mode of operation. For example, the intermetallic layer (e.g., the intermetallic layer in FIG. 4) may not form during operation of a Type 2 cell.

A Type 2 cell operating in Type 2 mode can have components (e.g., negative electrode, electrolyte, positive electrode) that are fully liquid. A Type 2 cell operating in Type 2 mode can have solid or semi-solid components, such as an intermetallic.

A cell with a Type 2 chemistry can include a molten alkali or alkaline earth metal (e.g., lithium, magnesium, sodium) negative electrode and an electrolyte adjacent to the negative electrode. The electrolyte can include a halide salt (e.g., LiF, LiCl, LiBr, $MgCl_2$, NaI). The electrolyte can comprise a mixture of salts (e.g., 25:55:20 mol % LiF:LiCl:LiBr, 50:37:14 mol % LiCl:LiF:LiBr, etc.). The cell with a Type 2 chemistry can include a molten metal positive electrode comprising one or more transition metals. In some cases, the positive electrode comprises zinc (Zn), cadmium (Cd) and mercury (Hg) or combination thereof, or such material(s) in combination with other metals, metalloids or non-metals, such as, for example, a Zn—Sn alloy, Zn—Sn alloy, Cd—Sn alloy, Zn—Pb alloy, Zn—Sb alloy, or Bi. In an example, the positive electrode can comprise 15:85, 50:50, 75:25 or 85:15 mol % Zn:Sn.

In some examples, the electrolyte may comprise two or more phases. In some cases, formation of an additional phase (e.g., a solid phase or a second liquid phase) may suppress species cross-over (e.g., $Zn^{2+}$ containing salt crossing over from near the positive electrode to the negative electrode). Phase separation may result in formation of inter-salt compounds (e.g. compounds formed from of $ZnCl_2$ and LiCl, etc.). In one example, operating temperature can be reduced to suppress $Zn^{2+}$ solubility in a Li-halide salt phase in contact with the negative electrode (e.g., phase formed due to stratification of two electrolyte phases). Solubility of Zn metal in Li-halide salts may be negligible in some cases. In another example, a solid Zn-halide salt can be formed adjacent to (e.g., in the vicinity of or in contact with) the positive electrode. In yet another example, viscosity of the electrolyte salt can be increased to suppress thermally driven convection of given species (e.g., salt comprising Zn-halide) toward the negative electrode (e.g., vertically upward to the negative electrode). The electrolyte may comprise salts of the positive electrode species. Such salts may be formed as the positive electrode species dissolves into the electrolyte (e.g., during charging). In some cases, such salts (e.g., $ZnCl_2$) may suppress a melting point of the electrolyte.

In some cases, a Type 2 cell can operate at a voltage of at least about 0.5 V, 1 V, 1.5 V, 2 V, 2.5 V, or 3 V in a charged state. In some cases, a Type 2 cell can have an open circuit voltage (OCV) of at least about 0.5 V, 1 V, 1.5 V, 2 V, 2.5 V, or 3 V. In an example, a Type 2 cell has an open circuit voltage greater than about 1 V, greater than about 2 V, or greater than about 3 V. In some cases, a charge cutoff voltage of a Type 2 cell is from about 1 V to 3 V, 1.5 V to 2.5 V, 1.5 V to 3 V, or 2 V to 3 V in a charged state. In some cases, a charge cutoff voltage (CCV) of a Type 2 cell is at least about 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V or 3.0 V. In an example, a Type 2 cell has a charge cutoff voltage of at least about 1.7 V after at least about 100 charge/discharge cycles. The operating voltage of a Type 2 cell can be from about 1 V to 2 V, 1 V to 3 V, 1.5 V to 2.5 V, 1.5 V to 3 V, or 2 V to 3 V in a charged state. A Type 2 cell can provide such voltage(s) (e.g., voltage, OCV and/or CCV) upon operating at up to and exceeding about 10 cycles, 20 cycles, 30 cycles, 40 cycles, 50 cycles, 100 cycles, 200 cycles, 300 cycles, 400 cycles, 500 cycles, 600 cycles, 700 cycles, 800 cycles, 900 cycles, 1000 cycles, 2000 cycles, 3000 cycles, 4000 cycles, 5000 cycles, 10,000 cycles, 20,000 cycles, 50,000 cycles, 100,000 cycles, 1,000,000 or more cycles. In some cases, the limiting factor on the number of cycles may be dependent on, for example, the housing and/or the seal as opposed to the chemistry of the negative electrode, electrolyte and/or the positive electrode. The limit in cycles may be dictated not by the electrochemistry, but by the degradation of non-active components of the cell, such as the container or seal. A cell can be operated without a substantial decrease in capacity. The operating lifetime of a cell can be limited, in some cases, by the life of the container, seal and/or cap of the cell.

A Type 2 cell may have various advantages. For instance, a Type 2 cell may include one or more elements that are more abundant and readily accessible. A Type 2 cell may be less hazardous and toxic than other chemistries. In addition, some Type 2 chemistries can have valence states that help avoid, or minimize, oxidization and/or reduction ("redox") shuttling reactions which can reduce Coulombic efficiency. In some examples, the positive electrode can comprise a metal or metalloid that has only one stable oxidation state (e.g., a metal with a single or singular oxidation state). For example, the positive electrode (e.g., the active material in the positive electrode) may comprise a Group 12 element, such as zinc and/or cadmium, which may only exhibit a single valence state compared to transition metals (e.g., iron, cobalt, nickel) or metalloids (e.g., lead, antinomy). In some examples, the positive electrode may comprise a Group 12 element with a singular stable oxidation state (e.g., Zn or Cd). In some examples, the positive electrode may comprise a transition metal with a singular stable oxidation state. A Type 2 cell of the present disclosure can have an energy storage capacity of at least about 1 Wh, 5 Wh, 25 Wh, 50 Wh, 100 Wh, 500 Wh, 1 kWh, 1.5 kWh, 2 kWh, 3 kWh, 5 kWh, 10 kWh, 15 kWh, 20 kWh, 30 kWh, 40 kWh, or 50 kWh, and a current density of at least about 10 $mA/cm^2$, 20 $mA/cm^2$, 30 $mA/cm^2$, 40 $mA/cm^2$, 50 $mA/cm^2$, 60 $mA/cm^2$, 70 $mA/cm^2$, 80 $mA/cm^2$, 90 $mA/cm^2$, 100 $mA/cm^2$, 200 $mA/cm^2$, 300 $mA/cm^2$, 400 $mA/cm^2$, 500 $mA/cm^2$, 600 $mA/cm^2$, 700 $mA/cm^2$, 800 $mA/cm^2$, 900 $mA/cm^2$, 1 $A/cm^2$, 2 $A/cm^2$, 3 $A/cm^2$, 4 $A/cm^2$, 5 $A/cm^2$, or 10 $A/cm^2$.

Type 2 cells can have cell configurations and be included in energy storage systems of the present disclosure. A Type 2 cell can be provided in an energy storage device comprising at least 1, 2, 3, 4, 5, 6, 7, 8, 9, 10, 20, 30, 40, 50, 60, 70, 80, 90, 100, 200, 300, 400, 500, 1000, 10,000, 20,000, 50,000, 100,000, 500,000, or 1,000,000 cells, which may be Type 2 cells or a combination of Type 1 cells and Type 2 cells (e.g., 50% Type 1 cells and 50% Type 2 cells). Such cells can be operated under Type 2 mode. In some cases, a first portion of the cells may be operated in Type 1 mode, and a second portion of the cells may be operated in Type 2 mode.

In an example, a Type 2 cell comprises Li∥Zn. In a charged state, the Li∥Zn cell can have a cell voltage of at least about 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In an example, the Li∥Zn cell has an OCV of about 1.86 V. A Li∥Zn cell can be operated at a temperature of at least about 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

In an example, a Type 2 cell comprises Na∥Zn. In a charged state, the Na∥Zn cell can have a cell voltage of at least about 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. In an example, the Na∥Zn cell has an OCV of about 1.6 V. A Na∥Zn cell can be operated at a temperature of at least about 100° C., 150° C., 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

In another example, a Type 2 cell comprises Li∥Zn-Sn. Here, Sn can be added to reduce the melting point of the positive electrode and reduce the activity of Zn in the positive electrode, which can provide a driving force for removing Zn droplets that may form in the electrolyte. In a charged state, the Li∥Zn-Sn cell can have a cell voltage of at least about 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. A Li∥Zn-Sn cell can be operated at a temperature of at least about 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

In another example, a Type 2 cell comprises Na||Zn-Sn. In a charged state, the Na||Zn-Sn cell can have a cell voltage of at least about 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V. A Na||Zn-Sn cell can be operated at a temperature of at least about 100° C., 150° C., 200° C., 250° C., 300° C., 350° C., 400° C., 450° C., 500° C., 600° C., 700° C., 800° C., or 900° C. In such a case, the negative electrode, electrolyte and positive electrode are in a liquid (or molten) state.

Energy Storage Systems

Also provided herein are control systems including computers programmed to control an energy storage system of the disclosure. An energy storage system can include an electrochemical energy storage device with one or more electrochemical energy storage cells. The device can be coupled to a computer system that regulates the charging and discharging of the device. The control system may a computer processor that is programmed to monitor a temperature (e.g., first temperature or second temperature) of the energy storage cells or the container. The control system may regulate flow of electrical energy into or from at least a subset of the energy storage cells. The computer system can include one or more computer processors and a memory location coupled to the computer processor. The memory location comprises machine-executable code that, upon execution by the computer processor, implements any of the methods above or elsewhere herein.

In some implementations, an electrochemical energy storage system comprises at least a first electrochemical cell adjacent to a second electrochemical cell. Each of the first and second electrochemical cells can comprise a negative current collector, negative electrode, electrolyte, positive electrode and a positive currently collector, where at least one of the negative electrode, electrolyte and positive electrode are in a liquid state at an operating temperature of the first or second electrochemical cell. A positive current lead of the first electrochemical cell can be directly metal-to-metal joined (e.g., brazed or welded) to the negative current lead of the second electrochemical second cell. In some cases, the first and second electrochemical cells are not connected by wires.

Figure 5:
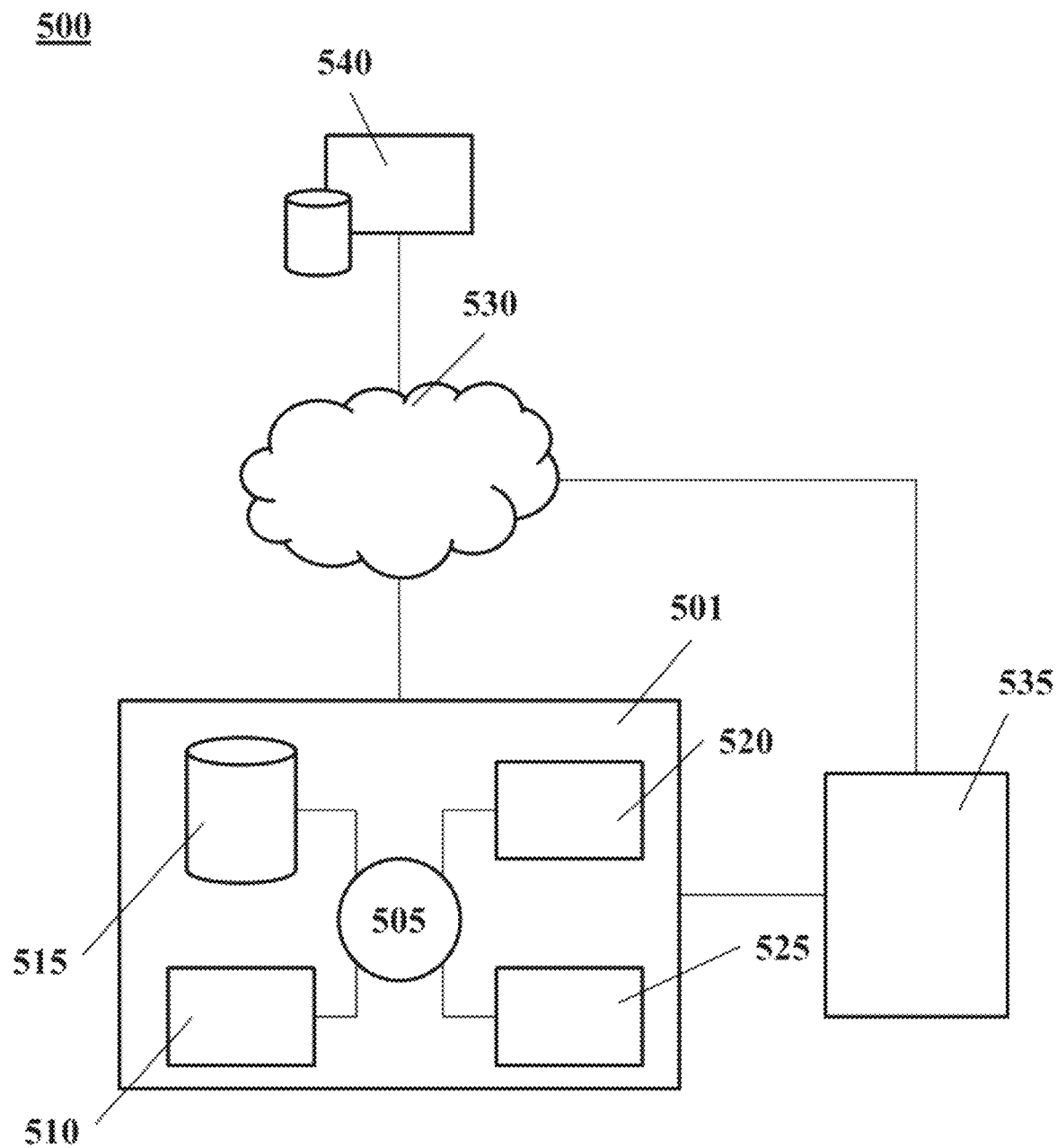
FIG. 5 shows a system programmed or otherwise configured to control or regulate one or more process parameters of an energy storage system of the present disclosure.

FIG. 5 shows a system 500 programmed or otherwise configured to control or regulate one or more process parameters of an energy storage system of the present disclosure. The system 500 includes a computer server ("server") 501 that is programmed to implement methods disclosed herein. The server 501 includes a central processing unit (CPU, also "processor" and "computer processor" herein) 505, which can be a single core or multi core processor, or a plurality of processors for parallel processing. The server 501 also includes memory 510 (e.g., random-access memory, read-only memory, flash memory), electronic storage unit 515 (e.g., hard disk), communication interface 520 (e.g., network adapter) for communicating with one or more other systems, and peripheral devices 525, such as cache, other memory, data storage and/or electronic display adapters. The memory 510, storage unit 515, interface 520 and peripheral devices 525 are in communication with the CPU 505 through a communication bus (solid lines), such as a motherboard. The storage unit 515 can be a data storage unit (or data repository) for storing data. The server 501 can be operatively coupled to a computer network ("network") 530 with the aid of the communication interface 520. The network 530 can be the Internet, an internet and/or extranet, or an intranet and/or extranet that is in communication with the Internet. The network 530 in some cases is a telecommunication and/or data network. The network 530 can include one or more computer servers, which can enable distributed computing, such as cloud computing. The network 530, in some cases with the aid of the server 501, can implement a peer-to-peer network, which may enable devices coupled to the server 501 to behave as a client or a server. The server 501 can be coupled to an energy storage system 535 either directly or through the network 530.

The system 500 may comprise a battery management system that is operatively coupled to the energy storage system 535 through, for example, a ballasting member (e.g., electronics designed to balance the electrochemical state-of-charge of cells or cell modules in a series string). The battery management system can be implemented, for example, at the server 501. The ballasting member can include one or more ballasting lines, which can include sensing lines and current flow lines. The ballasting member can be used to divert at least some of the current through the cells through the ballasting member, which can aid in cell balancing. The sensing lines can be configured to enable the battery management system to sense, for example, operating temperature and voltage of one or more cells of the energy storage device of the energy storage system 535. In some implementations, the sensing lines can be non-current carrying lines. The battery management system may comprise a management system board. The battery management system board can have data acquisition capabilities. For example, the battery management system board can include a data acquisition board. The battery management system board may be able to store and/or process data (e.g., the acquired data). For example, the battery management system board may be able to store and/or process the data rather than (or in addition to) converting inputs into digital signals.

The storage unit 515 can store process parameters of the energy storage system 535. The process parameters can include charging and discharging parameters and operational parameters based on values of various ballasting members (e.g., sensing lines, ballasting lines). The server 501 in some cases can include one or more additional data storage units that are external to the server 501, such as located on a remote server that is in communication with the server 501 through an intranet or the Internet.

The server 501 can communicate with one or more remote computer systems through the network 530. In the illustrated example, the server 501 is in communication with a remote computer system 540. The remote computer system 540 can be, for example, a personal computers (e.g., portable PC), slate or tablet PC (e.g., Apple® iPad, Samsung® Galaxy Tab), telephone, Smart phone (e.g., Apple® iPhone, Android-enabled device, Blackberry®), or personal digital assistant.

In some situations, the system 500 includes a single server 501. In other situations, the system 500 includes multiple servers in communication with one another through an intranet and/or the Internet.

Methods as described herein can be implemented by way of machine (or computer processor) executable code (or software) stored on an electronic storage location of the server 501, such as, for example, on the memory 510 or electronic storage unit 515. During use, the code can be executed by the processor 505. In some cases, the code can be retrieved from the storage unit 515 and stored on the memory 510 for ready access by the processor 505. In some situations, the electronic storage unit 515 can be precluded, and machine-executable instructions are stored on memory 510. Alternatively, the code can be executed on the second computer system 540.

The code can be pre-compiled and configured for use with a machine have a processer adapted to execute the code, or can be compiled during runtime. The code can be supplied in a programming language that can be selected to enable the code to execute in a pre-compiled or as-compiled fashion.

Aspects of the systems and methods provided herein, such as the server 501, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Various parameters of an energy storage system can be presented to a user on a user interface (UI) of an electronic device of the user. Examples of UI's include, without limitation, a graphical user interface (GUI) and web-based user interface. The UI (e.g., GUI) can be provided on a display of an electronic device of the user. The display can be a capacitive or resistive touch display. Such displays can be used with other systems and methods of the disclosure.

Interconnections

Wired or wire-less (e.g., direct metal-to-metal) interconnections may be formed between individual electrochemical cells and/or between groups of electrochemical cells (e.g., modules, towers, packs, trays, cores, CEs, systems, or any other group comprising one or more electrochemical cells). In some cases, groups of cells may be joined via one or more cell-to-cell interconnections. In some cases, groups of cells may be joined via a group-level interconnection. The group-level interconnection may further comprise one or more interconnections with one or more individual cells of the group. The interconnections may be structural and/or electrical. Cells and/or groups of cells may be assembled (or stacked) horizontally or vertically. Such assembled cells and/or groups of cells may be arranged in series or parallel configurations. Further, groups of cells may be supported by various frames. The frames may provide structural support and/or participate or aid in forming the interconnections (e.g., frames on groups of cells may mate or be connected).

In some implementations, interconnections may be configured to decrease resistance (e.g., internal resistance) in a system (e.g., a battery). A battery with a low system resistance (e.g., such that the battery is capable of efficiently storing energy and delivering power) may be desirable in some cases. The system resistance can be determined by the combined effect of a plurality of resistances along the current flow path such as between electrochemical cells, within electrochemical cells, and between groups of electrochemical cells. In some cases, electrochemical cells or groups thereof are connected using interconnects. In some instances, an interconnect is a wire. However, the shortest possible electrical connection can generally lead to the lowest system resistance. Therefore, the present disclosure describes direct connection of cells to each other (e.g., by brazing), in some cases reducing or eliminating the use of wires to connect electrochemical cells.

In some implementations, a battery comprises a plurality of electrochemical cells connected in series, where the battery is capable of storing at least about 10 kWh of energy, the battery has an operating temperature of at least about 250° C., and each of the electrochemical cells has at least one liquid metal electrode. The battery can be any suitable size. In some cases, the battery is capable of storing at least about 10 kilo-Watt-hours of energy. In some cases, the battery is capable of storing at least about 30 kilo-Watt-hours of energy. In some cases, the battery is capable of storing at least about 100 kilo-Watt-hours of energy.

The internal resistance of the battery can be any suitably low resistance. In some cases, the internal resistance of the battery (e.g., at the operating temperature) is about $2.5*n*R$, where 'n' is the number of series connected modules of the battery and 'R' (also referred to herein as '$R_{Module}$') is the resistance of each of the individual modules or parallel connected modules. In some examples, R is the inverse of the sum of the inverses of the resistance of each electrochemical cell in a given module, as given by, for example, $1/R_{Module} = \sum_{i=1}^{m} 1/R_i$, where 'm' is the number of cells in one module. Each module can include a plurality of electrochemical cells in a parallel configuration. Electrochemical cells in adjacent modules can be arranged in a series configuration (e.g., individual cells in a module can be connected in series with corresponding individual cells in an adjacent module, such as, for example, in a configuration where individual cells of a first module are connected in series with individual cells of a second module located above the first module). In some cases, the internal resistance of the battery (e.g., at the operating temperature) is about $2*n*R$, about $1.5*n*R$, about $1.25*n*R$, or about $1.05*n*R$. In some cases, the internal resistance of the battery (e.g., at the operating temperature) is less than about $2.5*n*R$, less than about $2*n*R$, less than about $1.5*n*R$, less than about $1.25*n*R$, or less than about $1.05*n*R$. In some cases, the total system resistance (e.g., at the operating temperature) is greater than about $1.0*n*R$ due to the resistance contribution of interconnects, busbars, surface contact resistance at connection interfaces, etc. The battery can comprise electrochemical cells connected in series and in parallel. The number of electrochemical cell modules (or parallel connected modules) that are connected in series (i.e., n) can be any suitable number. In some examples, n is at least 3, at least 5, at least 6, at least 10, at least 12, at least 15, at least 16, at least 20, at least 32, at least 48, at least 54, at least 64, at least 108, at least 128, at least 216, or at least 256. In an example, n is 3 (e.g., for a battery comprising a pack), 6 (e.g., for a battery comprising a pack), or 216 (e.g., for a battery comprising a core).

In some cases, the electrochemical cells are not connected with wires. In some examples, series connections (e.g., wire-less cell-to-cell connections) are created with a connection that has an internal resistance of about 0.5 milliohm (mOhm), about 1 mOhm, about 2 mOhm, about 5 mOhm, about 10 mOhm, about 50 mOhm, about 100 mOhm, or about 500 mOhm at an operating temperature greater than 250° C. In some examples, series connections are created with a connection that has an internal resistance of less than about 0.5 mOhm, less than about 1 mOhm, less than about 2 mOhm, less than about 5 mOhm, less than about 10 mOhm, less than about 50 mOhm, less than about 100 mOhm, or less than about 500 mOhm at an operating temperature greater than about 250° C. In some instances, the resistance is measured by a direct electrical connection between the conductor of a first electrochemical cell and the electrically conducting housing of a second cell. Any aspects of the disclosure described in relation to internal resistance of cell-to-cell series connections may equally apply to series connections between groups of cells at least in some configurations.

In some implementations, an electrochemical energy storage system comprises at least a first electrochemical cell adjacent to a second electrochemical cell, each of the first and second electrochemical cells comprising a negative current collector, negative electrode, electrolyte, positive electrode and a positive currently collector. The negative electrode, electrolyte and positive electrode can be in a liquid state at an operating temperature of the first or second electrochemical cell. A positive current collector of the first electrochemical cell can be direct metal-to-metal joined (e.g., brazed) to the negative current collector of the second electrochemical second cell. In some examples, the negative current collector comprises a negative current lead.

In some cases, the first and second electrochemical cells are not connected by wires. In some cases, the electrochemical energy storage system comprises one or fewer interconnects for every 2, 3, 4, 5, 6, 7, 8, 9, 10, 11, 12, 13, 14, 15, 16, 17, 18, 19, 20, 21, 22, 23, 24, 25, 26, 27, 28, 29, 30, or more electrochemical cells. In some cases, the electrochemical energy storage system (e.g., battery) comprises one interconnect for at least every 1, 2, 3, 4, 5, 6, 7, 8, 9, 10, 15, 20, 25, 30, 40, 50, 75, 100, 150, 200, or more electrochemical cells.

Figure 6:
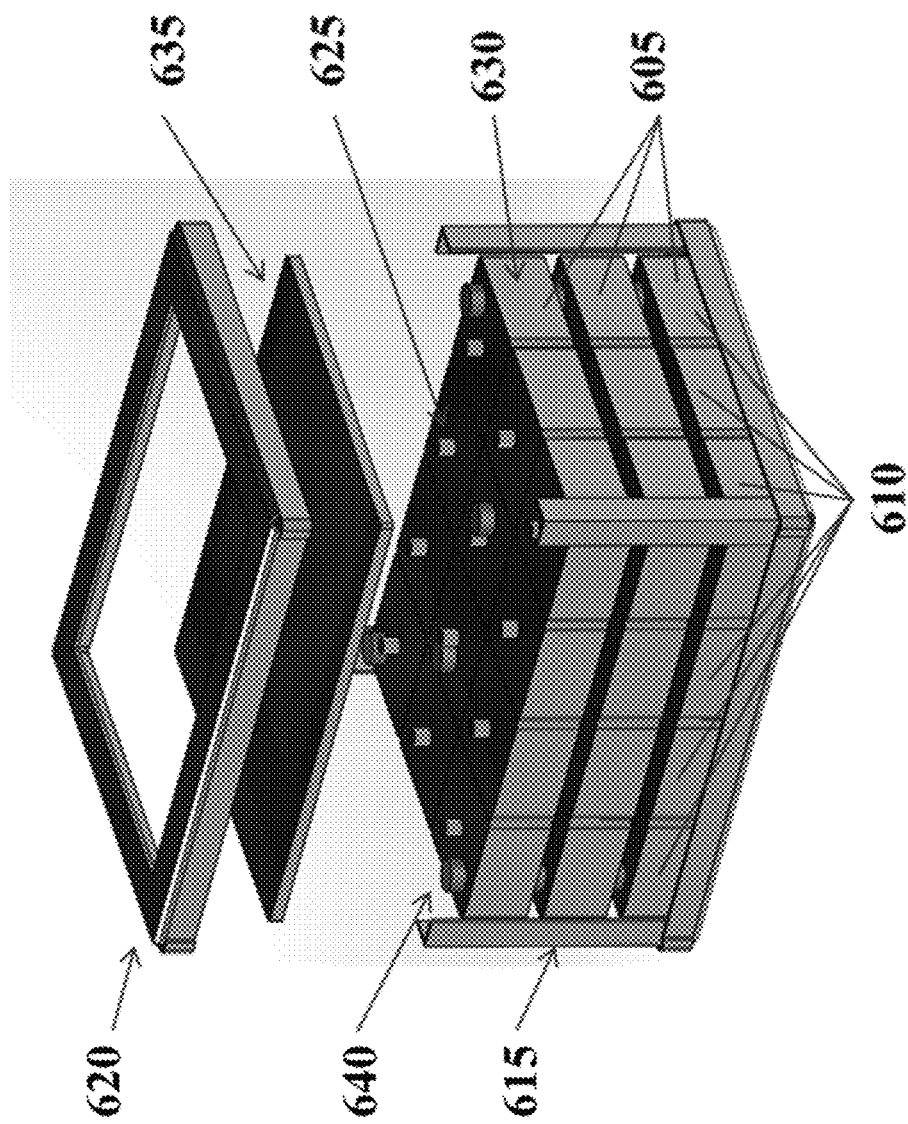
FIG. 6 shows an example of a cell pack.

FIG. 6 shows an example of a cell pack 600 comprising 3 modules 605. Each of the modules comprises 12 cells 630 that are connected in parallel 610. The modules are held in place with cell pack framing (also "frame" herein) 615 that includes a top component of the frame 620. The cells are stacked directly on top of each other with the negative current terminal of one cell 625 contacted directly with the housing of another cell (e.g., the cell above it). The negative current terminals of the top layer of cells can have no housing of another cell directly above, so can instead be contacted (e.g., brazed to) a negative busbar 635.

In some configurations, the parallel connections 610 made in the module can be created using a single piece (or component) with multiple pockets for cell materials. This piece can be a stamped component that allows for direct electrical connection between cells. In some examples, the stamped pocketed electrically conductive housing does not create a barrier between the cells. In some cases, the pocketed electrically conductive housing seals the pockets from each other. This electrically conductive housing can be easier to manufacture and assemble than individual electrically conductive cell housings.

When stacked vertically, the electrochemical cells bear the weight of the cells stacked above. The cells can be constructed to support this weight. In some cases, cell-to-cell spacers 640 are placed between the layers of cells. These spacers can disperse the weight of the above cells and/or relieve some of the weight applied to the negative current terminals. In some cases, the negative current terminals are electrically isolated from the housing with a seal. This seal can be the weakest structural component of the electrochemical cell, so the spacers can reduce the amount of force applied to the seals.

In some implementations, a liquid metal battery comprises a plurality of electrochemical cells each comprising an electrically conductive housing and a conductor in electrical communication with a current collector. The electrically conductive housing can comprise a negative electrode, electrolyte and positive electrode that are in a liquid state at an operating temperature of the cell. The conductor can protrude through the electrically conductive housing through an aperture in the electrically conductive housing and can be electrically isolated from the electrically conductive housing with a seal. The plurality of electrochemical cells can be stacked in series with the conductor of a first cell in electrical contact with the electrically conductive housing of a second cell. The liquid metal battery can also comprise a plurality of non-gaseous spacers disposed between the electrochemical cells. In some cases, the electrochemical cells are stacked vertically. For example, at least 2, 3, 4, 5, 6, 7, 8, 9, 10, 15, 20, 25, 30, 36, 40, 48, 50, 60, 70, 80, 90, 100, 120, 140, 160, 180, 200, 216, 250, 256, 300, 350, 400, 450, 500, 750, 1000, 1500, 2000 or more electrochemical cells can be stacked in series. In some cases, the battery further comprises at least one additional electrochemical cell connected in parallel to each of the plurality of electrochemical cells that are stacked in series. For example, each vertically stacked cell can be connected in parallel with at least 1, 2, 3, 4, 5, 6, 7, 8, 9, 10, 15, 16, 20, 25, 30, 40, 50, 60, 70, 80, 90, 100, 120, 140, 160, 180, 200, 250, 300, 350, 400, 450, 500, 750, 1000, 1500, 2000 or more additional electrochemical cells. In some cases, the electrically conductive housings are part of a current conducting pathway.

The non-gaseous spacers (also "spacers" herein) can be a solid material. In some cases, the spacers comprise a ceramic material. Non-limiting examples of ceramic materials include aluminum nitride (AlN), boron nitride (BN), yttrium oxide ($Y_2O_3$), zirconium oxide ($ZrO_2$), yttria partially substituted zirconia (YPSZ), aluminum oxide ($Al_2O_3$), chalcogenides, erbium oxide ($Er_2O_3$), silicon dioxide ($SiO_2$), quartz, glass, or any combination thereof. In some cases, the spacers are electrically insulating.

The spacers can have any suitable thickness. In some cases, the thickness of the spacer is approximately equal to the distance that the conductor protrudes through the electrically conductive housing (e.g., the thickness of the spacer can be within about 0.005%, about 0.01%, about 0.05%, about 0.1% or about 0.5% of the distance that the conductor protrudes through the electrically conductive housing).

The majority of the force (e.g., the weight of electrochemical cells stacked vertically above a cell) is generally born by the spacers and/or housing rather than the seals. The non-gaseous spacers and/or the electrically conductive housing can support any suitably high percentage of the applied force. In some cases, about 70%, about 80%, about 90%, about 95%, or about 95% of the force is applied to the non-gaseous spacers and/or the electrically conductive housing. In some cases, at least about 70%, at least about 80%, at least about 90%, at least about 95%, or at least about 95% of the force is applied to the non-gaseous spacers and/or the electrically conductive housing.

There can be any suitable amount of force applied to the electrically conductive housing and/or seal. In some instances, the force applied to the seal is no greater than the seal can support. In some cases, the force applied to the seal is about 10, about 15, about 20, about 25, about 30, about 35, about 40, about 45, about 50, about 60, about 70, about 80, about 100, about 120, about 150, or about 200 Newtons. In some cases, the force applied to the seal is less than about 10, less than about 15, less than about 20, less than about 25, less than about 30, less than about 35, less than about 40, less than about 45, less than about 50, less than about 60, less than about 70, less than about 80, less than about 100, less than about 120, less than about 150, or less than about 200 Newtons. In some cases, the force applied to the housing is about 100, about 500, about 1000, about 5000, or about 10000 Newtons. In some cases, the force applied to the housing is at least about 100, at least about 500, at least about 1000, at least about 5000, or at least about 10000 Newtons.

There can be any suitable amount of pressure applied to the electrically conductive housing and/or seal. In some instances, the pressure applied to the seal is no greater than the seal can support. In some cases, the pressure applied to the seal is about 1, about 10, about 50, about 100, about 200, about 300, or about 500 pounds per square inch (psi). In some cases, the pressure applied to the seal is less than about 50, less than about 100, less than about 200, less than about 300, or less than about 500 pounds per square inch (psi). In some cases, the pressure applied to the housing is about 500, about 1000, about 2000, about 2500, about 3000, about 5000, or about 10000 pounds per square inch (psi). In some cases, the pressure applied to the housing is at least about 500, at least about 1000, at least about 2000, at least about 2500, at least about 3000, at least about 5000, or at least about 10000 pounds per square inch (psi).

The cell to cell connections can be configured in a variety of ways based on tolerances and optimal conductive path. In one configuration, the top face of the negative current lead in one cell can be direct metal-to-metal joined (e.g., brazed) to the bottom of the cell above it (see, for example, FIG. 7). Other configurations include, for example, alternative direct metal-to-metal join (e.g., alternative braze join) configurations, such as an outer diameter braze enhanced by differences in the coefficient of thermal expansion (CTE) of the inner rod and the outer fixture (see, for example, FIG. 8).

Figure 7:
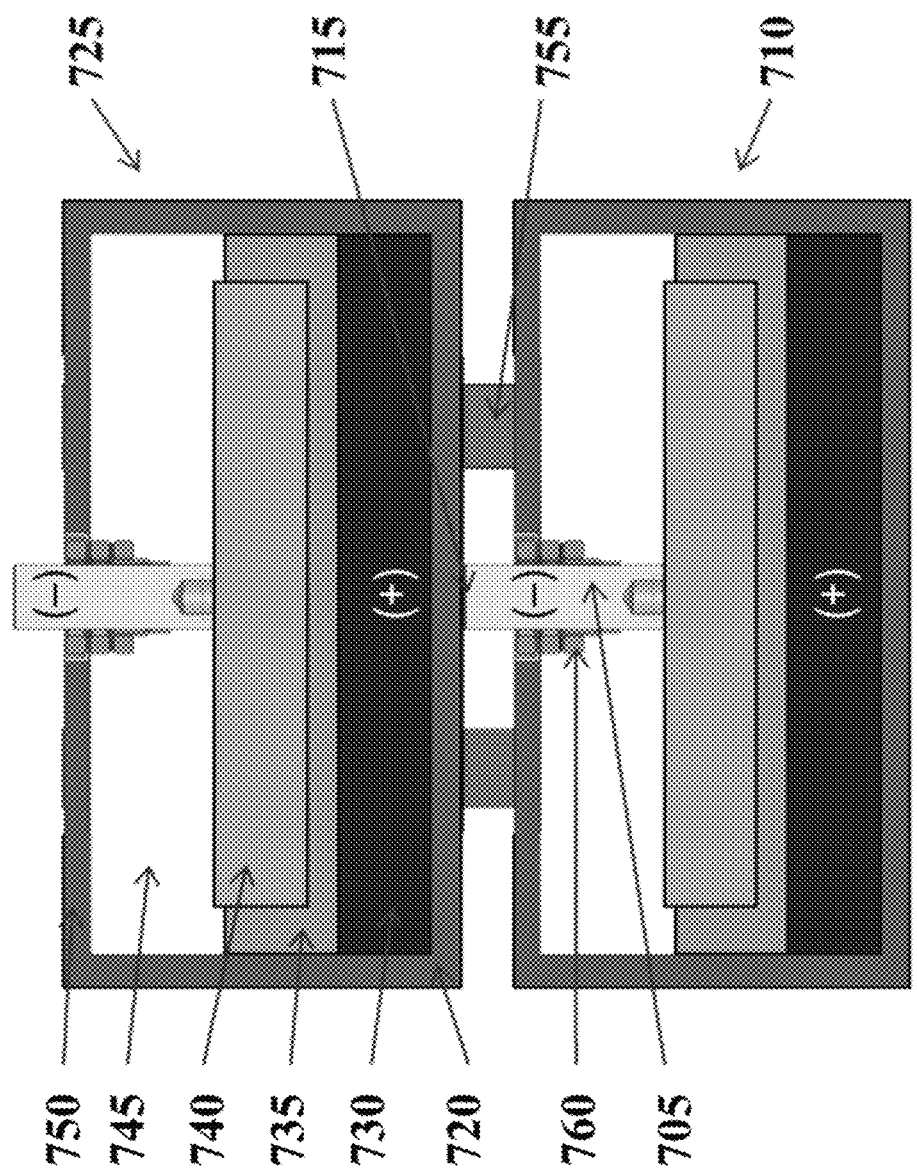
FIG. 7 shows an example of braze connection between the top of a conductive feed-through and the bottom of a cell.

In some cases, as shown in FIG. 7, the conductor 705 of a first cell 710 is brazed 715 to the electrically conductive housing 720 of the second cell 725. The braze material can be any suitable material. Some non-limiting examples of braze materials include materials that comprise iron (Fe), nickel (Ni), titanium (Ti), chromium (Cr), zirconium (Zr), phosphorus (P), boron (B), carbon (C), silicon (Si), or any combination thereof. The cell can comprise a cathode 730, an electrolyte 735 and an anode 740 connected to the current collector and conductor 705. The conductor can feed through the cell lid 750. In some cases, the cell has some empty head space 745.

In some implementations, the conductor 705 can feed through a seal 760 in the cell lid 750. The conductor (e.g., negative current lead) 705 may rigid. The seal 760 may not be rigid. As additional cells are added during assembly, an increasing weight can be exerted on the conductor 705 of the bottom cell 710 by the housing 720 of the top cell 725 (e.g., at the position 715). In some instances, the vertical spacing between the cells 710 and 725 may decrease if the seal 760 (with the conductor 705 and the anode 740) move downward into the cell 710 as a result of the compression force. To ensure that modules are electrically isolated from each other, spacers (e.g., ceramics) 755 can be placed across the surface of the cells to support the cells above them. In this configuration, the cell housing can be used as the main structural support for the system. The ceramic spacer 755 can relieve the seal 760 from having to support the weight of the top cell 725 (and any additional cells added during assembly). In some configurations, there may initially be a gap between the top of the spacers 755 and the bottom of the housing 720 of the top cell 725 (e.g., the thickness of the spacer can be slightly less than the distance that the conductor initially protrudes through the electrically conductive housing), and the spacers (e.g., ceramics) can be placed in compression during assembly as additional cell(s) are added (e.g., as the spacing between the top of the housing of the bottom cell 710 and the bottom of the housing of the top cell 725 decreases). As a result, the displacement (also "anode-cathode displacement" herein) between anodes and cathodes (e.g., final displacement after assembly between the anode 740 and the cathode 730 in cell 710) can in some cases be determined by the non-gaseous spacers. In some configurations, the spacers can be placed in compression right away (e.g., if the thickness of the spacer is slightly greater than the distance that the conductor initially protrudes through the electrically conductive housing).

Figure 8:
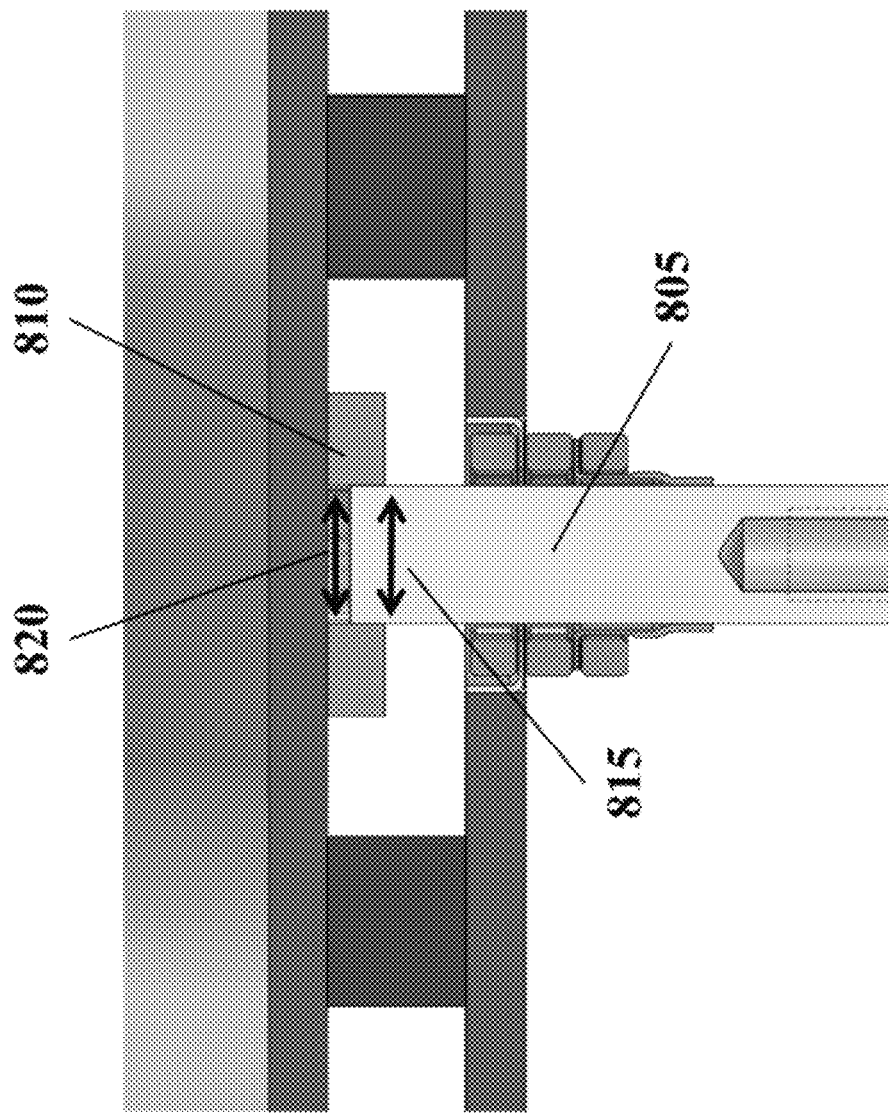
FIG. 8 shows an example of joining two cells using a compression connection between parts that forms at the operating temperature of the battery based on differences in the coefficient of thermal expansion.

In some cases, differences in the coefficient of thermal expansion (CTE) can be used to connect two cells. As shown in FIG. 8, the conductor of the first cell 805 sits in a recessed portion of the electrically conductive housing of the second cell 810, and the coefficient of thermal expansion (CTE) of the conductor 815 is greater than the CTE of the electrically conductive housing 820.

The CTE of the conductor can be any amount greater than the CTE of the electrically conductive housing. In some cases, the CTE of the conductor is about 2%, about 5%, about 10%, about 15%, or about 20% greater than the CTE of the electrically conductive housing. In some cases, the CTE of the conductor is at least about 2%, at least about 5%, at least about 10%, at least about 15%, or at least about 20% greater than the CTE of the electrically conductive housing.

Cells stacked vertically in series can be attached through a hard electrical connection such that the height from 750 to 740 and/or anode-cathode displacement (ACD) can be determined by the dimensional tolerance of 755. In some examples, the height from 750 to 740 can be at least about 3 millimeters (mm), at least about 5 mm, at least about 7 mm, at least about 10 mm, at least about 15 mm, and the like. In some examples, the ACD can be about 3 mm, about 5 mm, about 7 mm, about 10 mm, about 15 mm, or greater. FIG. 7 is an example of how such connections may be configured.

Cells stacked vertically in series can be connected using a hard electrical connection such that resistance per cell connection is reduced, for example, below about 100 mOhm (or another internal resistance value described elsewhere herein). FIG. 7 is an example of how such connections may be configured.

In some implementations, cells can be joined vertically by means of a current transfer plate that is welded to the negative current lead or conductor on the bottom cell, and the cell body (e.g., electrically conductive housing) on the top cell. For example, multiple cells can be connected in parallel into a cell module or a partial cell module, and then connected in series with other cell modules or partial cell modules via vertical stacking. The vertical stacking can be implemented by connecting the current transfer plate from one cell to the cell body or a feature on the cell body on the cell above it (e.g., to form the basis of a cell pack).

In some examples, the welded connection can have an internal resistance of about 0.05 milliohm (mOhm), about 0.1 mOhm, about 0.5 mOhm, about 1 mOhm, about 2 mOhm, about 5 mOhm, about 10 mOhm, about 50 mOhm, about 100 mOhm, or about 500 mOhm at an operating temperature greater than 250° C. In some examples, the series connections can be created with a connection that has an internal resistance of less than about 0.05 mOhm, less than about 0.1 mOhm, less than about 0.5 mOhm, less than about 1 mOhm, less than about 2 mOhm, less than about 5 mOhm, less than about 10 mOhm, less than about 50 mOhm, less than about 100 mOhm, or less than about 500 mOhm at an operating temperature greater than about 250° C.

Figure 13:
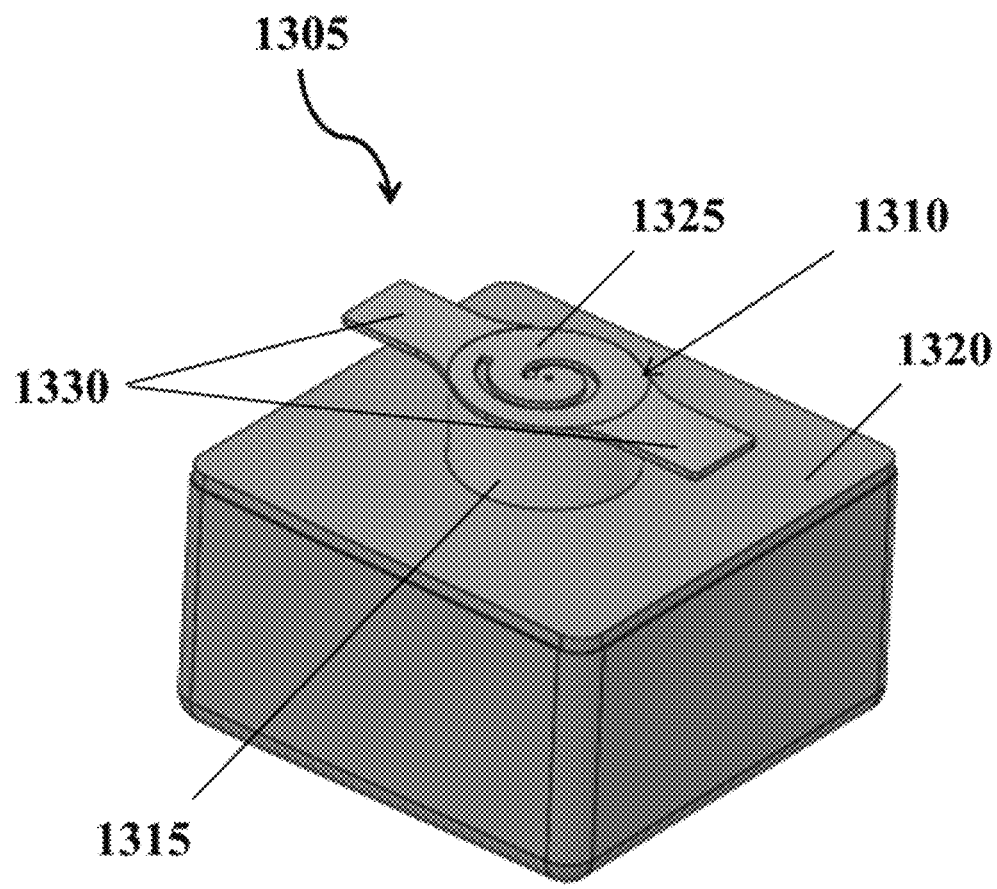
FIG. 13 is a perspective view of an electrochemical cell with a current transfer plate 1310 attached to a negative current lead.

FIG. 13 is a perspective view of an electrochemical cell 1305 with a current transfer plate 1310 connected (e.g., welded) to a negative current lead 1315. The negative current lead can protrude through a housing 1320 of the cell 1305 through a seal (not shown). The current transfer plate can in some instances comprise a main portion 1325 in contact with the negative current lead, and one or more other portions 1330. The other portion(s) can be integrally formed with the main portion. The other portion(s) can be symmetrically (e.g., coaxially) or asymmetrically placed with respect to the main portion. For example, the current transfer plate can comprise a central portion 1325 and one or more flat elongated portions (e.g., flaps, tongues or tabs) 1330. The current transfer plate can be formed from a conductive material, such as any conductive material described herein. The other portion(s) can comprise a flat surface that can be welded or otherwise direct metal-to-metal joined with another surface (e.g., a cell body or a feature on the cell body of an adjacent cell). The current transfer plate (e.g., the other portion(s), such as the elongated portions 1330) can extend from the negative current lead toward the periphery of the cell surface comprising the negative current lead. Such configurations can enable electrical connections to be more conveniently made in tight spaces between cells or in cell assemblies. For example, the elongated portions 1330 can be more conveniently connected (e.g., welded to an adjacent cell body) during vertical stacking of cells because they can be more conveniently accessed (e.g., when accessing the cell from a direction parallel to the surface comprising the negative current lead, the connection can be made at the periphery of the surface comprising the negative current lead rather than near the center).

The current transfer plate may be combined with or comprise a strain relieving function to reduce stress on the seal (e.g., the seal around the negative current lead) that may be generated by the welding/joining process and/or thermal expansion differences during heat-up and/or cool-down. In some cases, the stresses on the seal may be reduced by including an electrically insulating non-gaseous (e.g., ceramic) spacer. The non-gaseous spacer can support the weight from the current transfer plate and/or cells stacked onto the current transfer plate and direct the weight onto the housing (e.g., the cell cap), thereby reducing the portion of the applied weight that is transmitted through the seal. In some cases, the strain relieving function may include a spiral pattern (e.g., a single spiral arm or multiple spiral arms) or other feature on the current transfer plate. The spiral pattern may be created by cutting away and/or removing material from the current transfer plate in the desired pattern. For example, the spiral feature on the main portion 1325 can give the current transfer plate compliance and may reduce stress experienced by the seal as the cells are stacked on top one another or during heat-up due to CTE mismatches. The spiral pattern may comprise one or more spiral arms. The spiral arms may be, for example, about 0.5 mm thick, about 1 mm thick, about 2 mm thick or about 4 mm thick. The spiral arms may create a spiral that has a circular or oval external shape that is about 1 cm, about 2 cm, about 3 cm or about 4 cm or larger in diameter. In some cases, the current transfer plate may be sufficiently compliant such that the strain relieving feature is not needed.

Figure 9:
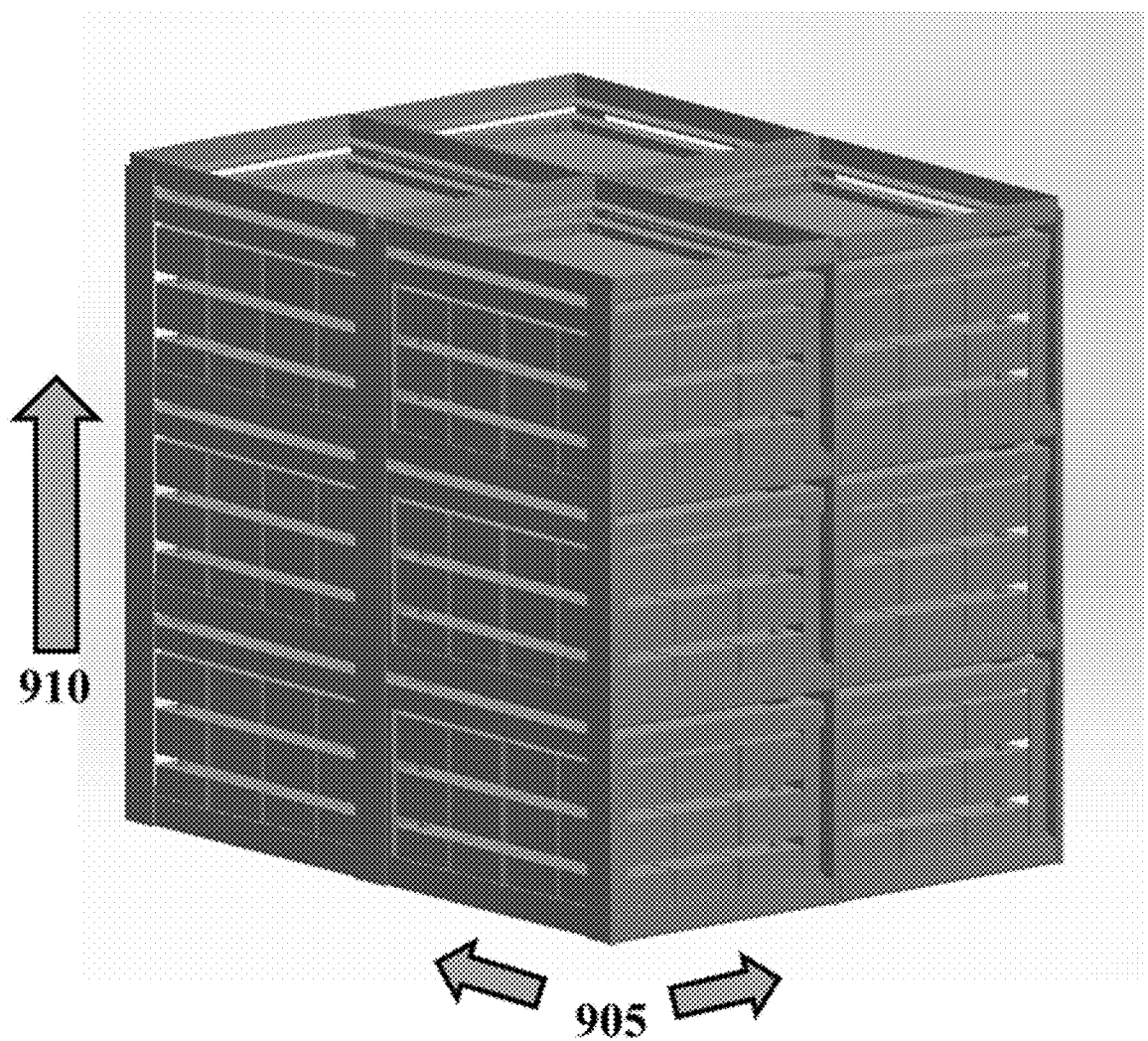
FIG. 9 shows an example of a stack of cell packs, also referred to as a core.

Cell packs can be attached in series and parallel in various configurations to produce cores, CEs, or electrochemical systems. The number and arrangement of various groups of electrochemical cells can be chosen to create the desired system voltage and energy storage capacity. The packs, cores, CEs, or systems can then be enclosed together in high temperature insulation to create a system that can heat itself using the energy created from cells charging and discharging. For example, FIG. 9 is an example of how packs can be configured, indicating that the cell packs in a given plane are connected to one another in parallel 905, while the packs connected directly atop one another are connected in series 910.

The packs themselves can be connected vertically and horizontally to one another through busbars (e.g., unlike the cell-to-cell connections within a pack which can generally be direct connections such as brazes or welds). In some cases, the busbar is flexible or comprises a flexible section (e.g., to accommodate non-isothermal expansion of the system throughout heat up and operation).

A busbar can be used to make an electrical connection with cells in a parallel string (e.g., a parallel string of cells, a parallel string of packs, etc.). In some examples, a busbar can be used to configure a set of cells or cell modules into a parallel string configuration by being electrically connected with the same terminal on all of the cells or cell modules (e.g., the negative terminals of all of the cells or cell modules, or the positive terminals of all of the cell or cell modules). For example, a positive busbar and/or a negative busbar may be used. The positive busbar can be connected to the housing and may or may not need to be flexible. In some cases, the positive busbar may not be used. The negative busbar can be joined to features in (or on) one or more of the cell bodies (e.g., the cell bodies of individual cells in a pack) to provide a strong electrical connection. In some cases, the negative busbar can be attached to conductive feed-throughs (e.g., negative current leads), which may require some compliance for thermal expansion. For example, a flexible connection between a relatively rigid busbar core and the feed-through may be achieved using a compliance feature between the feed-through and the busbar. The compliance feature may involve a spiral pattern (e.g., a single spiral arm or multiple spiral arms) that may be created by cutting away and/or removing material from a flat busbar in the desired pattern. The spiral pattern may involve one or more spiral arms. The spiral arms may be, for example, about 0.5 mm thick, about 1 mm thick, about 2 mm thick or about 4 mm thick. The spiral arms may create a spiral that has a circular or oval external shape that is about 1 cm, about 2 cm, about 3 cm or about 4 cm or larger in diameter. In some cases, the busbar may be sufficiently compliant such that the compliance feature is not needed.

One or more interconnects can be used to connect the busbar of one pack to the busbar of another cell pack, thereby placing the cell packs in parallel or in series. In some cases, the negative busbar of one cell pack is connected to the positive busbar of another cell pack using a compliant interconnection component (also "interconnect" herein). In some cases, the interconnect may be braided metal or metal alloy. In some cases, the interconnect may be made from sheet metal and take the form of a bent sheet that is about 1/32 inch thick, about 1/16 inch thick, about 1/8 inch thick, or about 1/4 inch thick. In some cases, the interconnect may comprise the same conductive material as the busbar. In some cases, the positive busbar and the interconnect are the same component (see, for example, FIG. 14).

The busbar and/or interconnect components can comprise a conductive material. In some cases, the busbar and/or interconnect components can comprise (e.g., be made of) stainless steel or nickel. In some cases, copper can be used as busbar material (e.g., due to its high electrical conductivity of, for example, about 60×10$^6$ S/m at 20° C. and about 20×10$^6$ S/m at 500° C.). For example, copper may be used for high temperature battery systems that operate at less than about 450° C.; however, above about 450° C., copper may be oxidized and/or lose structural integrity and may not be suitable for long-term use in high temperature battery systems. In some cases, the busbar and/or interconnect can comprise (e.g., be made from) a material that has a conductivity greater than stainless steel (e.g., greater than about 2×10$^6$ S/m at 20° C. or greater than about 1×10$^6$ S/m at 500° C.). For example, nickel may be used as a busbar and/or interconnect (e.g., in high temperature batteries) based on its electrical conductivity, which can be greater than the electrical conductivity of stainless steel but less conductive than copper.

In some cases, the busbar and/or interconnect may be made from an aluminum-copper based alloy that may have a conductivity similar to nickel but may be less expensive. Examples of such aluminum-copper based alloy can include, but are not limited to, aluminum-copper, aluminum-bronze or aluminum-brass, where the material comprises about 1 weight-percent aluminum (wt %), about 2 wt % aluminum, about 5 wt % aluminum, about 10 wt % aluminum or about 15 wt % aluminum, with most of the remainder of the material being copper, bronze or brass. Bronze may comprise, for example, about 88 wt % copper and about 12% tin, or primarily copper with other additives and smaller amounts of tin. Brass is a copper-zinc alloy that may comprise, for example, from about 60 wt % to about 90 wt % copper, from about 20 wt % to about 40 wt % zinc, and from about 1 wt % to about 20 wt % other materials such as tin, nickel, iron or lead. In some examples, the material of choice may be a copper-aluminum alloy comprising about 91 wt % copper, about 7 wt % aluminum and about 2 wt % iron. In some examples, the material of choice may be a copper-aluminum alloy comprising about 82 wt % copper, about 5 wt % nickel, about 2 wt % iron and about 10 wt % aluminum. The electrical conductivity of such aluminum-copper alloys at cell operating temperature (e.g., 500° C.) may be about 2×10$^6$ S/m, about 3×10$^6$ S/m, about 4×10$^6$ S/m, about 5×10$^6$ S/m, about 6×10$^6$ S/m, about 7×10$^6$ S/m, about 8×10$^6$ S/m, about 9×10$^6$ S/m, or about 10×10$^6$ S/m.

In some cases, the busbar and/or interconnect component material may comprise (e.g., be made from) copper or a copper alloy that is coated with an oxidation-resistant material such as, for example, aluminum, aluminum-bronze, aluminum-brass, chromium, nickel, stainless steel, or any combination thereof. In some cases, the busbar and/or interconnect may comprise a copper core with a jacket or cladding that is oxidation-resistant, such as, for example, a jacket or cladding comprising aluminum, aluminum-bronze, aluminum-brass, chromium, nickel, stainless steel, or any combination thereof. The electrical conductivity of such coated/jacketed/clad materials may be similar to that of the substrate. For example, copper or a copper alloy jacketed with stainless steel can have a conductivity of about 90-100% that of copper.

A busbar and/or interconnect made from a non-ferrous alloy may be joined (e.g., brazed, press-fit or welded) to one or more end-caps (e.g., stainless steel end-caps) which may then enable the end-caps of the busbar or interconnect to be more easily joined (e.g., welded) to the appropriate busbar/interconnect/cells. For example, an end-cap may be more easily joined to a busbar/interconnect (e.g., at a first connection point of the end-cap) and/or to a cell (e.g., at a second connection point of the end-cap). In some instances, individual end-caps may be configured to join to both a busbar/interconnect and a cell. In some instances, separate end-caps may be provided for joining to a busbar/interconnect and for joining to a cell.

Figure 10:
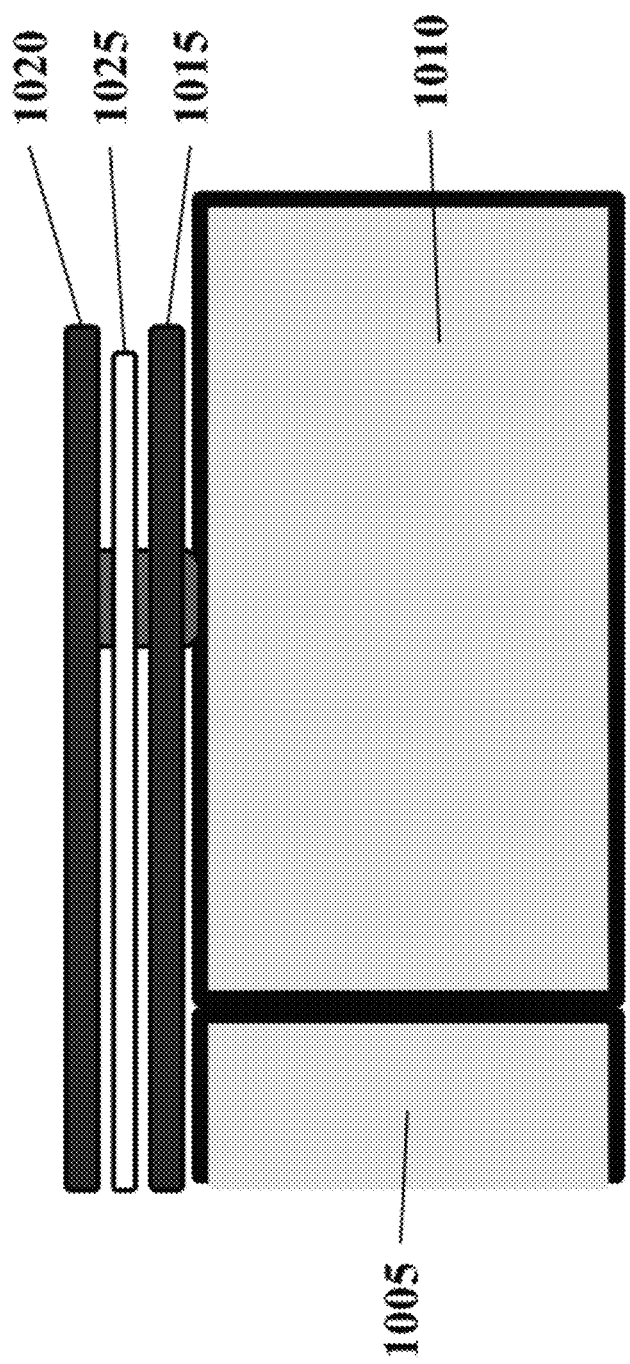
FIG. 10 is an example of a busbar configuration.

The busbars can be configured, for example, as shown in FIG. 10. A first cell 1005 is connected in parallel to a second cell 1010 (e.g., by direct contact of their housings). The connection can comprise a positive busbar 1015 and a negative busbar 1020 separated by a ceramic separator 1025. In some cases, the separator comprises a ceramic material. Non-limiting examples of ceramic materials include aluminum nitride (AlN), boron nitride (BN), yttrium oxide ($Y_2O_3$), zirconium oxide ($ZrO_2$), yttria partially substituted zirconia (YPSZ), aluminum oxide ($Al_2O_3$), silicon dioxide ($SiO^2$), magnesium oxide (MgO), quartz, glass, or any combination thereof. In some cases, the separator is electrically insulating.

In some examples, a connection between any two groups of cells using one or more busbars and/or interconnects has an internal resistance of about 0.01 mOhm, about 0.05 mOhm, about 0.1 mOhm, about 0.2 mOhm, about 0.5 mOhm, about 1 mOhm, about 5 mOhm, about 10 mOhm, about 50 mOhm, or about 100 mOhm. In some examples, a connection between any two groups of cells using one or more busbars and/or interconnects has an internal resistance of at least about 0.01 mOhm, at least about 0.05 mOhm, at least about 0.1 mOhm, at least about 0.2 mOhm, at least about 0.5 mOhm, at least about 1 mOhm, at least about 5 mOhm, at least about 10 mOhm, at least about 50 mOhm, or at least about 100 mOhm. In an example, an internal resistance between a first plurality of electrochemical cells and a second plurality of electrochemical cells connected to a busbar of the first plurality of electrochemical cells is less than about 10 mOhm or less than about 100 mOhm. In some instances, the resistance is measured by the voltage drop across the busbar (and/or interconnect) while current is flowing through the busbar (and/or interconnect) according to the following formula: $R_{busbar}=V/I$, where '$R_{busbar}$' is the resistance of the busbar (and/or interconnect), 'V' is the measured voltage drop across the busbar (and/or interconnect) and 'I' is the current flowing through the busbar (and/or interconnect).

The positive and negative busbars may or may not be separated by a separator. For example, the positive and negative busbars may be provided on opposing ends of a module, pack, or any other group of one or more electrochemical cells. In some cases, the busbars may be physically separated such that a separator is not needed. In some cases, the busbars may be provided on adjacent surfaces of a unit (see, for example, FIG. 14) and a separator may or may not be provided.

Figure 14:
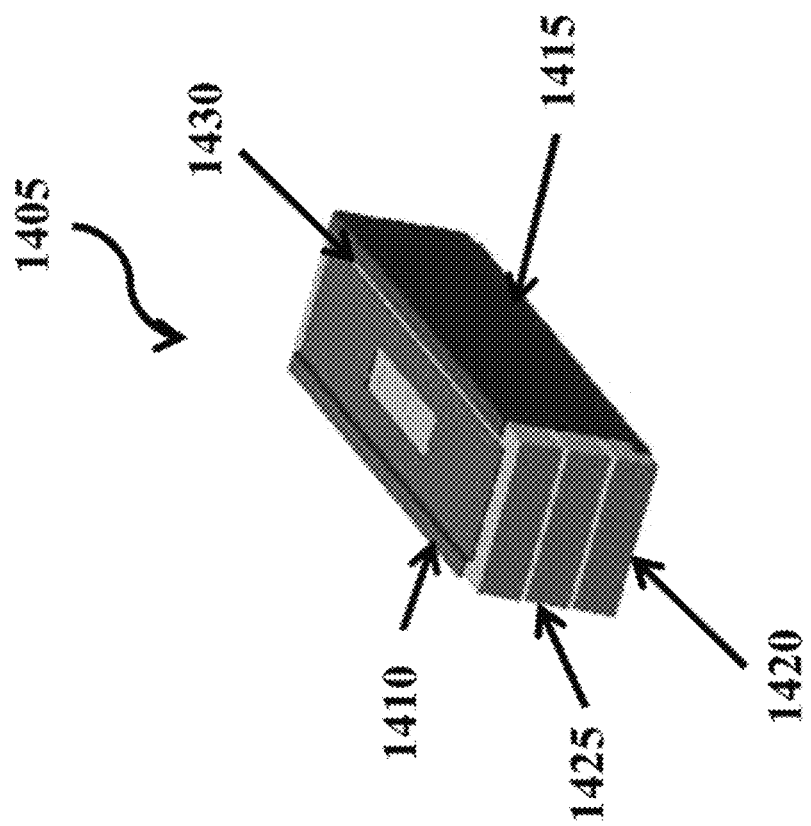
FIG. 14 is an example of a pack with a first interpack busbar and a second interpack busbar.

FIG. 14 is an example of a pack 1405 with a first interpack busbar 1410 (e.g., a negative busbar) and a second interpack busbar 1415 (e.g., a positive busbar). The busbar 1410 may or may not be separated from the busbar 1415 by a separator (e.g., at interface 1430). The busbars 1410 and/or 1415 may in some instances be used to connect the pack 1405 to one or more other packs (e.g., in series or parallel configurations depending on the polarity of the busbar of the other pack).

A busbar connected to a first group of electrochemical cells (e.g., on a pack) may comprise a feature to allow the busbar (and therefore the first group of cells) to be electrically connected to a second group of cells (e.g., another pack). For example, the busbar 1415 or 1410 can comprise a flange, hook, ledge, interlock feature, weldable tab, brazable tab, snap fit or other member to allow the busbar to be interconnected with an adjacent group of cells (e.g., at a connection interface of the adjacent group of cells, to a busbar of the adjacent group of cells, to an interconnect on the adjacent group of cells, to an interconnect between the busbar on the first group of cells and a busbar on the second (adjacent) group of cells, etc.).

Busbar(s) may be configured to snap onto, be joined to (e.g., welded, brazed), or otherwise create a mating connection with a group of electrochemical cells. For example, the busbar 1415 can have a flange, hook, ledge, interlock feature, snap fit, weldable feature, brazable feature, bolted connection or other member that mates with the pack 1405 (e.g., at or near the interface 1430). For example, the busbar may mate with the pack at a connection interface. The connection interface may include one or more walls or housing components of cell(s) in the group of cells. The group of cells (e.g., a pack) may comprise a corresponding mating feature. For example, the pack 1405 can comprise a frame that mates with the busbar (e.g., allowing it to be snapped onto the pack). The frame may be electrically insulated from the cells, cell modules, and/or series stack of cell modules. In an example, a welded or brazed joint can be used. The joint may in some cases be cut in order to free the pack/interconnect/busbar.

The pack 1405 may further comprise or form other interconnections (e.g., to allow the pack 1405 to be interconnected with additional packs), including, but not limited to, additional interconnects, additional busbars and/or additional connection interfaces. For example, the pack 1405 may be further comprise additional interconnections at surfaces 1420 and/or 1425 (e.g., a positive interconnect, busbar or interconnection interface for connecting to another pack positioned adjacent to the surface 1425, and/or a positive interconnect, busbar or interconnection interface for connecting to another pack positioned adjacent to the surface 1420). Alternatively, one or more of the interconnections 1410 and/or 1415 may wrap around the pack 1405. For example, the positive busbar 1415 may further extend to the surface 1420, or to both the surface 1420 and the surface 1425. In another example, the negative busbar 1410 may further extend to the surface 1425, or to both the surface 1425 and the surface 1420. In some implementations, busbars may be used to provide pack-level electrical connections/interconnections (e.g., only busbars may be used for pack-level electrical connections/interconnections).

In configurations where cells are stacked vertically atop one another, the busbar at the top of the cell stack (e.g., cell pack stack) can comprise only the negative busbar (e.g., since the positive terminal of the stack can be on the bottom cell in the stack).

The core may be designed with multiple packs electrically connected in series and/or in parallel. The packs that are part of the core may be contained (e.g., all contained) within a single thermally managed chamber. For example, thermal insulation may surround a set of packs, thus keeping the packs (e.g., all packs) in good thermal contact with each other and thermally insulating the packs (e.g., all of the packs) from ambient conditions. In some cases, the core comprises electrically powered heaters installed near an inner surface of at least a portion of the insulation, electrically powered heaters distributed throughout the internal heated zone and/or connected to cell packs, or a combination thereof.

In some cases, the packs are arranged on trays that are arranged in a vertical stack. In some cases, the packs may be arranged on trays that are arranged in a horizontal stack. A plurality of trays (e.g., 2, 3, 4, 5, 10, 15, 20, 25, 30 or more trays) can be assembled into a core. The trays can be supported with an internal metal frame in the core. The packs can be assembled on each tray. The tray can provide mechanical support for the packs. The tray can be electrically isolated from the cells in the cell packs that are arranged on the tray. The packs in each tray can be series and/or parallel connected. The packs in each tray may be connected horizontally and/or vertically. In one example, the packs are assembled on each tray in a configuration about 1 pack deep and about 6 packs across. In another example, the packs are assembled on each tray in a configuration about 2 packs deep and about 4 packs across. In some cases, the packs are only connected in series to increase the core voltage. In some cases, two or more packs are stacked directly on top each another on one tray, with one or more trays within the core. Some of the packs on adjacent trays may be connected to each other to provide series connections between trays. Further, in some cases, some of the packs on adjacent trays may be connected to each other to provide parallel connections between trays. In some examples, the packs comprise about 6 modules stacked vertically on top each another and are about 1 cell wide and about 6 cells deep. In some examples, the packs comprise about 3 modules stacked vertically on top one another and are about 2 cells wide and about 8 cells deep.

The thermal insulation and/or the frame may be designed to allow the core (and/or any system of the disclosure) to be cooled, the insulation to be removed, a tray to be disconnected and removed from the core to allow for a single pack to be disconnected, removed and replaced, or any combination thereof. The core can then be reassembled and heated back up to operating temperature to allow for resumed operation.

The battery can have interconnects (e.g., wires) in addition to direct metal-to-metal joints (e.g., welds and brazes). A balance can be struck between the number of interconnects and the number of direct metal-to-metal joints where there are enough direct metal-to-metal joints to achieve a suitably low system resistance, but not so many that an entire battery is rendered inoperable and cannot be repaired without destroying direct metal-to-metal joints should one or more electrochemical cells fail. For example, interconnects may be advantageously used to enable modular assembly of the battery (e.g., module interchanges). Flexible interconnects can be used to reduce stresses generated between groups of cells (e.g., between cell packs) due to thermal gradients and differences in the coefficient of thermal expansion of components in the groups of cells (e.g., cell packs) and busbars (and/or other interconnections).

In some cases, the battery comprises at least one electrochemical cell connected in parallel with a plurality of electrochemical cells that are then stacked in series. The parallel connections can be made by creating the electrically conductive housing for multiple cells from one manufactured part. The housings can be stamped from a continuous piece of metal for example. In some cases, the parallel connections are formed by interconnects that allow at least some of the electrochemical cells comprising the battery to be replaced without breaking a direct metal-to-metal joint. In some cases, the parallel connections are formed by welding together cell bodies of adjacent cells (e.g., welding together the corners of adjacent cell bodies by melting together material from the cell body of adjacent cells and/or adding and melting filler material to the weld joint). In some cases, welding cell bodies directly to one another may risk creation of a hole in the cell body that may compromise the performance of the cell(s). To avoid the risk of creating a hole in the cell body, features may be added to the cell body (e.g., integrally formed with a housing or cell body, welded to the cell body during manufacturing, etc.) of one or more of the cells to be joined to allow the parallel connections to be formed by welding together the features in cell bodies of adjacent cells (e.g., welding together one or more tabs that stick out from the cell body and are positioned to be adjacent one or more tabs in an adjacent cell). One or more features (e.g., tabs, flanges, hooks, ledges or other weldable or brazable features) in the cell body may be provided on at least one of the cells to be joined. In some cases, one or more features in the cell body may be provided on all of the cells to be joined. The features may be positioned (e.g., aligned) to facilitate the formation of the parallel connection (e.g., to allow the features to be welded).

The battery can include a common single point connector. Multiple wires (e.g., ends of the wires) can be connected to the common single point connector (i.e., several wires can be connected to a common connector, which can connect to other portions of the battery at a single point).

In some implementations, a liquid metal battery can comprise a plurality of electrochemical cells connected in series and parallel. Each of the electrochemical cells can comprise a negative electrode, an electrolyte and a positive electrode. At least one of the negative electrode, the electrolyte and the positive electrode can be in a liquid state at an operating temperature of the electrochemical cell(s). The liquid metal battery can include a plurality of wires having a first end and a second end. The first end can be connected to at least one of the electrochemical cells (e.g., directly or indirectly). In some cases, the first end can be connected to a common single point connector, and the common single point connector can be connected to at least one of the electrochemical cells (e.g., to a busbar, to a cell body, to a feature in a cell body such as a tab protruding from the cell body, etc.). The second end can be connected, for example, to control circuitry (e.g., directly or indirectly) or to another common single point connector. In some cases, the second end can be connected to a common single point connector, and the common single point connector can be connected to control circuitry. For example, the single point connector on the second end (or the second end itself) can be connected to control circuitry located outside the thermally insulated zone containing cell packs, such as, for example, to a battery management system (e.g., to a battery management system board). In some cases, the first ends of a set of wires can be connected to a single point connector, the second ends of a subset of the wires can be connected to another single point connector, and the remaining wire or wires (e.g., the remaining second ends of the wires) can be separately connected to another part of the battery (e.g., voltage sense line input port of a battery management system).

In some implementations, the single point connector forms an electrical connection with another plurality (group) of electrochemical cells (e.g., to connect together modules, packs, cores, CEs, or systems).

An adapter plate can create a single point connection for multiple wires to a busbar in a module, pack, core, or CE. The wires can be welded or brazed to the back of the adapter plate to facilitate single point separation of a large quantity of wires connecting to a busbar. In order to effectively balance and monitor cells within a cell module, multiple wire connections may need to be created. The connection point can be a potential point of failure and can add to the cost and complexity of assembly. In some implementations, a terminal that has the wires connected to it can be prefabricated. The plate can be bolted, welded or brazed wherever the connection is required. Wires connected in this manner can remain static through many uses and disconnections, thus reducing wire wear-tear and embrittlement effects. Thus, single point connectors can in some cases enable more facile module interchanges.

Figure 11:
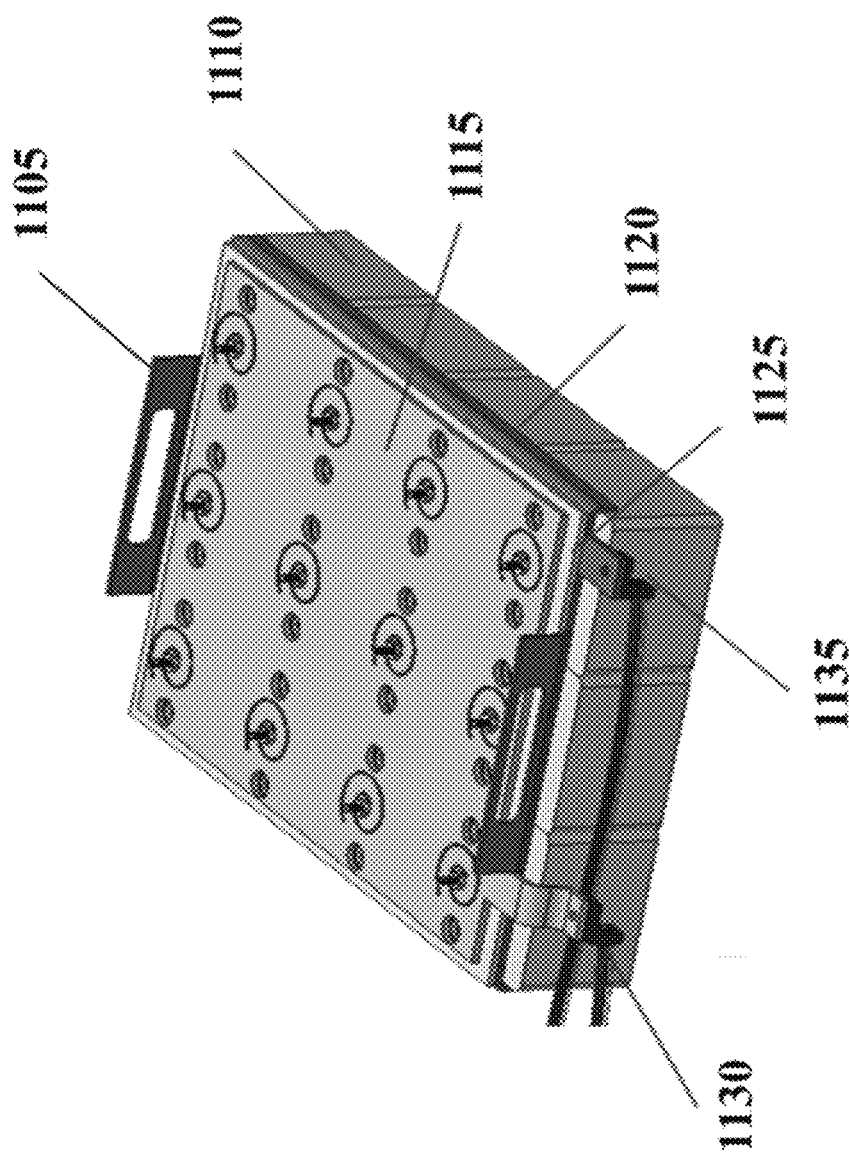
FIG. 11 shows an example of a cell module with busbars and wires.

In some implementations, the first end of the wire is connected to a busbar that is in electrical communication with at least one of the electrochemical cells. FIG. 11 shows an example of a cell module (e.g., in a pack comprising a single module) with busbars and wires. The module includes handles 1105, in this case for lifting twelve electrochemical cells 1110 arranged in a 3 by 4 cell array. The electrochemical cells can be in electrical communication with a negative busbar 1115 and a positive busbar 1120. One or more ceramic spacers 1125 can be used to displace weight from the seals. The wires can be connected to common single point connectors (e.g., a negative single point connector 1130 and a positive single point connector 1135).

Any number of wires can be connected to a common single point connector. In some examples, 1, 2, 3, 4, 5, 6, 7, 8, 9, 10, 11, 12, 13, 14, 15, 16, 17, 18, 19, 20, 22, 24, 26, 28, 30, 35, or 40 wires are connected to the single point connector. In some cases, at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, at least 20, at least 22, at least 24, at least 26, at least 28, at least 30, at least 35, or at least 40 wires are connected to the single point connector.

Figure 12:
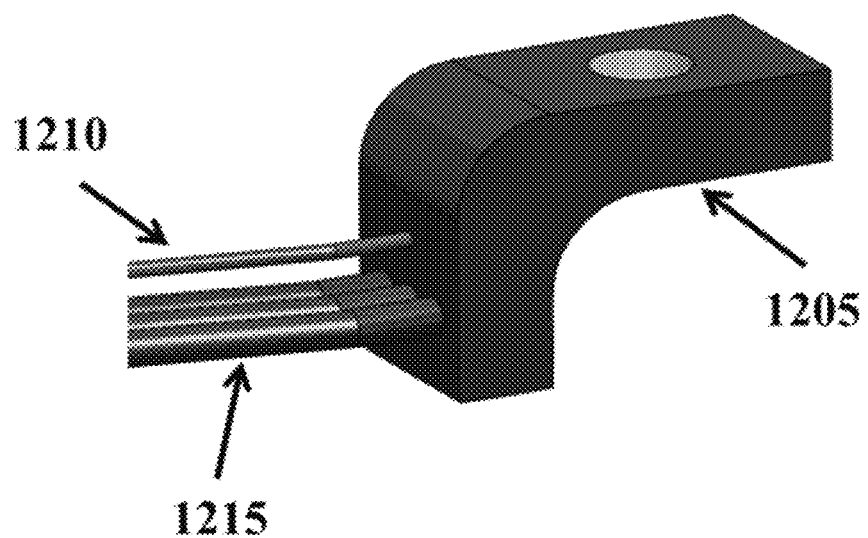
FIG. 12 shows an example of a single point connector.

FIG. 12 shows an example of a single point connector. The single point connector can comprise a bent metal piece 1205. The single point connector (e.g., bent metal piece 1205) can be made of any conductive metal, such as, for example, nickel, stainless steel, copper-aluminum alloy, or of any other conductive material described herein. In some cases, the ends of wires 1210 and 1215 are passed through holes in the bent metal piece and/or welded to the bent metal piece. The wires can be any wire, including, but not limited to, American Wire Gauge (AWG) 18 wires 1210 or AWG 10 wires 1215. In some cases, one or more wires (e.g., 1210) may be used to sense voltage and therefore may be able to be thin (e.g., less than about 2 mm in diameter, or AWG 18). In some cases, one or more wires (e.g., 1215) may be thicker (e.g., greater than about 2 mm in diameter, or AWG 18 gauge) and may be used to carry current to and from the cell or cell module (e.g., as required for cell balancing). The sensing line(s) (e.g., 1210) may be provided separately from the current flow line(s) (e.g., 1215). In some cases, first ends of the current carrying wires and the voltage sense wire may be connected to a single point connector that is connected to the cells or a busbar, while the other (second) ends of the wires are separately connected to the battery management system (e.g., the voltage sense wire is connected to a voltage input port on the battery management system and the current wires are connected to a single point connector which is connected to a current input/output port on the battery management system). This arrangement may enable voltage drop across the current flow lines to be separated from the operational characteristics sensed by the sensing lines. As previously described, the sensing and current flow paths may be in electronic communication with the battery management system.

Various interconnection configurations described herein in relation to individual cells or a given group of cells may equally apply to other groups of cells (or portions thereof) at least in some configurations. In one example, interconnections such as, for example, brazed positive and negative current collectors of cells, braze enhanced by differences in coefficients of thermal expansion, connecting (e.g., welding) cell bodies or features in cell bodies, etc., may apply to (or be adapted to) groups of cells such as, for example, packs, trays, towers, etc. In another example, interconnections such as, for example, stamped pocketed electrically conductive housing in cells and/or modules, etc., may apply to (or be adapted to) groups of cells such as, for example, towers, packs, etc. In yet another example, interconnections such as, for example, busbars/interconnects between packs, etc., may in some cases apply to (or be adapted to) groups of cells such as, for example, cores, trays, etc. Further, stress-relieving configurations (e.g., current transfer plates between cells, spacers, spiral relief or compliance features/structures/patterns, etc.) and electrical/structural features (e.g., single point connectors, end-caps, etc.) may in some cases be applied to (or be adapted to) any group of cells herein. The various interconnection configurations may be applied at group level or to individual cells. Thus, in an example, a spacer used between cells may be configured for use as a spacer between packs or trays, a current transfer plate between cells may be configured for use between modules, a busbar on a pack may be configured for use as a busbar on a tray, an interconnection interface comprising a feature on a cell body for connecting cell bodies within a module may be configured for connecting cell bodies of outer cells on adjacent packs, and so on. Further, interconnections described in relation to forming a series connection may be in some cases be adapted to forming a parallel connection, and vice versa.

Devices, systems and methods of the present disclosure may be combined with or modified by other devices, systems and/or methods, such as, for example, those described in U.S. Pat. No. 3,663,295 ("STORAGE BATTERY ELECTROLYTE"), U.S. Pat. No. 3,775,181 ("LITHIUM STORAGE CELLS WITH A FUSED ELECTROLYTE"), U.S. Pat. No. 8,268,471 ("HIGH-AMPERAGE ENERGY STORAGE DEVICE WITH LIQUID METAL NEGATIVE ELECTRODE AND METHODS"), U.S. Patent Publication No. 2011/0014503 ("ALKALINE EARTH METAL ION BATTERY"), U.S. Patent Publication No. 2011/0014505 ("LIQUID ELECTRODE BATTERY"), U.S. Patent Publication No. 2012/0104990 ("ALKALI METAL ION BATTERY WITH BIMETALLIC ELECTRODE"), and U.S. Patent Publication No. 2014/0099522 ("LOW-TEMPERATURE LIQUID METAL BATTERIES FOR GRID-SCALED STORAGE"), each of which is entirely incorporated herein by reference.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

A person of skill in the art will recognize that battery housing components may be constructed from materials other than the examples provided herein. One or more of the electrically conductive battery housing components, for example, may be constructed from metals other than steel and/or from one or more electrically conductive composites. The present disclosure therefore is not limited to any particular battery housing materials.

Any aspects of the disclosure described in relation to cathodes can equally apply to anodes at least in some configurations. Similarly, one or more battery electrodes and/or the electrolyte may not be liquid in alternative configurations. In an example, the electrolyte can be a polymer or a gel. In a further example, at least one battery electrode can be a solid or a gel. Furthermore, in some examples, the electrodes and/or electrolyte may not include metal. Aspects of the disclosure are applicable to a variety of energy storage/transformation devices without being limited to liquid metal batteries.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. An electrochemical energy storage system comprising:
   (a) a first plurality of electrochemical cells, wherein each electrochemical cell of said first plurality electrochemical cells comprises a negative electrode, an electrolyte and a positive electrode, wherein said electrolyte and at least one of said negative electrode and said positive electrode are in a liquid state at an operating temperature of said electrochemical cell, and wherein a first electrochemical cell of said first plurality of electrochemical cells and a second electrochemical cell of said first plurality of electrochemical cells are directly connected to one another; and
   (b) a busbar in electrical communication with said first electrochemical cell of said first plurality of electrochemical cells and a third electrochemical cell of a second plurality of electrochemical cells, wherein said busbar comprises a conductive material, wherein an internal resistance between said first plurality of electrochemical cells and said second plurality of electrochemical cells connected to said busbar is less than about 10 milliohm.

2. The electrochemical energy storage system of claim 1, wherein said conductive material comprises aluminum.

3. The electrochemical energy storage system of claim 1, wherein said conductive material comprises copper.

4. The electrochemical energy storage system of claim 1, wherein said conductive material comprises nickel.

5. The electrochemical energy storage system of claim 1, wherein said conductive material comprises an aluminum-copper alloy.

6. The electrochemical energy storage system of claim 1, wherein said conducive material has an electrical conductivity at an operating temperature of said electrochemical energy storage system that is greater than an electrical conductivity of stainless steel at said operating temperature.

7. The electrochemical energy storage system of claim 3, wherein said conductive material is coated with an oxidation-resistant material.

8. The electrochemical energy storage system of claim 7, wherein said oxidation-resistant material comprises aluminum-bronze, aluminum-brass, chromium, nickel, or stainless steel, or any combination thereof.

9. The electrochemical energy storage system of claim 1, wherein said conductive material has an electrical conductivity greater than about $2 \times 10^6$ S/m at 20° C. or greater than about $1 \times 10^6$ S/m at 500° C.

10. The electrochemical energy storage system of claim 1, wherein said busbar is joined to an end-cap.

11. The electrochemical energy storage system of claim 10, wherein said busbar is brazed, press-fit or welded to said end-cap.

12. The electrochemical energy storage system of claim 1, wherein said busbar is an interconnect.

13. The electrochemical energy storage system of claim 1, further comprising an interconnect that electrically connects said busbar of said first plurality of electrochemical cells with said second plurality of electrochemical cells, thereby placing said first plurality of electrochemical cells and said second plurality of electrochemical cells in series or in parallel.

14. The electrochemical energy storage system of claim 13, wherein said interconnect comprises a same conductive material as said busbar.

15. The electrochemical energy storage system of claim 1, wherein said operating temperature of said electrochemical cell is at least about 250° C.

16. The electrochemical energy storage system of claim 1, wherein said first electrochemical cell and said second electrochemical cell each comprises an electrically conductive housing with a lid, wherein said negative electrode, said positive electrode, and said electrolyte are disposed in said electrically conductive housing, and wherein said lid is in electrical communication with said positive electrode.

17. The electrochemical energy storage system of claim 16, wherein said first electrochemical cell and said second electrochemical cell each comprise a conductor that protrudes through an aperture in said lid of each electrochemical cell.

18. The electrochemical energy storage system of claim 1, wherein said negative electrode is liquid at said operating temperature of said first plurality of electrochemical cells, and wherein said negative electrode comprises (i) one or more alkaline metals or (ii) one or more alkaline earth metals.

19. The electrochemical energy storage system of claim 18, wherein said negative electrode comprises lithium, sodium, potassium, magnesium, or calcium, or any combination thereof.

* * * * *